(12) United States Patent
Harken

(10) Patent No.: US 7,761,406 B2
(45) Date of Patent: Jul. 20, 2010

(54) REGENERATING DATA INTEGRATION FUNCTIONS FOR TRANSFER FROM A DATA INTEGRATION PLATFORM

(75) Inventor: Richard Earl Harken, Oxford, MI (US)

(73) Assignee: International Business Machines Corporation, Armonk, NY (US)

( * ) Notice: Subject to any disclaimer, the term of this patent is extended or adjusted under 35 U.S.C. 154(b) by 1260 days.

(21) Appl. No.: 11/083,056

(22) Filed: Mar. 16, 2005

(65) Prior Publication Data

US 2005/0256892 A1 Nov. 17, 2005

Related U.S. Application Data

(60) Provisional application No. 60/553,729, filed on Mar. 16, 2004, provisional application No. 60/606,371, filed on Aug. 31, 2004, provisional application No. 60/606,237, filed on Aug. 31, 2004, provisional application No. 60/606,370, filed on Aug. 31, 2004, provisional application No. 60/606,372, filed on Aug. 31, 2004, provisional application No. 60/606,301, filed on Aug. 31, 2004, provisional application No. 60/606,238, filed on Aug. 31, 2004, provisional application No. 60/606,407, filed on Aug. 31, 2004.

(51) Int. Cl.
*G06F 7/00* (2006.01)
(52) U.S. Cl. .................................... 707/602
(58) Field of Classification Search ................ 707/602
See application file for complete search history.

(56) References Cited

U.S. PATENT DOCUMENTS

| | | | |
|---|---|---|---|
| 5,291,492 A | 3/1994 | Andrews et al. | |
| 5,524,253 A | 6/1996 | Pham et al. | |
| 5,727,158 A * | 3/1998 | Bouziane et al. | ............ 709/225 |
| 5,842,213 A | 11/1998 | Odom et al. | |
| 5,909,681 A | 6/1999 | Passera et al. | |
| 5,995,980 A | 11/1999 | Olson et al. | |
| 6,029,178 A | 2/2000 | Martin et al. | |
| 6,052,691 A | 4/2000 | Ardoin et al. | |

(Continued)

FOREIGN PATENT DOCUMENTS

EP 0520459 A2 12/1992

(Continued)

OTHER PUBLICATIONS

Ascential Software: "DataStage Product Family Architectural Overview" Online! Jan. 2, 2002, pp. 1-34.

(Continued)

*Primary Examiner*—Hung Q Pham
*Assistant Examiner*—Hubert Cheung
(74) *Attorney, Agent, or Firm*—Yee & Associates, P.C.; Elissa Y. Wang

(57) ABSTRACT

Methods and systems are provided for migrating a data integration facility, such as an ETL job, from a source data integration platform to a target data integration platform. Certain embodiments involve automatically interpreting at least one operation of a first data integration function adapted to operate on a first data integration platform; translating the at least one interpreted operation into an intermediate format; and regenerating the at least one operation of the first data integration function from the intermediate format to form a regenerated data integration function operation.

24 Claims, 42 Drawing Sheets

U.S. PATENT DOCUMENTS

| | | | |
|---|---|---|---|
| 6,094,688 A | 7/2000 | Mellen-Garnett et al. | |
| 6,108,635 A | 8/2000 | Herren et al. | |
| 6,192,390 B1 | 2/2001 | Berger et al. | |
| 6,208,345 B1 | 3/2001 | Sheard et al. | |
| 6,230,117 B1 | 5/2001 | Lymer et al. | |
| 6,272,449 B1 | 8/2001 | Passera | |
| 6,289,474 B1 | 9/2001 | Beckerle | |
| 6,292,932 B1 | 9/2001 | Baisley et al. | |
| 6,311,265 B1 | 10/2001 | Beckerle et al. | |
| 6,321,240 B1 | 11/2001 | Chilimbi et al. | |
| 6,330,008 B1 | 12/2001 | Razdow et al. | |
| 6,330,556 B1 | 12/2001 | Chilimbi et al. | |
| 6,347,310 B1 | 2/2002 | Passera | |
| 6,370,573 B1 | 4/2002 | Bowman-Amuah | |
| 6,415,286 B1 | 7/2002 | Passera et al. | |
| 6,453,464 B1 | 9/2002 | Sullivan | |
| 6,536,037 B1 | 3/2003 | Guheen et al. | |
| 6,542,908 B1 | 4/2003 | Ims | |
| 6,553,563 B2 | 4/2003 | Ambrose et al. | |
| 6,564,251 B2 | 5/2003 | Katariya et al. | |
| 6,604,110 B1 | 8/2003 | Savage et al. | |
| 6,625,651 B1 | 9/2003 | Swartz et al. | |
| 6,684,207 B1 | 1/2004 | Greenfield et al. | |
| 6,721,713 B1 | 4/2004 | Guheen et al. | |
| 6,757,689 B2 | 6/2004 | Battas et al. | |
| 6,763,353 B2 | 7/2004 | Li et al. | |
| 6,782,403 B1 | 8/2004 | Kino et al. | |
| 6,920,474 B2 | 7/2005 | Walsh et al. | |
| 6,922,685 B2 | 7/2005 | Greene et al. | |
| 6,937,983 B2 | 8/2005 | Romero | |
| 6,938,053 B2 | 8/2005 | Jaro | |
| 6,985,939 B2 | 1/2006 | Fletcher et al. | |
| 7,003,560 B1 | 2/2006 | Mullen et al. | |
| 7,080,092 B2 | 7/2006 | Upton | |
| 7,117,208 B2 | 10/2006 | Tamayo et al. | |
| 7,117,215 B1* | 10/2006 | Kanchwalla et al. | 707/100 |
| 7,120,896 B2 | 10/2006 | Budhiraja et al. | |
| 7,124,413 B1 | 10/2006 | Klemm et al. | |
| 7,131,110 B2 | 10/2006 | Brewin | |
| 7,139,199 B2 | 11/2006 | Srinivasan et al. | |
| 7,139,999 B2 | 11/2006 | Bowman-Amuah | |
| 7,146,606 B2 | 12/2006 | Mitchell et al. | |
| 7,174,534 B2 | 2/2007 | Chong et al. | |
| 7,181,731 B2 | 2/2007 | Pace et al. | |
| 7,200,569 B2* | 4/2007 | Gallagher et al. | 705/31 |
| 7,206,789 B2 | 4/2007 | Hurmiz et al. | |
| 7,212,233 B2 | 5/2007 | Nakamura | |
| 7,213,037 B2 | 5/2007 | Rangadass | |
| 7,257,820 B2 | 8/2007 | Fischer et al. | |
| 7,260,623 B2 | 8/2007 | Wookey et al. | |
| 7,343,428 B2 | 3/2008 | Fletcher et al. | |
| 7,366,990 B2 | 4/2008 | Pitroda | |
| 7,392,255 B1* | 6/2008 | Sholtis et al. | 707/203 |
| 7,392,320 B2 | 6/2008 | Bookman et al. | |
| 2001/0047326 A1 | 11/2001 | Broadbent et al. | |
| 2002/0059172 A1 | 5/2002 | Muhlestein | |
| 2002/0062269 A1 | 5/2002 | Kirmani et al. | |
| 2002/0073059 A1 | 6/2002 | Foster et al. | |
| 2002/0097277 A1 | 7/2002 | Pitroda | |
| 2002/0103731 A1 | 8/2002 | Barnard et al. | |
| 2002/0111819 A1 | 8/2002 | Li et al. | |
| 2002/0116362 A1 | 8/2002 | Li et al. | |
| 2002/0120535 A1 | 8/2002 | Yu | |
| 2002/0133387 A1 | 9/2002 | Wilson et al. | |
| 2002/0138316 A1 | 9/2002 | Katz et al. | |
| 2002/0141446 A1 | 10/2002 | Koga | |
| 2002/0174000 A1 | 11/2002 | Katz et al. | |
| 2002/0178077 A1 | 11/2002 | Katz et al. | |
| 2002/0194181 A1 | 12/2002 | Wachtel | |
| 2003/0014483 A1* | 1/2003 | Stevenson et al. | 709/203 |
| 2003/0020807 A1 | 1/2003 | Khoshnevis et al. | |
| 2003/0033155 A1 | 2/2003 | Peerson et al. | |
| 2003/0033179 A1 | 2/2003 | Katz et al. | |
| 2003/0046307 A1 | 3/2003 | Rivette et al. | |
| 2003/0055624 A1 | 3/2003 | Fletcher et al. | |
| 2003/0065549 A1 | 4/2003 | Hoffman et al. | |
| 2003/0069902 A1 | 4/2003 | Narang et al. | |
| 2003/0093582 A1 | 5/2003 | Cruz et al. | |
| 2003/0097286 A1 | 5/2003 | Skeen | |
| 2003/0101111 A1* | 5/2003 | Dang et al. | 705/31 |
| 2003/0101112 A1* | 5/2003 | Gallagher et al. | 705/31 |
| 2003/0132854 A1 | 7/2003 | Swan et al. | |
| 2003/0145096 A1 | 7/2003 | Breiter et al. | |
| 2003/0188039 A1 | 10/2003 | Liu et al. | |
| 2003/0212738 A1 | 11/2003 | Wookey et al. | |
| 2003/0220807 A1 | 11/2003 | Hoffman et al. | |
| 2003/0227392 A1 | 12/2003 | Ebert et al. | |
| 2003/0233341 A1 | 12/2003 | Taylor et al. | |
| 2004/0011276 A1 | 1/2004 | Jackson et al. | |
| 2004/0015564 A1 | 1/2004 | Williams | |
| 2004/0030740 A1 | 2/2004 | Stelting | |
| 2004/0034651 A1 | 2/2004 | Gupta et al. | |
| 2004/0064428 A1 | 4/2004 | Larkin et al. | |
| 2004/0103051 A1 | 5/2004 | Reed et al. | |
| 2004/0111276 A1 | 6/2004 | Inge | |
| 2004/0117759 A1 | 6/2004 | Rippert, Jr. et al. | |
| 2004/0128394 A1 | 7/2004 | Knauerhase et al. | |
| 2004/0133876 A1 | 7/2004 | Sproule | |
| 2004/0177012 A1 | 9/2004 | Flanagan | |
| 2004/0177335 A1 | 9/2004 | Beisiegel et al. | |
| 2004/0205129 A1 | 10/2004 | Bongiomi et al. | |
| 2004/0205206 A1 | 10/2004 | Naik et al. | |
| 2004/0225660 A1 | 11/2004 | Carey et al. | |
| 2004/0243453 A1 | 12/2004 | Call et al. | |
| 2004/0243458 A1 | 12/2004 | Barkan | |
| 2005/0021502 A1* | 1/2005 | Chen et al. | 707/2 |
| 2005/0027871 A1 | 2/2005 | Bradley et al. | |
| 2005/0028158 A1 | 2/2005 | Ferguson et al. | |
| 2005/0033603 A1 | 2/2005 | Suzuki et al. | |
| 2005/0086178 A1 | 4/2005 | Xie et al. | |
| 2005/0086197 A1 | 4/2005 | Boubez et al. | |
| 2005/0086360 A1* | 4/2005 | Mamou et al. | 709/232 |
| 2005/0091174 A1 | 4/2005 | Akkiraju et al. | |
| 2005/0103051 A1 | 5/2005 | Jacquin | |
| 2005/0108658 A1 | 5/2005 | Lortie | |
| 2005/0114152 A1 | 5/2005 | Lopez et al. | |
| 2005/0114829 A1 | 5/2005 | Robin et al. | |
| 2005/0144114 A1 | 6/2005 | Ruggieri et al. | |
| 2005/0144557 A1 | 6/2005 | Li et al. | |
| 2005/0149484 A1 | 7/2005 | Fox et al. | |
| 2005/0154627 A1 | 7/2005 | Zuzek et al. | |
| 2005/0160104 A1 | 7/2005 | Meera et al. | |
| 2005/0222931 A1* | 10/2005 | Mamou et al. | 705/35 |
| 2005/0223109 A1* | 10/2005 | Mamou et al. | 709/232 |
| 2005/0223392 A1 | 10/2005 | Cox et al. | |
| 2005/0228808 A1* | 10/2005 | Mamou et al. | 707/100 |
| 2005/0232046 A1* | 10/2005 | Mamou et al. | 365/220 |
| 2005/0234969 A1* | 10/2005 | Mamou et al. | 707/102 |
| 2005/0235274 A1* | 10/2005 | Mamou et al. | 717/136 |
| 2005/0240354 A1* | 10/2005 | Mamou et al. | 702/19 |
| 2005/0240592 A1* | 10/2005 | Mamou et al. | 707/9 |
| 2005/0243604 A1* | 11/2005 | Harken et al. | 365/185.22 |
| 2005/0251501 A1 | 11/2005 | Phillips et al. | |
| 2005/0251533 A1* | 11/2005 | Harken et al. | 707/104.1 |
| 2005/0257196 A1 | 11/2005 | Hollander et al. | |
| 2005/0262188 A1* | 11/2005 | Mamou et al. | 709/203 |
| 2005/0262189 A1* | 11/2005 | Mamou et al. | 709/203 |
| 2005/0262190 A1* | 11/2005 | Mamou et al. | 709/203 |
| 2005/0262191 A1* | 11/2005 | Mamou et al. | 709/203 |
| 2005/0262192 A1* | 11/2005 | Mamou et al. | 709/203 |
| 2005/0262193 A1* | 11/2005 | Mamou et al. | 709/203 |
| 2005/0262194 A1* | 11/2005 | Mamou et al. | 709/203 |
| 2005/0273462 A1 | 12/2005 | Reed et al. | |
| 2005/0286306 A1 | 12/2005 | Srinivasan et al. | |

| | | | |
|---|---|---|---|
| 2006/0010195 A1* | 1/2006 | Mamou et al. | 709/203 |
| 2006/0020641 A1 | 1/2006 | Walsh et al. | |
| 2006/0069717 A1* | 3/2006 | Mamou et al. | 709/203 |
| 2006/0112367 A1 | 5/2006 | Harris | |
| 2006/0259542 A1 | 11/2006 | Wu et al. | |
| 2007/0094256 A1 | 4/2007 | Hite et al. | |
| 2007/0156859 A1 | 7/2007 | Savchenko et al. | |
| 2008/0046506 A1 | 2/2008 | Broda | |
| 2008/0077656 A1 | 3/2008 | Broda | |
| 2008/0307392 A1 | 12/2008 | Racca et al. | |

FOREIGN PATENT DOCUMENTS

WO    WO03040892 A    5/2003

OTHER PUBLICATIONS

Blor Research: "Enterprise Integration Suite from Ascential Software", Online! 2002, pp. 1-28 www.ascentialsoftware.pdf/BloorReview_AscEnterpriseIntegrationSuite.pdf.

Ascential Software: "Ascential Real-Time Integration Services (RTI) Delivering on the Promise of the Right-Time Enterprise", Online!, Jun. 2000, pp. 1-12 www.infotechlive.com/whitepapers/RTI%20Services.pdf.

Rubinstein, "Integration Suite Drops "e" and "L"", SDTimes, Online!, Jul. 1, 2003, pp. 1-2 www.sdtimes.com/download/images/SDTimes.081.pdf.

Ascential Software: "DataStage: All built on the most scalable and robust architecture available", Online! Jun. 1, 2003, pp. 1-4.

Chappel et al., "Java Web Services", Chapter 6, Section 4, O'Reilley, Mar. 2002, pp. 1-4.

Zeigler et al., "Distributed Supply Chain Simulation in a DEVS/COBRA Executive Environment", ACM, 1999, pp. 1333-1340.

David Marco, "Managed Meta Data Environment (MME): A Complete Walkthrough", The Data Administration Newsletter, TDAN.com, Apr. 1, 2004, pp. 1-9, <http://www.tdan.com/view-articles/5185>.

Haas et al., "Data Integration Through Database Federation", IBM Systems Journal, IBM Corporation, Armonk, New York, vol. 41, No. 4, Jan. 1, 2002, pp. 578-596.

Gallagher et al., "A General Purpose Registry//Repository Information Model", Oct. 16, 2000, pp. 1-32, <http://lists.oasis-open.org/archives/regrep/200010/pdf00000.pdfpages>.

"Working Draft 1.1 Dec. 30, 2000", OASIS Registry/Repository Technical Specification, Dec. 12, 2000, <http://xml.Coverpages.org/OasisRegrepSpec11-20001215.pdf>.

Tan et al., "Domain-Specific Metamodels for Heterogeneous Information Systems", Proceedings of the 36th Hawaii International Conference on System Sciences (HICSS'03), retrieved Dec. 23, 2005, pp. 1-10, <http://csd12.computer.org/comp/proceedings/hicss/2003/187490321a.pdf>.

* cited by examiner

REGENERATING DATA INTEGRATION FUNCTIONS FOR TRANSFER FROM A DATA INTEGRATION PLATFORM

RELATED APPLICATIONS

This application claims the benefit of the following U.S. provisional patent applications, each of which is incorporate by reference in its entirety:

Prov. App. No. 60/606,407, filed Aug. 31, 2004 and entitled "Methods and Systems for Semantic Identification in Data Systems."

Prov. App. No. 60/606,372, filed Aug. 31, 2004 and entitled "User Interfaces for Data Integration Systems."

Prov. App. No. 60/606,371, filed Aug. 31, 2004 and entitled "Architecture, Interfaces, Methods and Systems for Data Integration Services."

Prov. App. No. 60/606,370, filed Aug. 31, 2004 and entitled "Services Oriented Architecture for Data Integration Services."

Prov. App. No. 60/606,301, filed Aug. 31, 2004 and entitled "Metadata Management."

Prov. App. No. 60/606,238, filed Aug. 31, 2004 and entitled "RFID Systems and Data Integration."

Prov. App. No. 60/606,237, filed Aug. 31, 2004 and entitled "Architecture for Enterprise Data Integration Systems."

Prov. App. No. 60/553,729, filed Mar. 16, 2004 and entitled "Methods and Systems for Migrating Data Integration Jobs Between Extract, Transform and Load Facilities."

This application also incorporates by reference the entire disclosure of each of the following commonly owned U.S. patents:

U.S. Pat. No. 6,604,110, filed Oct. 31, 2000 and entitled "Automated Software Code Generation from a Metadata-Based Repository."

U.S. Pat. No. 6,415,286, filed Mar. 29, 1999 and entitled "Computer System and Computerized Method for Partitioning Data.

U.S. Pat. No. 6,347,310, filed May 11, 1998 and entitled "Computer System and Process for Training of Analytical Models."

U.S. Pat. No. 6,330,008, filed Feb. 24, 1997 and entitled "Apparatuses and Methods for Monitoring Performance of Parallel Computing."

U.S. Pat. No. 6,311,265, filed Mar. 25, 1996 and entitled "Apparatuses and Methods for Programming Parallel Computers."

U.S. Pat. No. 6,289,474, filed Jun. 24, 1998 and entitled "Computer System and Process for Checkpointing Operations."

U.S. Pat. No. 6,272,449, filed Jun. 22, 1998 and entitled "Computing System and Process for Explaining Behavior of a Model."

U.S. Pat. No. 5,995,980, filed Jul. 23, 1996 and entitled "System and Method for Database Update Replication."

U.S. Pat. No. 5,909,681, filed Mar. 25, 1996 and entitled "Computer System and Computerized Method for Partitioning Data for Parallel Processing."

U.S. Pat. No. 5,727,158, filed Sep. 22, 1995 and entitled "Information Repository for Storing Information for Enterprise Computing System."

This application also incorporates by reference the entire disclosure of the following commonly owned non-provisional U.S. patent applications:

U.S. patent application Ser. No. 10/925,897, filed Aug. 24, 2004 and entitled "Methods and Systems for Real Time Data Integration Services", which claims the benefit of U.S. Prov. App. No. 60/498,531, filed Aug. 27, 2003 and entitled "Methods and Systems for Real Time Data Integration Services."

U.S. patent application Ser. No. 09/798,268, filed Mar. 2, 2001 and entitled "Categorization Based on Record Linkage Theory."

U.S. patent application Ser. No. 09/596,482, filed Jun. 19, 2000 and entitled "Segmentation and Processing of Continuous Data Streams Using Transactional Semantics."

This application hereby incorporates by reference the entire disclosure of the following non-provisional and provisional U.S. patent applications:

BACKGROUND

This invention relates to the field of information technology, and more particularly to the field of integration processes.

The advent of computer applications made many business processes much faster and more efficient; however, the proliferation of different computer applications that use different data structures, communication protocols, languages and platforms has led to great complexity in the information technology infrastructure of the typical business enterprise. Different business processes within the typical enterprise may use completely different computer applications, each computer application being developed and optimized for the particular business process, rather than for the enterprise as a whole. For example, a business may have a particular computer application for tracking accounts payable and a completely different one for keeping track of customer contacts. In fact, even the same business process may use more than one computer application, such as when an enterprise keeps a centralized customer contact database, but employees keep their own contact information, such as in a personal information manager.

While specialized computer applications offer the advantages of custom-tailored solutions, the proliferation leads to inefficiencies, such as repetitive entry and handling of the same data many times throughout the enterprise, or the failure of the enterprise to capitalize on data that is associated with one process when the enterprise executes another process that could benefit from that data. For example, if the accounts payable process is separated from the supply chain and ordering process, the enterprise may accept and fill orders from a customer whose credit history would have caused the enterprise to decline the order. Many other examples can be provided where an enterprise would benefit from consistent access to all of its data across varied computer applications.

A number of companies have recognized and addressed the need for integration of data across different applications in the business enterprise. Thus, enterprise application integration, or EAI, is a valuable field of computer application development. As computer applications increase in complexity and number, enterprise application integration efforts encounter many challenges, ranging from the need to handle different protocols, the need to address ever-increasing volumes of data and numbers of transactions, and an ever-increasing appetite for faster integration of data. Conventional approaches to EAI have involved forming and executing data integration jobs. A typical data integration job may include extracting data from one or more sources of data, transforming the data (which might include merging it with data from another source), and loading the data into a target, this extraction, transformation and loading being sometimes referred to as ETL. Various approaches to EAI have been taken, including least-common-denominator approaches, atomic approaches, and bridge-type approaches.

While a number of useful approaches have been devised for designing and deploying specific integration processes, there remains a need for tools to enable migration of the integration processes themselves, once designed, among different technology platforms.

SUMMARY

Methods and systems are provided for migrating a data integration facility, such as an ETL job, from a source data integration platform to a target data integration platform. Certain embodiments involve automatically interpreting at least one operation of a first data integration function adapted to operate on a first data integration platform; translating the at least one interpreted operation into an intermediate format; and regenerating the at least one operation of the first data integration function from the intermediate format to form a regenerated data integration function operation.

A method disclosed herein includes interpreting at least one operation of a first data integration function adapted to operate on a first data integration platform; translating the at least one interpreted operation into an intermediate format; and regenerating the at least one operation of the first data integration function from the intermediate format to form a regenerated data integration function operation.

In the method, the regenerated data integration function operation may be adapted to be operational on a second data integration platform. The first data integration function may be not operationally compatible with the second data integration platform. The step of regenerating the at least one operation into an intermediate format may include parsing code associate with the at least one operation. Parsing code associated with the at least one operation may include parsing metadata associated with the at least one operation. The metadata may be in an XML format and the parsing may be performed using an XML parser. The parsed metadata may be transformed from a first format into a second format. The second format may include at least one of a generic format, object format, and atomic format. The method may include the step of testing the regenerated data integration function operation on the second data integration platform. The step of testing may include determining the effectiveness of the regeneration. The first data integration function may include an ETL function. The first data integration function may include at least one of an extract, transform, and load function.

In another aspect, a system disclosed herein may include a regeneration facility adapted to: interpret at least one operation of a first data integration function adapted to operate on a first data integration platform, translate the at least one interpreted operation into an intermediate format, and regenerate the at least one operation of the first data integration function from the intermediate format to form a regenerated data integration function operation.

In the system, the regenerated data integration function operation may be adapted to be operational on a second data integration platform. The first data integration function may be not operationally compatible with the second data integration platform. The regeneration facility may be adapted to associate code with the at least one operation during the regeneration. The code associated with the at least one operation may include code for parsing metadata associated with the at least one operation. The metadata may be in an XML format and the parsing may be performed using an XML parser. The parsed metadata may be transformed from a first format into a second format. The second format may include at least one of a generic format, an object format, and an atomic format.

The system may include a testing facility adapted to test the regenerated data integration function operation. The system may include a quality facility adapted to determine the effectiveness of the regeneration. The first data integration function may include an ETL function. The first data integration function may include at least one of an extract, transform, and load function.

Methods and systems are provided for migrating a data integration facility, such as an ETL job, from a source data integration platform to a target data integration platform. For example, systems and methods are provided for migrating a data integration job from a source data integration platform having a source native format to a target data integration platform having a target native format; wherein the target native format is different than the source native format. The systems and methods may involve analyzing a source language construct of the source data integration platform to determine a logical syntax; constructing a target language construct of the target data integration platform adapted to perform the same logical operation on the target data integration platform as the source language construct performs on the source data integration platform; and substituting the target language construct for the source language construct in the source code for the data integration job.

In one aspect, there is disclosed herein a method for migrating a data integration job from a source data integration platform having a source native format to a target data integration platform having a target native format; wherein the target native format is different than the source native format. The method may include analyzing a source language construct of the source data integration platform to determine a logical syntax; constructing a target language construct of the target data integration platform adapted to perform the same logical operation on the target data integration platform as the source language construct performs on the source data integration platform; and substituting the target language construct for the source language construct in the source code for the data integration job. The method may further include the step of running the data integration job with the substituted target language construct on the target data integration platform. The data integration job may include an ETL job.

In another aspect, a method disclosed herein may include extracting source code from a source data integration facility; breaking the source code into blocks; analyzing a first source code block to determine its syntax; determining the syntax is a known syntax; and replacing the first source code block with a target code block; wherein the target code block is formatted in a target data integration facility format. The known syntax may include a generic syntax.

In another aspect, a method disclosed herein may include extracting source code from a source data integration facility; breaking the source code into blocks; analyzing a first source code block to determine its syntax; and determining the syntax is an unknown syntax. The method may include the step of storing the first source code block in memory. The method may include the steps of converting the first block into a plurality of representations; parsing the plurality of representations; transforming the plurality of representations into a generic model; and translating the generic model into a second format.

In another aspect, there is disclosed herein a system adapted to migrate a data integration job from a source data integration platform having a source native format to a target data integration platform having a target native format;

wherein the target native format is different than the source native format, the system comprising a computer facility adapted to: analyze a source language construct of the source data integration platform to determine a logical syntax; construct a target language construct of the target data integration platform adapted to perform the same logical operation on the target data integration platform as the source language construct performs on the source data integration platform; and substitute the target language construct for the source language construct in the source code for the data integration job. The computer facility may be further adapted to run the data integration job with the substituted target language construct on the target data integration platform. The data integration job may include an ETL job.

In another aspect, a system disclosed herein includes a computer facility adapted to: extract source code from a source data integration facility; break the source code into blocks; analyze a first source code block to determine its syntax; determine the syntax is a known syntax; and replace the first source code block with a target code block; wherein the target code block is formatted in a target data integration facility format. The known syntax may include a generic syntax.

In another aspect, a system disclosed herein includes a computer facility adapted to extract source code from a source data integration facility; break the source code into blocks; analyze a first source code block to determine its syntax; and determine the syntax is an unknown syntax. The computer facility may be further adapted to store the first source code block in memory. The computer facility may be further adapted to convert the first block into a plurality of representations; parse the plurality of representations; transform the plurality of representations into a generic model; and translate the generic model into a second format.

Methods and systems disclosed herein also include methods and systems for migrating a data integration facility/job from a (first) source data integration platform to a (second) target data integration platform. The methods include steps of externalizing a metadata representation from the first data integration facility of a source data integration platform having at least one native data format; parsing the metadata representations; importing the metadata representation into a plurality of class/object representations of the first data integration facility; generating a virtual representation of the data integration facility in memory; and translating the class/object representations to generate a second data integration facility operating on the target data integration platform, wherein the second data integration facility performs substantially the same functions on the target platform as the first data integration facility performs on the source platform.

In embodiments, there can be various phases included in performing the translation, such as importing an externalized metadata format from a source platform into class/object representations for translation and creating a generic virtual data integration facility process, such as an ETL process, as a representation in memory. In embodiments, this step becomes the baseline for translation into a target tool. The phases can also include translating the virtual representation and creating an object in the target data integration platform's native format.

In embodiments, the data integration facility can be an ETL job. The metadata representations can be in a format selected from the group consisting of an XML format, a Text Export format, a script format, a COBOL format, a C language format, a C++ format, and a Teradata format. In embodiments, externalizing a metadata representation includes bringing items being translated into memory so they can be analyzed and manipulated easily. In embodiments, the migration facility may bring in a representation of the original meta-model objects into memory.

In embodiments, creating a virtual representation may include producing a set of objects that represent a generic meta-model for a data integration facility/job, such as an ETL job. In embodiments, this step can produce a set of objects that can represent a generic meta-model for the job, such as an atomic ETL object model. The atomic model may support translations into/and out of the individual data integration platform models, such as ETL tool models. This step can be a hub that can be used for bi/directional translations.

In embodiments, translating the class/object representations can include transforming the input into an atomic format. In embodiments, the atomic format can be an atomic ETL object model. In embodiments, the ETL object model can be an integrated object model of a plurality of ETL operations.

In embodiments, generating a second data integration facility may include translating an atomic format model into a native data format for a destination integration facility. The destination format may be selected from the group consisting of an XML format, a Text Export format, a script format, a COBOL format, a C language format, a C++ format, and a Teradata format. In embodiments, the methods and systems disclosed herein may take objects in the virtual model and translate them into the target format (e.g., XML).

In embodiments, the migration facilities described herein can take as input the representations of the ETL maps/jobs in externalized format exported from the source ETL tool (XML, Text Export, Scripts, Cobol, C, C++, Teradata Scripts, and the like) or other data integration platform or facility/job. The migration facility can then parse this input and transform it into an object-oriented model, such as an atomic object model, such as for an ETL job. To complete the process, the migration facility can then translate the object-oriented model into a destination format, such as XML, Text Export, Scripts, Cobol, C, C++, Teradata Scripts or the like.

In embodiments, the migration facility and atomic model can embody accumulated knowledge to capture a wide range of possible operations of an ETL process into a low-level integrated object model. In embodiments, the migration facility can use a "brokering" methodology to translate data integration logic, such as ETL logic, from one form to another. Each unique data integration platform or job can be semantically mapped to an atomic, object-oriented model, via a migration facility, such as a translation broker. Each translation broker can embody expert knowledge on how to interpret and translate the externalized format exported from the specific data integration tool to the atomic, object-oriented model. The entire design and implementation of the migration facility can be modular in that translation brokers can be added to individually, without having to re-compile the tool.

In embodiments, the data integration facility can be an ETL map.

In embodiments, methods and systems may include exposing the data integration facility that results from migration as a web service, such as an RTI service.

In embodiments, the step of generating a virtual representation may create a bi-directional translation facility or migration facility. In embodiments, the methods and systems may further include using the bi-directional translation facility to translate a data integration job from the target data integration facility to the source data integration facility.

In embodiments, migration of data may take place between data integration platforms of a banking institution, a financial services institution, a health care institution, a hospital, an educational institution, a governmental institution, a corporate environment, a non-profit institution, a law enforcement institution, a manufacturer, a professional services organization, a research institution or any other kind of institution or enterprise.

A method of translating an ETL job from one data integration platform to a second data integration platform may include importing an externalized metadata format for the ETL job into class/object representations for translation; creating a generic virtual ETL process representation in memory; and translating the virtual representation to create an object in the format of the second data integration platform.

Methods and systems disclosed herein also include methods and systems for converting an instruction set for a source ETL application to a second format for a destination ETL application. The methods and systems include extracting an instruction set in the first format from a source ETL application instruction set file; converting the instruction set into a plurality of representations in an externalized format; parsing the plurality of representations; transforming the plurality of representations into an atomic object model; translating the atomic object model into the second format; and loading the output of the translation into a destination ETL application instruction set file.

In embodiments, the methods and systems disclosed herein provide for converting an instruction set for a source ETL application to a second format for a destination ETL application. The migration facility can include facilities for extracting an instruction set in the first format from a source ETL application instruction set file; converting the instruction set into a plurality of representations in an externalized format; parsing the plurality of representations; transforming the plurality of representations into an atomic object model; translating the atomic object model into the second format; and loading the output of the translation into a destination ETL application instruction set file. In embodiments, the methods and systems can operate on commercially available ETL tools, such as the data integration products described above. In embodiments, the migration facility can convert an instruction set in the reverse direction, from the second format to the first format. The source ETL application instruction set file can be an ETL map or an ETL job. The job can include meta-model objects. In embodiments, the destination ETL application is a comparable ETL map or ETL job that also includes meta-model objects. The source/destination ETL application can be a software tool capable of publishing, subscribing and externalizing metadata associated with the ETL application or ETL jobs or maps that are executed using the ETL application. The destination ETL application can have similar facilities. The ETL application can publish metadata in various formats, such as XML. The atomic object model can be a low-level, integrated, object-oriented model with classes and members that correspond to knowledge about the object-oriented structures typical of data integration jobs. In embodiments, the ETL application can be semantically mapped to the atomic model through the user of a modular translation application. The representations can be class/object representations. The representations can be virtual ETL process representations. The representations can be aspects of a generic meta-model for the source ETL application. In embodiments, the representations are stored on storage media, such as memory of the migration facility, or volatile or non-volatile computer memory such as RAM, PROM, EPROM, flash memory, and EEPROM, floppy disks, compact disks, optical disks, digital versatile discs, zip disks, or magnetic tape.

The methods and systems disclosed herein thus include methods and systems for migrating a data integration job from a source data integration platform having a native format to a target data integration platform having a different native format, including steps of analyzing a source language construct of the source data integration platform to determine a logical syntax; constructing a target language construct of the target data integration platform to perform the same logical operation on the target data integration platform as the source language construct performs on the source data integration platform; and substituting the target language construct for the source language construct in the source code for the data integration job.

In embodiments, methods and system may further include steps for running the data integration job with the substituted target language construct on the target data integration platform. Methods and systems may further include testing the data integration job on the target data integration platform, editing the data integration job, and/or running the data integration job on the target data integration platform.

In embodiments, methods and systems may include a "block syntax" translation step. The methods and systems analyze similar language constructs and map them from a source tool into a target tool. The program is able to then do a "block syntax" substitution of the translated script, into a target platform/tool's syntax without having to parse the original scripting language. After the initial substitution, there may be a step of changing a source structure into a target structure.

Methods and systems disclosed herein include migration facilities where translating the atomic model into the second format occurs through block syntax substitution. In embodiments, parsing a representation includes dividing the representations into units of data and optionally tagging such units of data.

The following terminology is used throughout the specification:

"Ascential" as used herein shall include Ascential Software Corporation of Westborough, Mass., as well as any affiliates, successors or assigns.

"Data source" or "data target" as used herein, shall include, without limitation, any data facility or repository, such as a database, plurality of databases, repository information manager, queue, message service, repository, data facility, data storage facility, data provider, website, server, computer, computer storage facility, CD, DVD, mobile storage facility, central storage facility, hard disk, multiple coordinating data storage facilities, RAM, ROM, flash memory, memory card, temporary memory facility, permanent memory facility, magnetic tape, locally connected computing facility, remotely connected computing facility, wireless facility, wired facility, mobile facility, central facility, web browser, client, computer, laptop, PDA phone, cell phone, mobile phone, information platform, analysis facility, processing facility, business enterprise system or other facility where data is handled or other facility provided to store data or other information.

"Data Stage" as used herein refers to a data process or data integration facility where a number of process steps may take place such as, collecting, cleansing, transforming, transmitting, interfacing with business enterprise software or other software, interfacing with Real Time Integration facilities (e.g. the DataStage software offered by Ascential).

"Data Stage Job" as used herein includes data or processing steps accomplished through a Data Stage.

"Data integration platform" is used herein to include any platform suitable for generating or operating a data integration facility, such as a data integration job, such as an extract, transform and load (ETL) data integration job, and shall include commercially available platforms, such as Ascential's DataStage or MetaStage platforms, as well as proprietary platforms of an enterprise, or platforms available from other vendors.

"Data integration facility" or "data integration job" are used interchangeably herein and shall include according to context any facility for integrating data, databases, applications, machines, or other enterprise resources that interact with data, including, for example, data profiling facilities, data cleansing facilities, data discovery facilities, extract, transform and load (ETL) facilities, and related data integration facilities.

"Enterprise Java Bean (EJB)" shall include the server-side component architecture for the J2EE platform. EJBs support rapid and simplified development of distributed, transactional, secure and portable Java applications. EJBs support a container architecture that allows concurrent consumption of messages and provide support for distributed transactions, so that database updates, message processing, and connections to enterprise systems using the J2EE architecture can participate in the same transaction context.

"JMS" shall mean the Java Message Service, which is an enterprise message service for the Java-based J2EE enterprise architecture.

"JCA" shall mean the J2EE Connector Architecture of the J2EE platform described more particularly below.

"Real time" as used herein, shall include periods of time that approximate the duration of a business transaction or business and shall include processes or services that occur during a business operation or business process, as opposed to occurring off-line, such as in a nightly batch processing operation. Depending on the duration of the business process, real time might include seconds, fractions of seconds, minutes, hours, or even days.

"Business process," "business logic" and "business transaction" as used herein, shall include any methods, service, operations, processes or transactions that can be performed by a business, including, without limitation, sales, marketing, fulfillment, inventory management, pricing, product design, professional services, financial services, administration, finance, underwriting, analysis, contracting, information technology services, data storage, data mining, delivery of information, routing of goods, scheduling, communications, investments, transactions, offerings, promotions, advertisements, offers, engineering, manufacturing, supply chain management, human resources management, data processing, data integration, work flow administration, software production, hardware production, development of new products, research, development, strategy functions, quality control and assurance, packaging, logistics, customer relationship management, handling rebates and returns, customer support, product maintenance, telemarketing, corporate communications, investor relations, and many others.

"Service oriented architecture (SOA)", as used herein, shall include services that form part of the infrastructure of a business enterprise. In the SOA, services can become building blocks for application development and deployment, allowing rapid application development and avoiding redundant code. Each service embodies a set of business logic or business rules that can be blind to the surrounding environment, such as the source of the data inputs for the service or the targets for the data outputs of the service. More details are provided below.

"Metadata," as used herein, shall include data that brings context to the data being processed, data about the data, information pertaining to the context of related information, information pertaining to the origin of data, information pertaining to the location of data, information pertaining to the meaning of data, information pertaining to the age of data, information pertaining to the heading of data, information pertaining to the units of data, information pertaining to the field of data, information pertaining to any other information relating to the context of the data.

"WSDL" or "Web Services Description Language" as used herein, includes an XML format for describing network services (often web services) as a set of endpoints operating on messages containing either document-oriented or procedure-oriented information. The operations and messages are described abstractly, and then bound to a concrete network protocol and message format to define an endpoint. Related concrete endpoints are combined into abstract endpoints (services). WSDL is extensible to allow description of endpoints and their messages regardless of what message formats or network protocols are used to communicate.

DETAILED DESCRIPTION

A variety of EAI and ETL tools exist, each with particular strengths and weaknesses. As a given user's needs evolve, the user may desire to move from using one tool to using another. A problem for such a user is that the user may have devoted significant time and resources to the development of data integration jobs using one tool, the benefit of which could be lost if the user switches to a different tool that does not use that tool. However, converting data integration jobs has to date required very extensive coding efforts. Thus, a need exists for improved methods and systems for converting data integration jobs that use one ETL or EAI tool into data integration jobs that use a different ETL or EAI tool.

Figure 1:
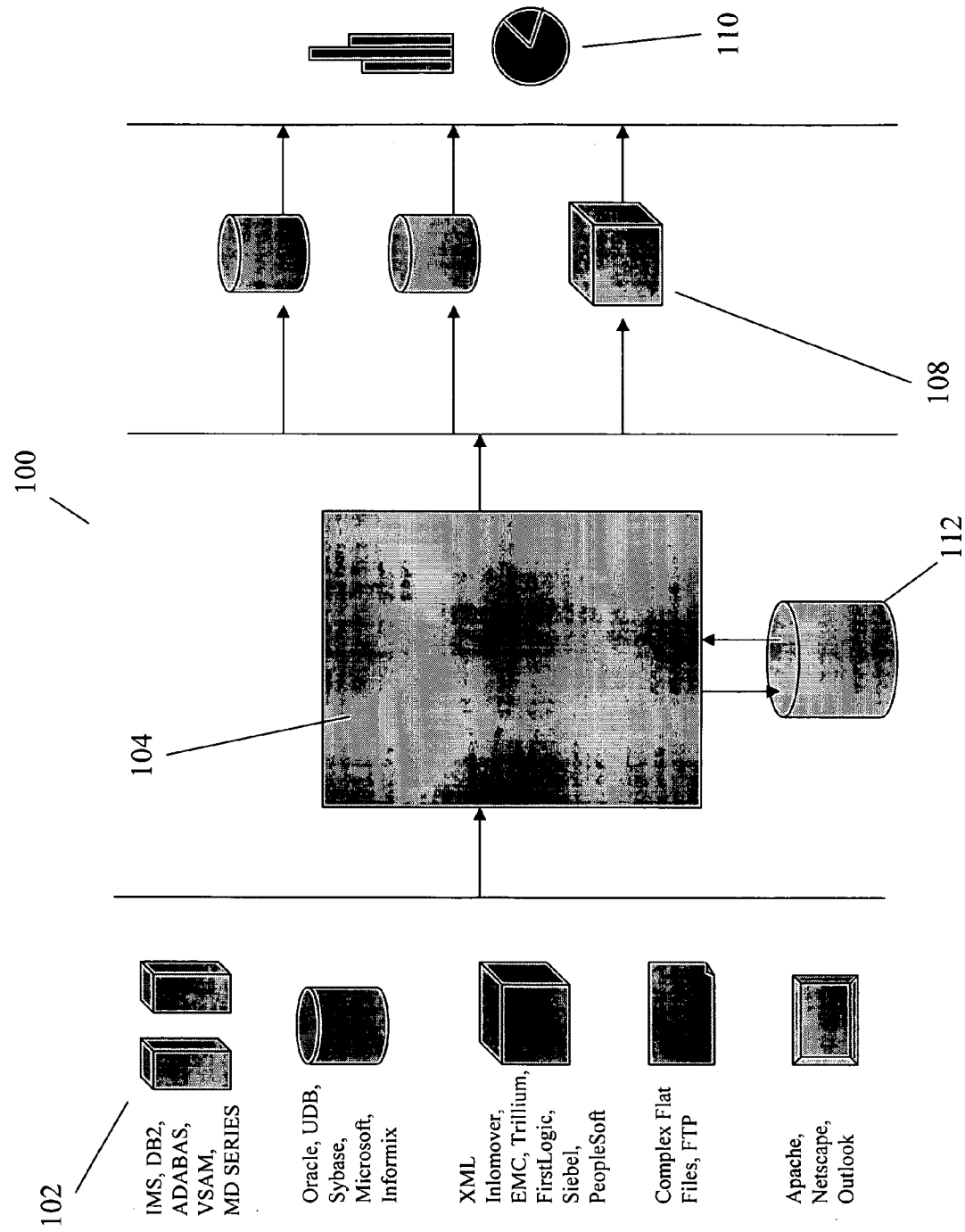
FIG. 1 is a schematic diagram of a business enterprise with a plurality of business processes, each of which may include a plurality of different computer applications and data sources.

FIG. 1 represents a platform 100 for facilitating integration of various data of a business enterprise. The platform includes a plurality of business processes, each of which may include a plurality of different computer applications and data sources. In this embodiment, the platform includes several data sources 102. These data sources may include a wide variety of data sources from a wide variety of physical locations. For example, the data source may include systems such as IMS, DB2, ADABAS, VSAM, MD Series, Oracle, UDB, Sybase, Microsoft, Informix, XML, Inlomover, EMC, Trillium, First Logic, Siebel, PeopleSoft, complex flat files, FTP files, Apache, Netscape, Outlook or other systems or sources that provide data to the business enterprise. The data sources 102 may come from various locations or they may be centrally located. The data supplied from the data sources 102 may come in various forms and have different formats that may or may not be compatible with one another.

The platform illustrated in FIG. 1 also includes a data integration system 104. The data integration system 104 may perform a number of functions to be described in more detail below. The data integration system may, for example, facilitate the collection of data from the data sources 102 as the result of a query or retrieval command the data integration system 104 receives. The data integration system 104 may send commands to one or more of the data sources 102 such that the data source(s) provides data to the data integration system 104. Since the data received may be in multiple formats including varying metadata, the data integration system 104 may reconfigure the received data such that it can be later combined for integrated processing.

The platform also includes several retrieval systems 108. The retrieval systems 108 may include databases or processing platforms used to further manipulate the data communicated from the data integration system 108. For example, the data integration system 108 may cleanse, combine, transform or otherwise manipulate the data it receives from the data sources 102 such that another system 108 can used the processed data to produce reports 110 useful to the business. The reports 110 may be used to report data associations, answer complex queries, answer simple queries, or form other reports useful to the business or user.

The platform may also include a database or data base management system 112. The database 112 may be used to store information temporally, temporarily, or for permanent or long-term storage. For example, the data integration system 104 may collect data from one or more data sources 102 and transform the data into forms that are compatible with one another or compatible to be combined with one another. Once the data is transformed, the data integration system 104 may store the data in the database 112 in a decomposed form, combined form or other form for later retrieval.

Figure 2:
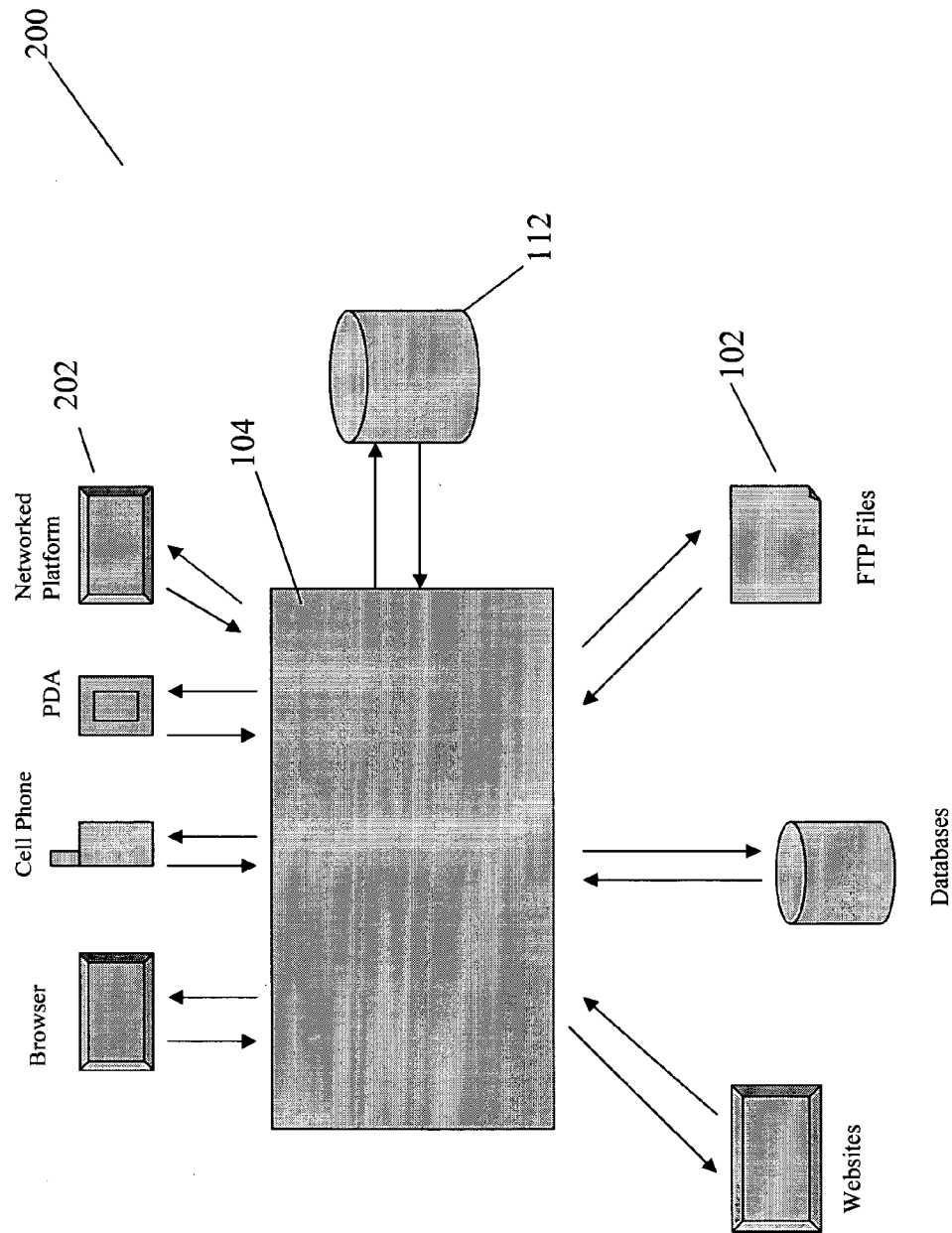
FIG. 2 is a schematic diagram showing data integration across a plurality of business processes of a business enterprise.

FIG. 2 is a schematic diagram showing data integration across a plurality of business processes of a business enterprise. In the illustrated embodiment, the data integration system facilitates the information flowing between user interface systems 202 and data sources 102. The data integration system may receive queries from the user interface systems 202 where the queries necessitate the extraction and possibly transformation of data residing in one or more of the data sources 102. For example, a user may be operating a PDA and make a request for information. The data integration system receiving the request may generate the required queries to access information from a website as well as another data source such as an FTP file site. The data from the data sources may be extracted and transformed such that it is combined in a format compatible with the PDA and then communicated to the PDA for user viewing and manipulating. In another embodiment, the data may have previously been extracted from the data sources and stored in a separate database 112. The data may have been stored in the database in a transformed condition or in its original state. In an embodiment, the data is stored in a transformed condition such that the data from the several sources can be combined in another transformation process. For example, a query from the PDA may be transmitted to the data integration system 104 and the data integration system may extract the information from the database 112. Following the extraction, the data integration system may transform the data into a combined format compatible with the PDA before sending to the PDA.

Figure 3:
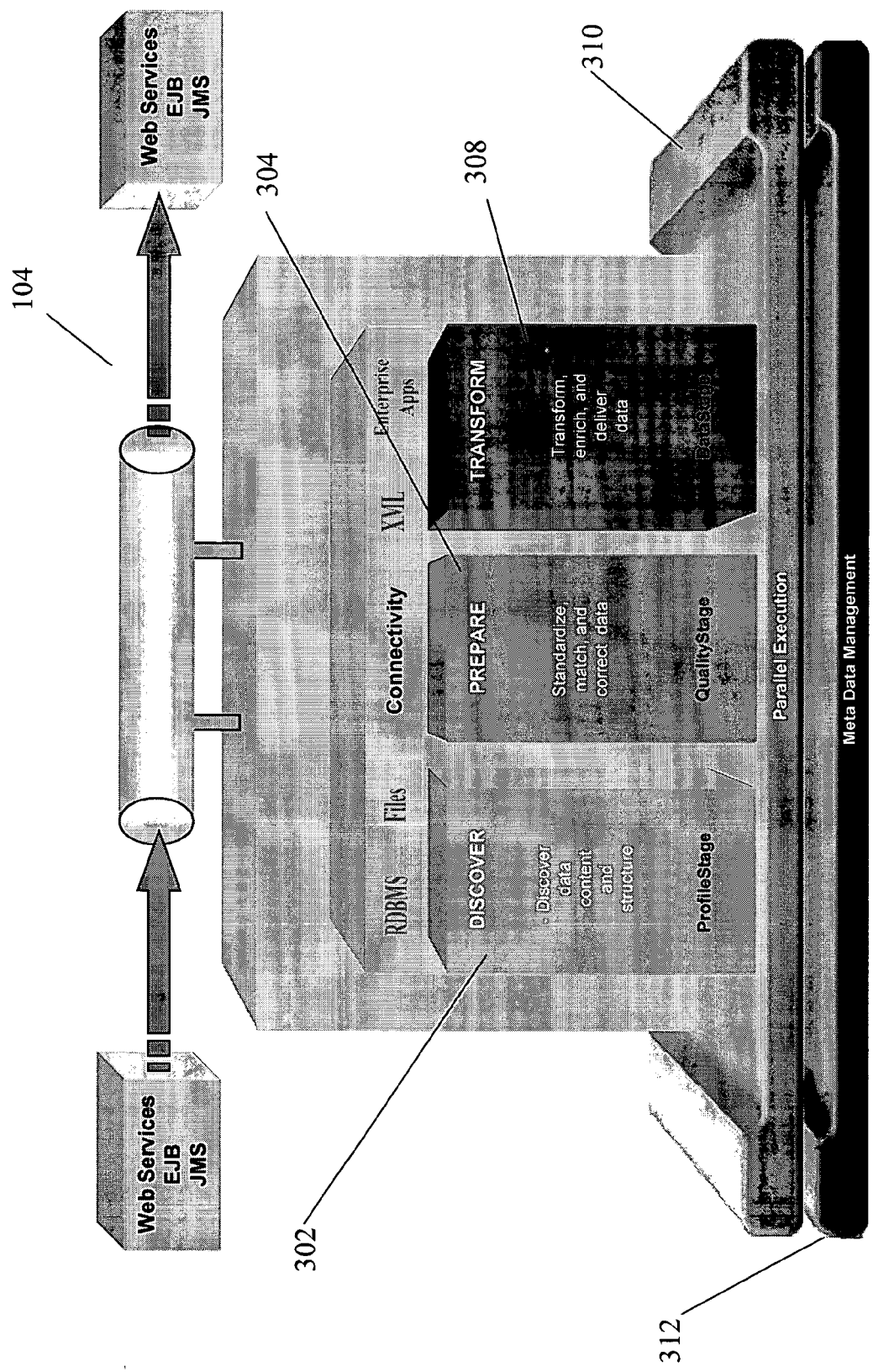
FIG. 3 is a schematic diagram showing an architecture for providing data integration for a plurality of data sources for a business enterprise.

FIG. 3 is a schematic diagram showing an architecture for providing data integration for a plurality of data sources for a business enterprise. An embodiment of a data integration system 104 may include a discover data stage 302 to perform, possibly among other processes, extraction of data from a data source. The data integration system 104 may also include a data preparation stage 304 where the data is prepared, standardized, matched, or otherwise manipulated to produce quality data to be later transformed. The data integration system may also include a data transformation system 308 to transform, enrich and deliver transformed data. The several stages an embodiment may be executed in a parallel manner 310 or in a serial or combination manner to optimize the performance of the system. The data integration system may also include a metadata management system 312 such that the data that is extracted and transformed maintains a high level of integrity.

Figure 4:
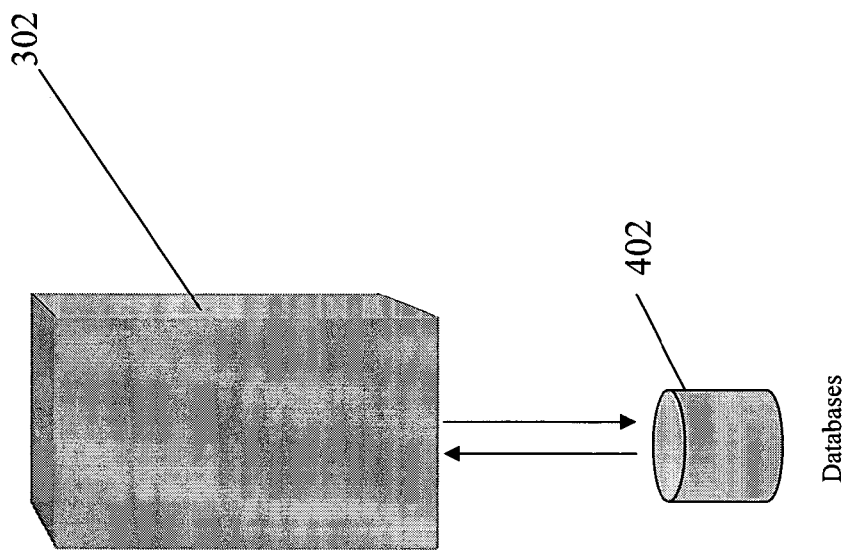
FIG. 4 is schematic diagram showing details of a discovery facility for a data integration job.

FIG. 4 is schematic diagram showing details of a discovery facility 302 for a data integration job. In this embodiment, the discovery facility 302 queries a data source such as a data base 402 to extract data. The database 402 provides the data to the discovery facility 302 and the discovery facility 302 facilitates the communication of the extracted data to the other portions of the data integration system 104. In an embodiment, the discovery facility 302 may extract data from many data sources to provide to the data integration system such that the data integration system can cleanse and consolidate the data into a central database or repository information manager.

Figure 5:
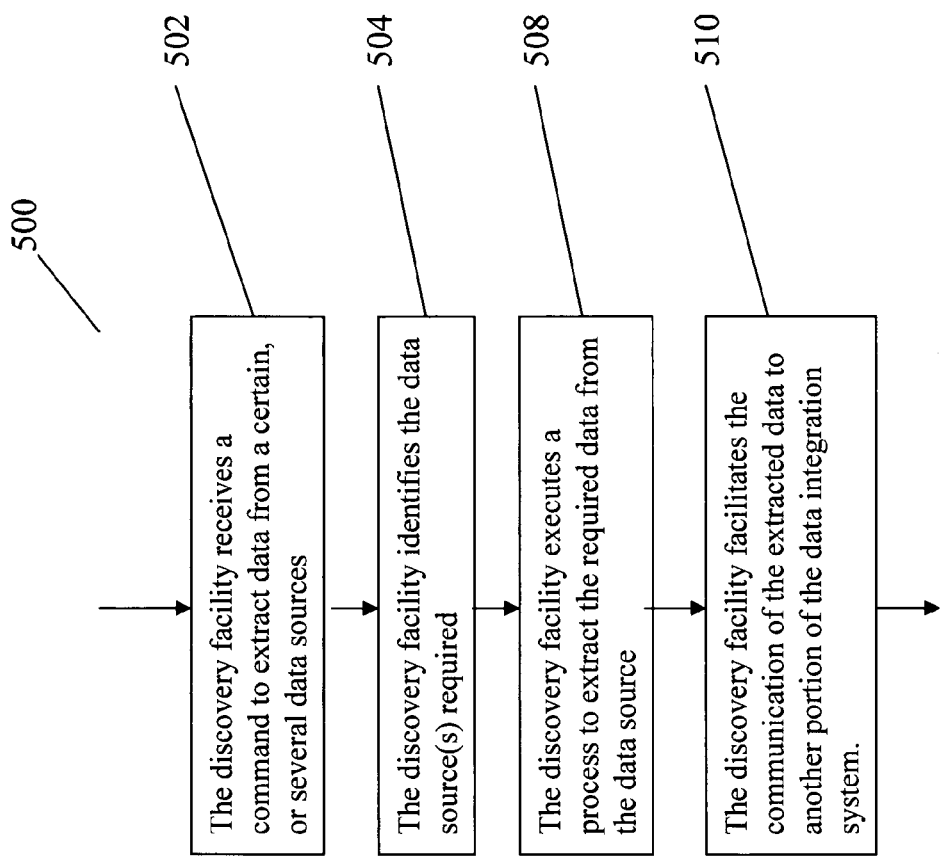
FIG. 5 is a flow diagram showing steps for accomplishing a discover step for a data integration process.

FIG. 5 is a flow diagram showing steps for accomplishing a discover step for a data integration process 500. In an embodiment the process steps include a first step 502 where the discovery facility receives a command to extract data from a certain, or several data sources. Following the receipt of an extraction command, the discovery facility may identify the appropriate data sources(s) where the data to be extracted resides 504. The data source(s) may or may not be identified in the command. If the data source(s) is identified, the discover facility may query the identified data source(s). In the event a data source(s) is not identified in the command, the discovery facility may determine the data source from the type of data requested from the data extraction command or from another piece of information in the command or after determining the association to other data that is required. For example, the query may be for a customer address and a first portion of the customer address data may reside in a first database while a second portion resides in a second database. The discovery facility may process the extraction command and direct its extraction activities to the two databases without further instructions in the command. Once the data source(s) is identified, the data facility may execute a process to extract the data 508. Once the data has been extracted, the discovery facility may facilitate the communication of the data to another portion of the data integration system 510.

Figure 6:
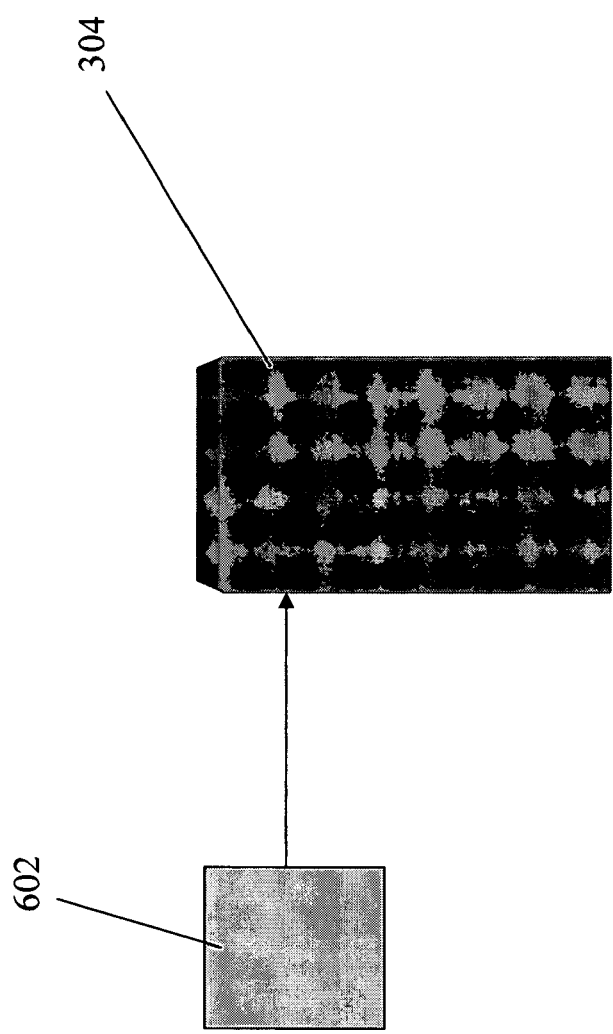
FIG. 6 is a schematic diagram showing a cleansing facility for a data integration process.

FIG. 6 is a schematic diagram showing a cleansing facility for a data integration process. Generally, data coming from several data sources may have inaccuracies and these inaccuracies, if left uncheck and uncorrected, could cause errors in the interpretation of the data ultimately produced by the data integration system. Company mergers and acquisitions or other consolidation of data sources can further compound the data quality issue by bringing new acronyms, new methods for the calculation of the fields and so forth. An embodiment as illustrated in FIG. 6 shows a cleansing facility 304 receiving data 602 from a data source. The data 602 may have come from one or more data sources and may have inconsistencies or inaccuracies. The cleansing facility 304 may provide for automated, semi-automated, or manual facilities for screening, correcting and or cleaning the data 602. Once the data passes through the cleansing facility 304 it may be communicated to another portion of the data integration system.

Figure 7:
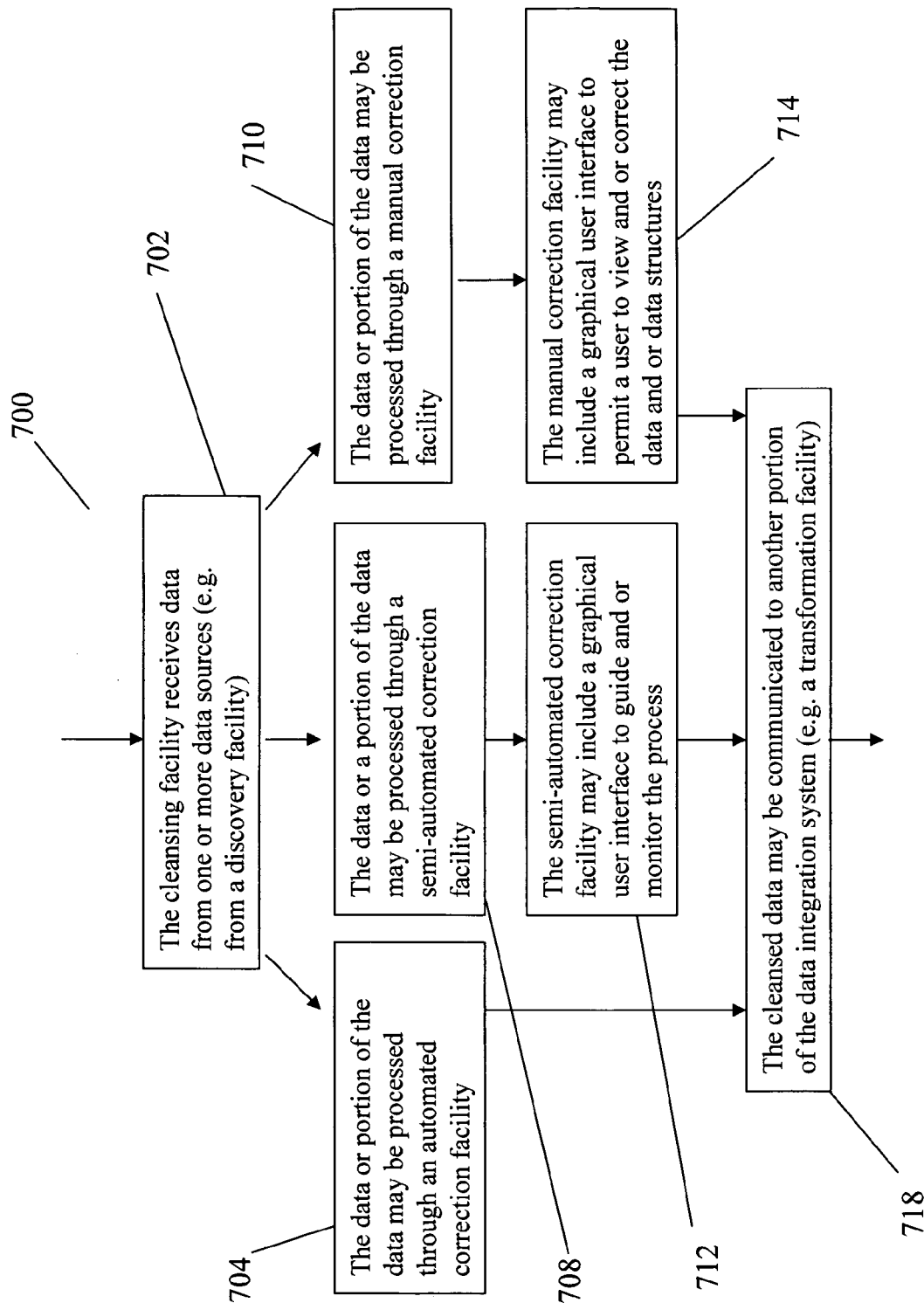
FIG. 7 is a flow diagram showing steps for a cleansing process for a data integration process.

FIG. 7 is a flow diagram showing steps for a cleansing process for a data integration process 700. In an embodiment, the cleansing process may include a step 702 for receiving data from one or more data sources (e.g. through a discovery facility). The process may include one or more methods of cleaning the data. For example, the process may include a step 704 for automatically cleaning the data. The process may include a step 708 for semi automatically cleaning the data. The process may include a step 710 for manually cleaning the data. The step 704 for automatically correcting or cleaning the data or a portion of the data may involve process steps, for example, involving automatic spelling correction, comparing data, comparing timeliness of the data, condition of the data, or other steps of comparison or correction. The step 708 for semi-automatically cleansing data may include a facility where a user interacts with some of the process steps and the system automatically performs cleaning tasks assigned. The semi-automated system may include a graphical user interface process step 712. The graphical user interface may be used by a user to facilitate the process for cleansing the data. The process may also include a step 710 for manually correcting the data. This step may also be provided with a user interface to facilitate the manual correction, consolidating and or cleaning the data 714. The cleansed data from the cleansing processes may be transmitted to another facility in the data integration system (e.g. the transformation facility) 718.

Figure 8:
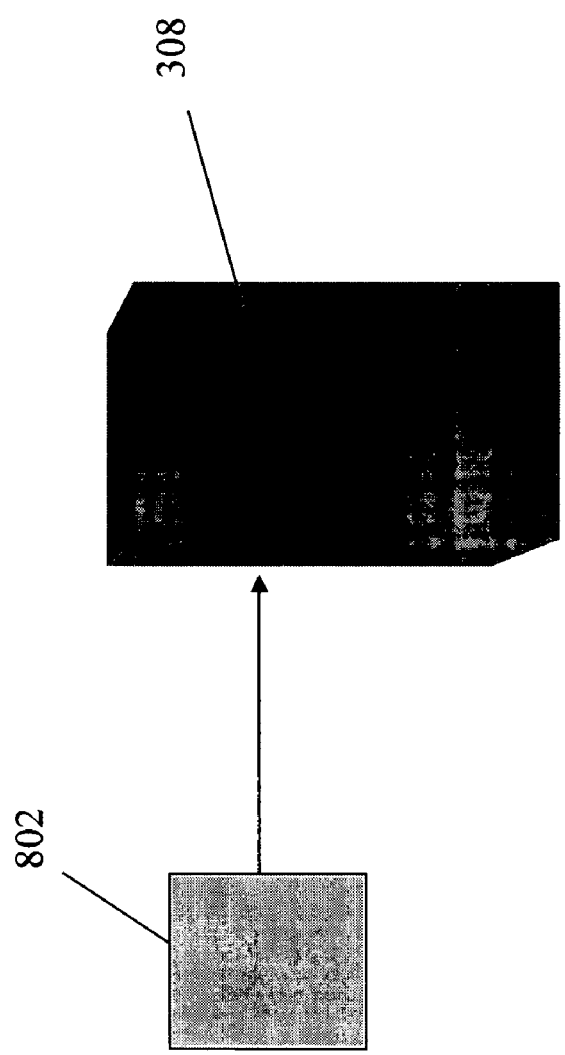
FIG. 8 is a schematic diagram showing a transformation facility for a data integration process.

FIG. 8 is a schematic diagram showing a transformation facility for a data integration process. In an embodiment, the transformation facility 308 may receive cleansed data 802 from a cleansing facility and perform transformation processes, enrich the data and deliver the data to another process in the data integration system or out of the data integration system to another facility where the integrated data may be viewed, used, further transformed or otherwise manipulated (e.g. to allow a user to mine the data or generate reports useful to the user or business).

Figure 9:
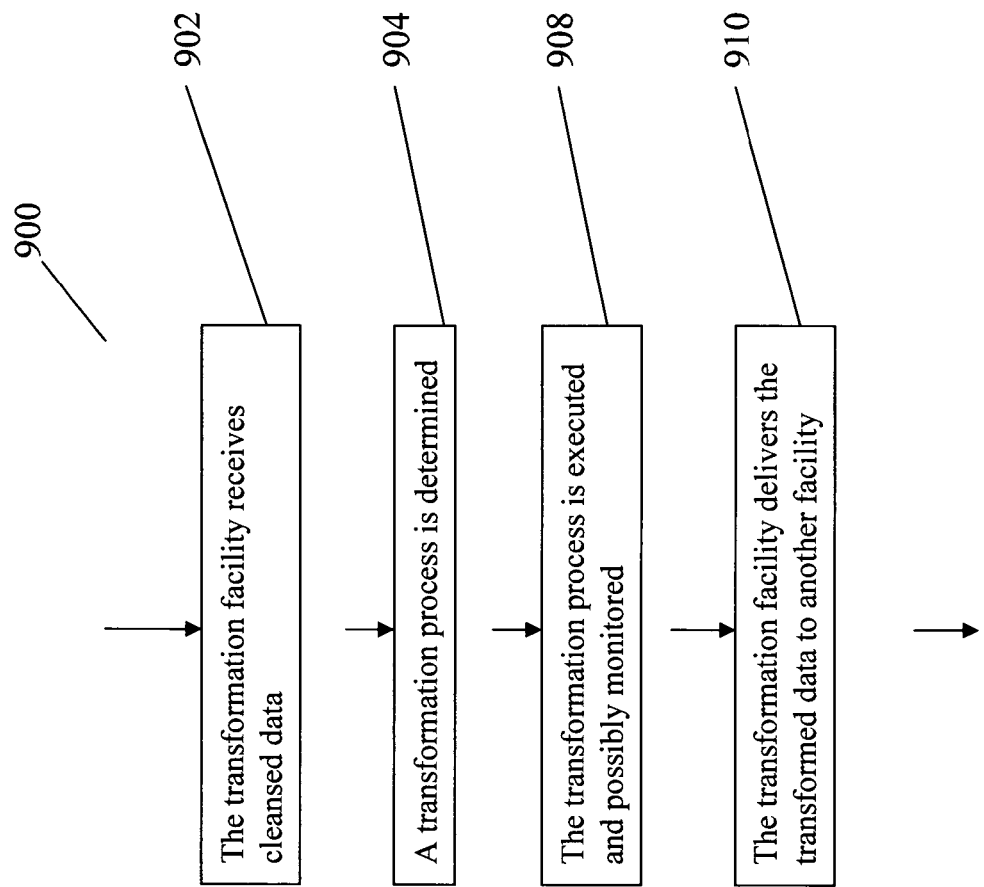
FIG. 9 is a flow diagram showing steps for transforming data as part of a data integration process.

FIG. 9 is a flow diagram showing steps for transforming data as part of a data integration process. In an embodiment, the transformation process 900 may include a step for receiving cleansed data (e.g. from a cleaning facility) 902. A step 904 of determination of the type of desired transformation required may be accomplished. Following the step 904 of determining the transformation process, the transformation process may be executed in step 908. The transformed data may then be transmitted to another facility in step 910.

Figure 10:
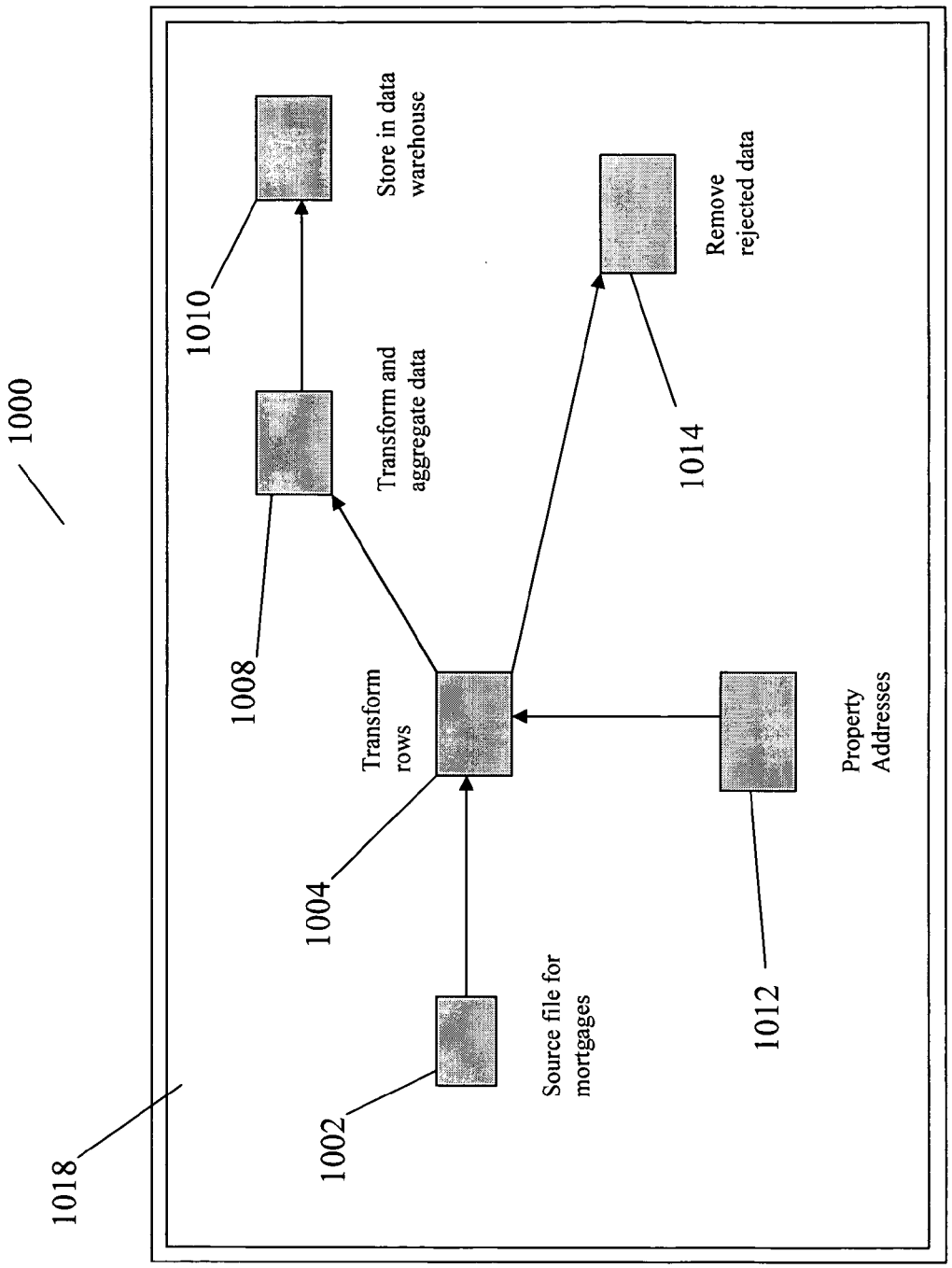
FIG. 10 illustrates a flow diagram showing the steps of a transformation process for an example process.

FIG. 10 illustrates a flow diagram showing the steps of a transformation process for an example process 1000. As an example, the business enterprise may want to generate a report concerning certain mortgages. The mortgage balance information may reside in a database 1002 and the personal information such as address of the property information may reside in another database 1012. A graphical user interface as illustrated as 1018 may be used to set the transformation process up. For example, the user may select representations of the two databases 1002 and 1012 and drop and click them into position on the interface. Then the user may select a row transformation process to prepare the rows for combination 1004. The user may drop and click process flow directions such that the data from the databases flows into this process 1004. Following the row transformation process 1004, the user may elect to remove any unmatched files and send them to storage 1014. The user may also elect to take the remaining matching files and send them through another transformation and aggregation process to combine the data from the two databases 1008. Finally, the user may decide to send the aggregate data to a storage facility 1010. Once the user sets this process up using the graphical user interface, the user may run the transformation process.

Figure 11:
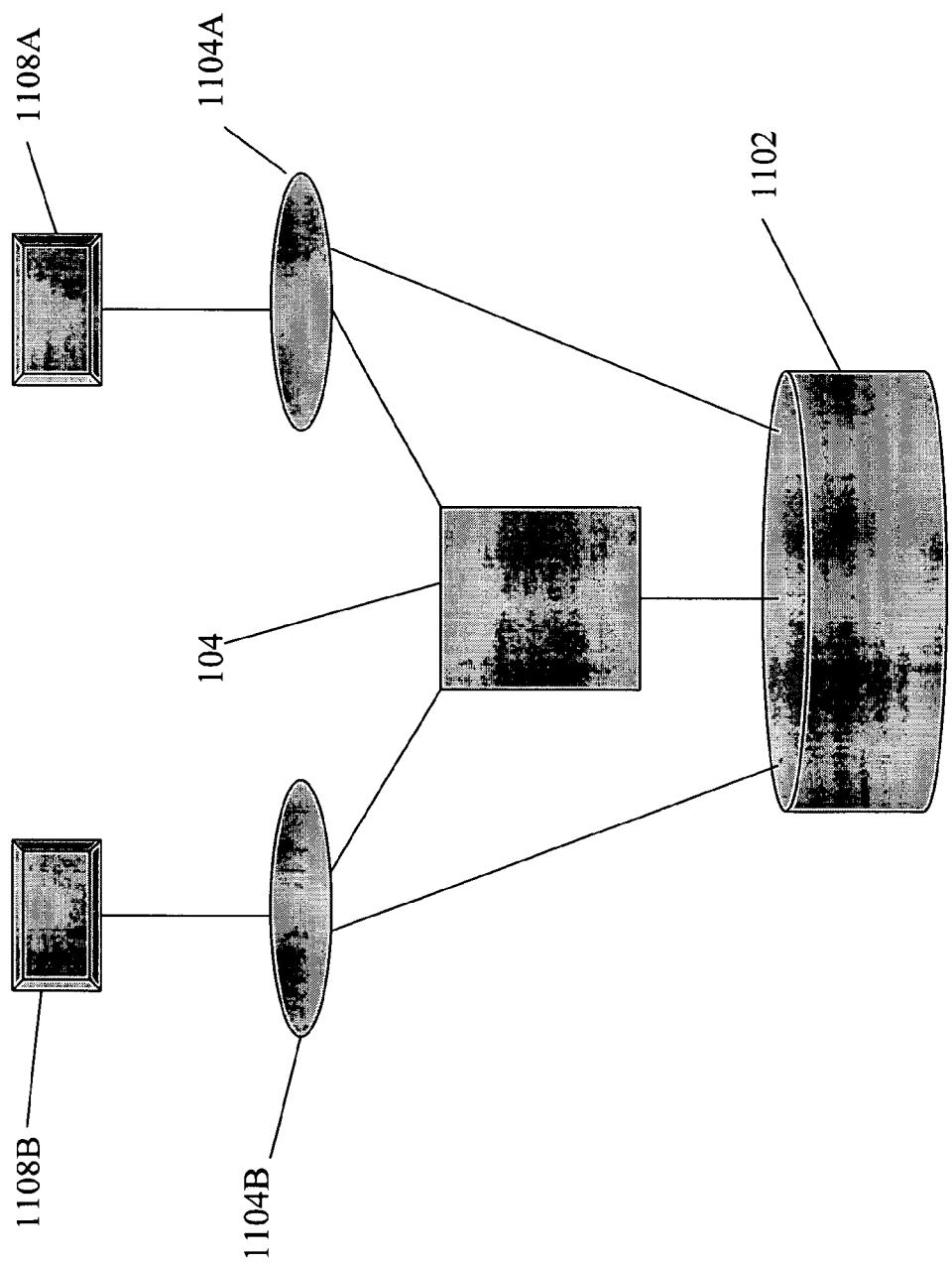
FIG. 11 is a schematic diagram showing a plurality of connection facilities for connecting a data integration process to other processes of a business enterprise.

FIG. 11 is a schematic diagram showing a plurality of connection facilities for connecting a data integration process to other processes of a business enterprise. In an embodiment, the data integration system 104 may be associated with an integrated storage facility 1102. The integrated storage facility 1102 may contain data that has been extracted from several data sources and processed through the data integration system 104. The integrated data may be stored in a form that permits one or more computer platforms 1108A and 1108B to retrieve data from the integrated data storage facility 1102. The computing platforms 1108A and 1108B may request data from the integrated data facility 1102 through a translation engine 1104A and 1104B. For example, each of the computing platforms 1108A and 1108B may be associated with a separate translation engine 1104A and 1104B. The translation engine 1104A and 1104B may be adapted to translate the integrated data from the storage facility 1102 into a form compatible with the associated computing platform 1108A and 1108B. In an embodiment, the translation engines 1104A and 1104B may also be associated with the data integration system 104. This association may be used to update the translation engines 1104A and 1104B with required information. This process may also involve the handling of metadata which will be further defined below.

Figure 12:
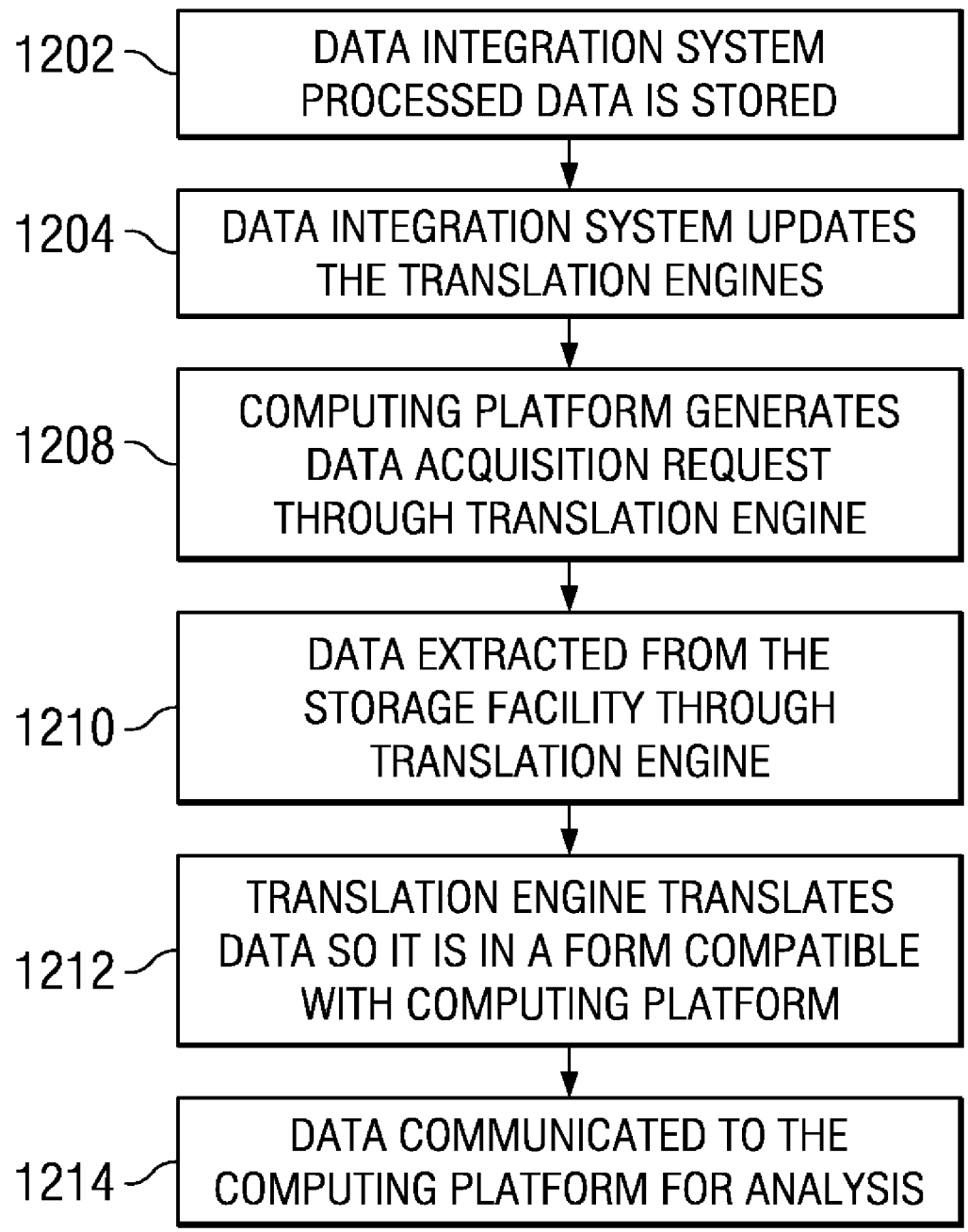
FIG. 12 is a flow diagram showing steps for connecting a data integration process to other processes of a business enterprise.

FIG. 12 is a flow diagram showing steps for connecting a data integration process to other processes of a business enterprise. In an embodiment, the process may include step 1202 where the data integration system stores data it has processed in a central storage facility. The data integration system may also update one or more translation engines in step 1204. The illustration in FIG. 12 shows these processes occurring in series, but they may also happen in a parallel process in an embodiment. The process may involve a step 1208 where a computing platform generates a data request and the data request is sent to an associated translation engine. Step 1210 may involve the translation engine extracting the data from the storage facility. The translation engine may also translate the data into a form compatible with the computing platform in step 1212 and the data may then be communicated to the computing platform in step 1214.

Figure 13:
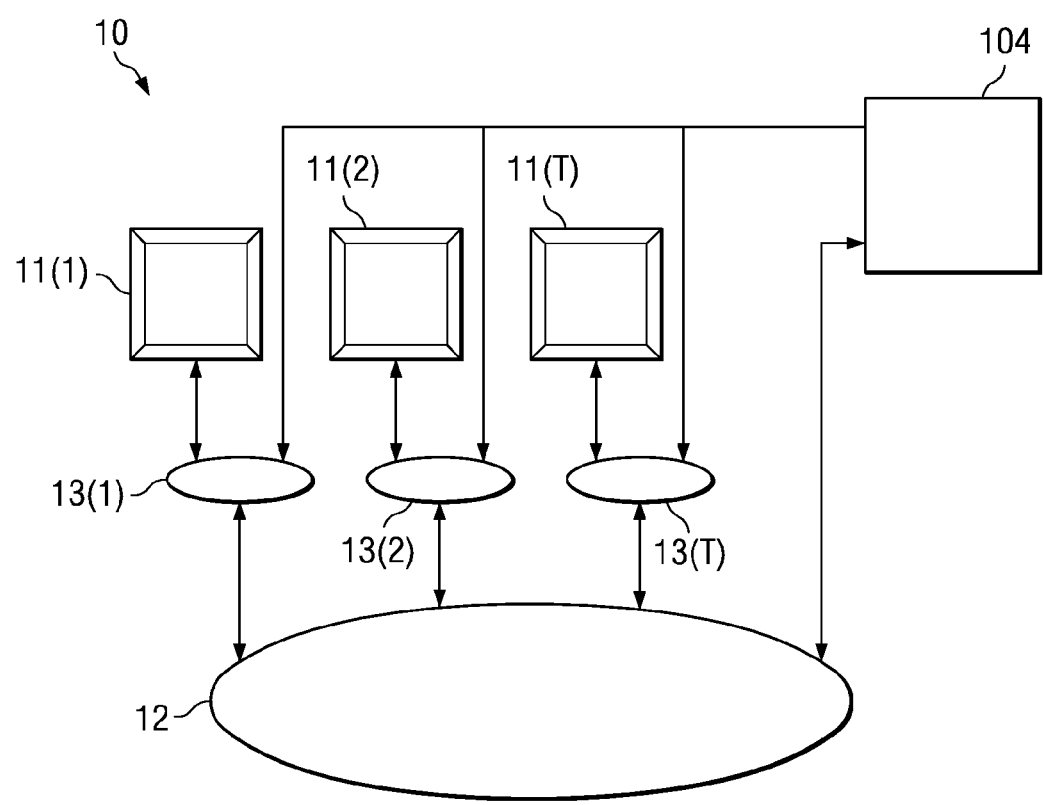
FIG. 13 is a functional block diagram of an enterprise computing system, including an information repository.

FIG. 13 is a functional block diagram of an enterprise computing system 10 including an information repository constructed in accordance with the invention. With reference to FIG. 13, the enterprise computing system 10 includes a plurality of "tools" 11(1) through 11(T) (generally identified by reference numeral **11(*t*)), which access a common data structure, termed herein a repository information manager ("RIM") 12 through respective translation engines 13(1) through 13(T) (generally identified by reference numeral 13(*t*)). The tools 11(*t*) generally comprise, for example, diverse types of database management systems and other applications programs which access shared data which is stored in the RIM 12. The database management systems and applications programs generally comprise computer programs that are executed in conventional manner by digital computer systems. In addition, in one embodiment the translation engines 13(*t*) comprise computer programs executed by digital computer systems (which may be the same digital computer systems on which their respective tools 11(*t*) are executed, and the RIM 12 is also maintained on a digital computer system. The tools 11(*t*), RIM 12 and translation engines 13(*t*) may be processed and maintained on a single digital computer system, or alternatively they may be processed and maintained on a number of digital computer systems which may be interconnected by, for example, a network (not shown), which transfers data access requests, translated data access requests, and responses between the computer systems on which the tools 11(*t*) and translation engines 13(*t*) are processed and which maintain the RIM 12**.

While they are being processed, the tools **11(*t*) may generate data access requests to initiate a data access operation, that is, a retrieval of data from or storage of data in the RIM 12. On the other hand, the data will be stored in the RIM 12 in an "atomic" data model and format which will be described below. Typically, the tools 11(*t*) will "view" the data stored in the RIM 12 in a variety of diverse characteristic data models and formats, as will be described below, and each translation engine 13(*t*), upon receiving a data access request, will translate the data between respective tool's characteristic model and format and the atomic model format of RIM 12 as necessary. For example, during an access operation of the retrieval type, in which data items are to be retrieved from the RIM 12, the translation engine 13(*t*) will identify one or more atomic data items in the RIM 12 that jointly comprise the data item to be retrieved in response to the access request, and will enable the RIM 12 to provide the atomic data items to the translation engine 13(*t*). The translation engine 13(*t*), in turn, will aggregate the atomic data items that it receives from the RIM 12 into one or more data item(s) as required by the tool's characteristic model and format, and provide the aggregated data item(s) to the tool 11(*t*) which issued the access request. Contrariwise, during an access request of the data storage type, in which data in the RIM 12 is to be updated or new data is to be stored in the RIM 12, the translation engine 13(*t*) receives the data to be stored in the tool's characteristic model and format, translates the data into the atomic model and format for the RIM 12, and provides the translated data to the RIM 12 for storage. If the data storage access request enables data to be updated, the RIM 12 will substitute the newly-supplied data from the translation engine 13(*t*) for the current data. On the other hand, if the data storage access request represents new data, the RIM 12 will add the data, in the atomic format as provided by the translation engine 13(*t*)**, to the current data which it is maintaining.

The enterprise computing system 10 further includes a data integration system 104, which maintains and updates the atomic format of the RIM 12 and the translation engines **13(*t*) as tools 11(*t*) are added to the system 10. It will be appreciated that certain operations performed by the data integration system 104 may be under control of an operator (not shown). Briefly, when the system 10 is initially established or when one or more tools 11(*t*) is added to the system 10** whose data models and formats differ from the current data models and formats, the data integration system 104 determines the differences and modifies the data model and format of the data in the RIM 12 to accommodate the data model and format of the new tool 11(t). In that operation, the data integration system 104 will (in one embodiment, under control of an operator) determine an atomic data model which is common to the data models of any tools 11(t) which are currently in the system 10 and the tool 11(t) to be added, and enable the data model of the RIM 12 to be updated to the new atomic data model. In addition, the data integration system 104 will update the translation engines 13(t) associated with any tools 11(t) currently in the system based on the updated atomic data model of the RIM 12, and will also generate a translation engine 13(t) for the new tool 11(t) to be added to the system. Accordingly, the data integration system 104 ensures that the translation engines 13(t) of all tools 11(t), including any tools 11(t) currently in the system as well as a tool 11(t) to be added conform to the atomic data models and formats of the RIM 12 when they (that is, the atomic data models and formats) of the RIM are changed to accommodate addition of a tool 11(t) in the enterprise computing system 10.

Before proceeding further, it would be helpful to provide a specific example illustrating characteristic data models and formats which may be useful for various tools 11(t) and an atomic data model and format useful for the RIM 12. It will be appreciated that the specific characteristic data models and formats for the tools 11(t) will depend on the particular tools 11(t) which are present in a specific enterprise computing system 10. In addition, it will be appreciated that the specific atomic data models and formats for RIM 12 will depend on the atomic data models and formats which are used for tools 11(t), and will effectively represent the aggregate or union of the finest-grained elements of the data models and format for all of the tools 11(t) in the system 10.

Translation engines are one method of handling the data and metadata in an enterprise integration system. In an embodiment, the translation may be a custom constructed bridge where the bridge is constructed to translate information from one computing platform to another. In another embodiment, the translation may use a least common factor method where the data that is passed through is that data that is compatible with both computing systems. In yet a further embodiment, the translation may be performed on a standardized facility such that all computing platforms that conform to the standards can communicate and extract data through the standardized facility. There are many other methods of handling data and its associated metadata that are contemplated and envisioned to function with a business enterprise system according the principles of the present invention.

Figure 14:
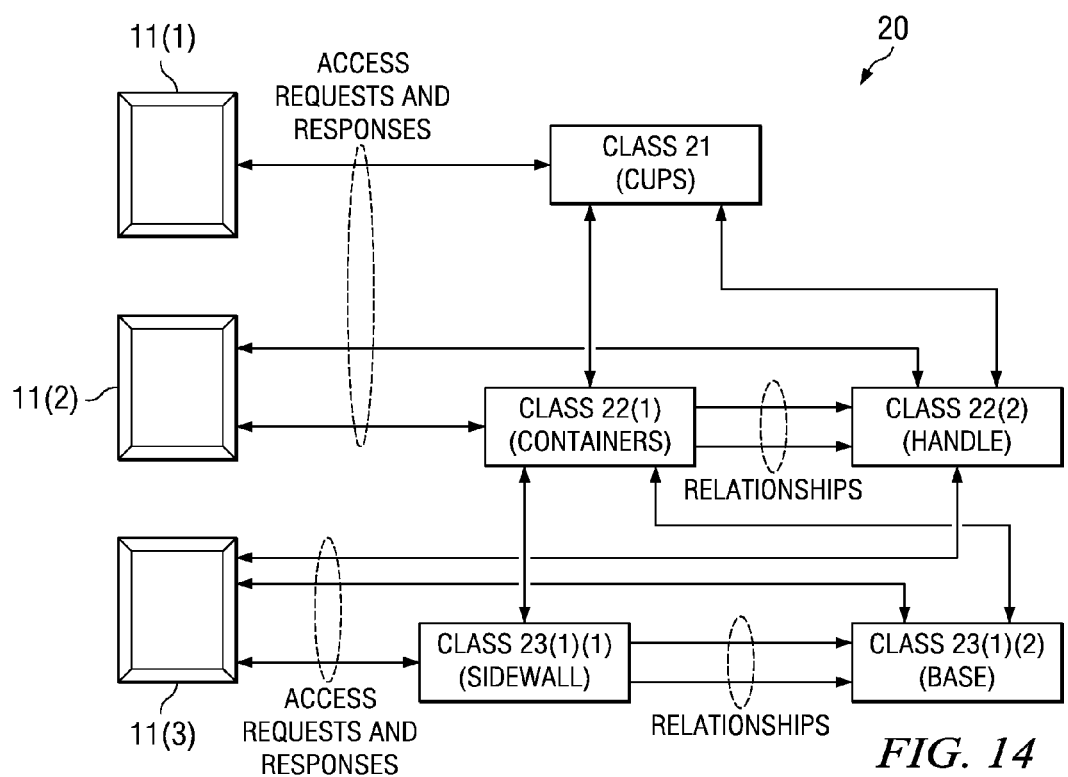
FIG. 14 is illustrates an example of managing metadata in a data integration job.

FIG. 14 is illustrates an example of managing metadata in a data integration job. The specific example, which will be described in connection with FIG. 14 will be directed to a design database for designs for, for example, a particular type of product, in particular, identified as a "cup" such as a drinking cup or other vessel for holding liquids which may be used for manufacturing or otherwise fabricating the physical wares. Using that illustrative database, the tools may be used to, for example, add cup design elements to RIM 12, modify cup design elements stored in the RIM 12, and re-use and associate particular cup design elements in the RIM 12 with a number of cup designs, with the RIM 12 and translation engines 13(t) providing a mechanism by which a number of different tools 11(t) can share the elements stored in the RIM 12 without having to agree on a common schema or model and format arrangement for the elements.

Continuing with the aforementioned example, in one particular embodiment, the RIM 12 stores data items in an "entity-relationship" format, with each entity being a data item and relationships reflecting relationships among data items, as will be illustrated below. The entities are in the form of "objects" which may, in turn, be members or instances of classes and subclasses, although it will be appreciated that other models and formats may be used for the RIM 12. FIG. 14 depicts an illustrative class structure 20 for the "cup" design database. With reference to FIG. 14, the illustrative class structure 20 includes a main class 21, two sub-classes 22(1) and 22(2) which depends from the main class 21, and two lower-level sub-classes 23(1)(1) and 23(1)(2) both of which depend from subclass 22(1). Using the above-referenced example, if the main class 21 represents data for "cup" as a unit or entity as a whole, the two upper-level subclasses 22(1) and 22(2) may represent, for example, "container" and "handle" respectively, where the "container" subclass is for data items for the container portion of cups in the inventory, and the "handle" subclass is for data items for the handle portion of cups in the inventory. Each data item in class 21, which is termed an "entity" in the entity-relationship format, may represent a specific cup or specific type of cup in the inventory, and will have associated attributes which define various characteristics of the cup, with each attribute being identified by a particular attribute identifier and data value for the attribute.

Similarly, each data item in classes 22(1) and 22(2), which are also "entities" in the entity-relationship format, may represent container and handle characteristics of the specific cups or types of cups in the inventory. More specifically, each data item in class 22(1) will represent the container characteristic of a cup represented by a data item in class 21, such as color, sidewall characteristics, base characteristics and the like. In addition, each data item in class 22(2) will represent the handle characteristics of a cup that is represented by a data item in the class 21, such as curvature, color position and the like. In addition, it will be appreciated that there may be one or more relationships between the data items in class 22(1) and the data items in class 22(2), which correspond to the "relationship" in the entity-relationship format, which serves to link the data items in the classes 22(1) and 22(2). For example, there may be a "has" relationship, which signifies that a specific container represented by a data item in class 22(1) "has" a handle represented by a data item in class 22(2), which may be identified in the "relationship." In addition, there may be a "number" relationship, which signifies that a specific container represented by a data item in class 22(1) has a specific number of handles represented by the data item in class 22(2) specified by the "has" relationship. Further, there may be a "position" relationship, which specifies the position (s) on the container represented by a data item in class 22(1) at which the handle(s) represented by the data item in class 22(2) specified by the "has" relationship are mounted. It will be appreciated that the "number" and "position" relationships may be viewed as being subsidiary to, and further defining, the "has" relationship. Other relationships will be apparent to those skilled in the art.

Similarly, the two lower-level subclasses 23(1)(1) and 23(1)(2) may represent various elements of the cups or types of cups in the inventory. In the illustration depicted in FIG. 14, the subclasses 23(1)(1) and 23(1)(2) may, in particular "sidewall type" and "base type" attributes, respectively. Each data item in subclasses 23(1)(1) and 23(1)(2), which are also "entities" in the entity-relationship format, may represent sidewall and base handle characteristics of the containers (represented by entities in subclass 22(1) of specific cups or types of cups in the inventory. More specifically, each data item in class 23(1)(2) will represent the sidewall characteristic of a container represented by a data item in class 22(1). In addition, each data item in subclass 23(1)(2) will represent the characteristics of the base of a cup that is represented by a data item in the class 21 In addition, it will be appreciated that there may be one or more relationships between the data items in subclass 23(1)(1) and the data items in class 23(1)(2), which correspond to the "relationship" in the entity-relationship format, which serves to link the data items in the classes 23(1)(1) and 23(1)(2). For example, there may be a "has" relationship, which signifies that a specific container represented by a data item in subclass 23(1)(1) "has" a base represented by a data item in class 23(1)(2), which may be identified in the "relationship." Other relationships will be apparent to those skilled in the art.

It will be appreciated that certain ones of the tools depicted in FIG. 13, such as tool 11(1) as shown in FIG. 14, may have characteristic data models and format which view the cups in the above illustration as entities in the class 21. That is, a data item is a "cup" and characteristics of the "cup" which are stored in the RIM 12 are attributes and attribute values for the cup design associated with the data item. For such a view, in an access request of the retrieval type, such tools 11(t) will provide their associated translation engines 13(t) with the identification of a "cup" data item in class 21 to be retrieved, and will expect to receive at least some of the data item's attribute data, which may be identified in the request, in response. Similarly, in response to an access request of the storage type, such tools will provide their associated translation engines 13(t) with the identification of the "cup" data item to be updated or created and the associated attribute information to be updated or to be used in creating a new data item.

On the other hand, others of the tools, such as tool 11(2) as shown in FIG. 14, may have characteristic data models and formats which view the cups separately as the container and handle entities in classes 22(1) and 22(2). In that view, there are two data items, namely "container" and "handle" associated with each cup, each of which has attributes that describe the respective container and handle. In that case, each data item each may be independently retrievable and updateable and new data items may be separately created for each of the two classes. For such a view, the tools 11(t) will, in an access request of the retrieval type, provide their associated translation engines 13(t) with the identification of a container or a handle to be retrieved, and will expect to receive the data item's attribute data in response. Similarly, in response to an access request of the storage type, such tools 11(t) will provide their associated translation engines 13(t) with the identification of the "container" or "handle" data item to be updated or created and the associated attribute data. Accordingly, these tools 11(t) view the container and handle data separately, and can retrieve, update and store container and handle attribute data separately.

Figure 15:
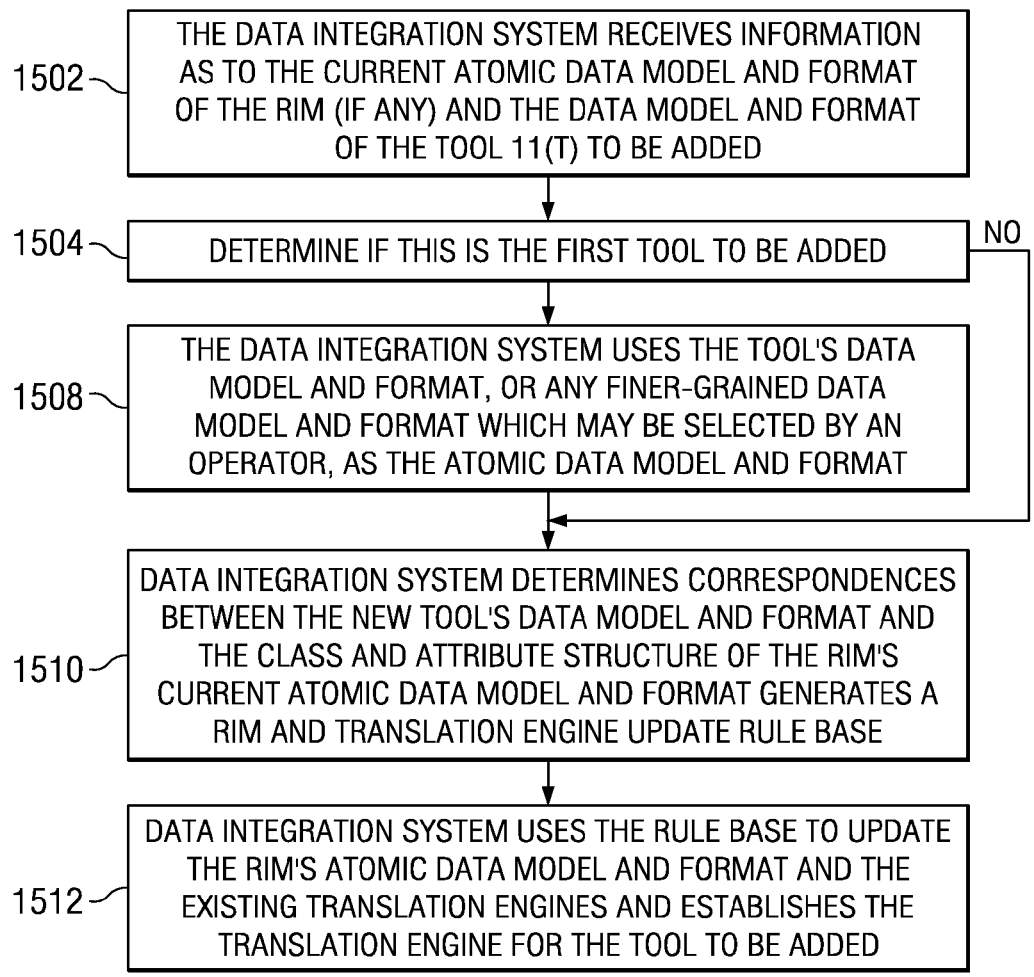
FIG. 15 is a flow diagram showing additional steps for using a metadata facility in connection with a data integration job.

FIG. 15 is a flow diagram showing additional steps for using a metadata facility in connection with a data integration job. In addition, others of the tools, such as tool 11(t) shown in FIG. 15, may have characteristic formats which view the cups separately as sidewall, base and handle entities in classes 23(1)(1), 23(1)(2) and 22(2). In that view, there are three data items, namely, "sidewall," "base" and "handle" associated with each cup, each of which has attributes which describe the respective sidewall, base and handle. In that case, each data item each may be independently retrievable, updateable and new data items may be separately created for each of the three classes 23(1)(1), 23(1)(2) and 22(2). For such a view, the tools 11(t) will, in an access request of the retrieval type, provide their associated translation engines 13(t) with the identification of a sidewall, base or a handle whose data item is to be retrieved, and will expect to receive the data item's attribute data in response. Similarly, in response to an access request of the storage type, such tools 11(t) will provide their associated translation engines 13(t) with the identification of the "sidewall," "base" or "handle" data item whose attribute(s) is (are) to be updated, or for which a data item is to be created, along with the associated data. Accordingly, these tools 11(t) view the cup's sidewall, base and handle data separately, and can retrieve, update and store container and handle data separately.

As described above, the RIM 12 stores data in an "atomic" data model and format. That is, with the class structure 20 for the "cup" design base as depicted in FIG. 14, the RIM 12 will store the data items in the most detailed format as required by the class structure. Accordingly, the RIM 12 will store data items as entities in the atomic format "sidewall," "base," and "handle," since that is the most detailed format for the class structure 20 depicted in FIG. 14. With the data in the RIM 12 stored in such an atomic format, the translation engines 13(t) which are associated with the tools 11(t) which view the cups as entities in class 21 will, in response to an access request related to a cup, translate the access request into three access requests, one for the "sidewall," one for the "base" and the last for the "handle" for processing by the RIM 12. For an access request of the retrieval type, the RIM 12 will provide the translation engine 13(t) with appropriate data items for the "sidewall," "base" and "handle" access requests. In addition, if a tool 11(t) uses a name for a particular attribute which differs from the name of the corresponding attribute used for the data items stored in the RIM 12, the translation engines 13(t) will translate the attribute names in the request to the attribute names as used in the RIM 12. The RIM 12 will provide the requested data items for each request, and the translation engine 13(t) will combine the data items from the RIM 12 into a single data item for transfer to the tool 11(t), in the process performing an inverse translation in connection with attribute name(s) in the data item(s) as provided by the RIM 12, to provide the tool 11(t) with data items using attribute name(s) used by the tool 11(t). Similarly, for an access request of the storage type, the translation engine 13(t) will generate, in response to the data item which it receives from the tool 11(t), storage requests for each of the sidewall, base and handle entities to be updated or generated, which it will provide to the RIM 12 for storage, in the process performing attribute name translation as required.

Similarly, the translation engines 13(t) which are associated with the tools 11(t) which view the cups as entities in classes 22(1))("container") and 22(2) ("handle") will, in response to an access request related to a container, translate the access request into two access requests, one for the "sidewall," and the other for the "base" for processing by the RIM 12, in the process performing attribute name translation as described above. For an access request of the retrieval type, the RIM 12 will provide the translation engine 13(t) with appropriate data items for the "sidewall" and "base" access requests, and the translation engine 13(t) will combine the two data items from the RIM 12 into a single data item for transfer to the tool 11(t), also performing attribute name translation as required. Similarly, for an access request of the storage type, the translation engine 13(t) will generate, in response to the data item which it receives from the tool 11(t), storage requests for each of the sidewall and base entities to be updated or generated, in the process performing attribute name translation as required, which it will provide to the RIM 12 for storage. It will be appreciated that the translation engines 13(t) associated with tools 11(t) which view the cups as entities in classes 22(1) and 22(3), in response to access requests related to a handle, need only perform attribute name translation, since the RIM 12 stores handle data in "atomic" format.

On the other hand, translation engines 13(*t*) which are associated with the tools 11(*t*) which view the cups as entities separately in classes 23(1)(1) ("sidewall"), 23(1)(2) ("base"), and 22(2) ("handle"), may, with RIM 12, need only perform attribute name translation, since these classes correspond to the atomic format of the RIM 12.

As noted above, the data integration system 104 operates to maintain and update the RIM 12 and translation engines 13(*t*) as tools 12(*t*) are added to the system 10 (FIG. 13). For example, if the RIM 12 is initially established based on the system 10 including a tool 11(1) which views the cups as entities in class 21, then the atomic data model and format of the RIM 12 will be based on that class. Accordingly, data items in the RIM 12 will be directed to the respective "cups" in the design base and the attributes associated with each data item may include such information as container, sidewall, base, and handle (not as separate data items, but as attributes of the "cup" data item), as well as color and so forth. In addition, the translation engine 13(1) which is associated with that tool 11(1) will be established based on the initial atomic format for RIM 12. If the RIM 12 is initially established based on a single such tool, based on identifiers for the various attributes as specified by that tool, and if additional such tools 11(*t*) (that is, additional tools 11(*t*) which view the cups as entities in class 21) are thereafter added for which identifiers of the various attributes differ, the translation engines 13(*t*) for such additional tools will be provided with correspondences between the attribute identifiers as used by their respective tools and the attribute identifiers as used by the RIM 12 where the attributes for the additional tools correspond to the original tool's attributes but are identified differently. It will be appreciated that, if an additional tool has an additional attribute which does not correspond to an attribute used by a tool previously added to the system 10 and in RIM 12, the attribute can merely be added to the data items in the RIM 12, and no change will be necessary to the pre-existing translation engines 13(*t*) since the tools 11(*t*) associated therewith will not access the new attribute. Similarly, if a new tool 11(*t*) has an additional class for data which is not accessed by the previously-added tools in the system 10, the class can merely be added and no change will be necessary to the pre-existing translation engines 13(*t*) since the tools 11(*t*) associated therewith will not access data items in the new class.

If, after the RIM 12 has been established based on tools 11(*t*) for which the cups are viewed as entities in class 21, a tool 11(*t*) is added to the system 10 which views the cups as entities in classes 22(1) and 22(2), the data integration system 104 will perform two general operations. In one operation, the system 14 will determine a reorganization of the data in the RIM 12 so that the atomic data model and format will correspond to classes 22(1) and 22(2), in particular identifying attributes (if any) in each data item which are associated with class 22(1) and attributes (if any) which are associated with class 22(2). In addition, the system manager will establish two data items, one corresponding to class 22(1) and the other corresponding to class 22(2), and provide the attribute data for attributes associated with class 22(1) in the data item which corresponds to class 22(1) and the attribute data for attributes associated with class 22(2) in the data item which corresponds to class 22(2). After the data integration system 104 determines the new data item and attribute organization for the atomic format for the RIM 12, in the second general operation it will generate new translation engines 13(*t*) for the pre-existing tools 11(*t*) based on the new organization. In addition, the data integration system 104 will generate a translation engine 13(*t*) for the new tool 11(*t*) based on the attribute identifiers used by the new tool and the pre-existing attribute identifiers.

If a tool 11(*t*) is added to the system 10 which views the cups as entities in classes 23(1)(1), 23(1)(2) and 22(2) as described above in connection with FIG. 14, the data integration system 104 will similarly perform two general operations. In one operation, the system 14 will determine a reorganization of the data in the RIM 12 so that the atomic format will correspond to classes 23(1)(1), 23(1)(2) and 22(2), in particular identifying attributes (if any) in each data item which are associated with class 23(1)(1), attributes (if any) which are associated with class 23(1)(2) and attributes (if any) which are associated with class 22(2). In addition, the system manager will establish three data items, one corresponding to class 23(1)(1), one corresponding to class 23(1)(2) and the other corresponding to class 22(2). (It will be appreciated that, if the data integration system 104 has previously established data items corresponding to class 22(2), it need not do so again, but need only establish the data items corresponding to classes 23(1)(1) and 23(1)(2).) In addition, the data integration system 104 will provide the attribute data for attributes associated with class 22(1) in the data item which corresponds to class 22(1) and (if necessary) the attribute data for attributes associated with class 22(2) in the data item which corresponds to class 22(2). After the data integration system 104 determines the new data item and attribute organization for the atomic format for the RIM 12, it will generate new translation engines 13(*t*) for the pre-existing tools 11(*t*) based on the new organization. In addition, the data integration system 104 will generate a translation engine 13(*t*) for the new tool 11(*t*) based on the attribute identifiers used by the new tool and the pre-existing attribute identifiers used in connection with the RIM 12.

It will be appreciated that, by updating and regenerating the class structure as described above as tools 11(*t*) are added to the system, the data integration system 104 essentially creates new atomic models by which previously-believed atomic components are decomposed into increasingly-detailed atomic components. In addition, the data integration system 104, by revising the translation engines 13(*t*) associated with the tools 11(*t*) currently in the system 10, essentially re-maps the tools 11(*t*) to the new RIM organization based on the atomic decomposition. Indeed, only the portion of the translation engines 13(*t*) which are specifically related to the further atomic decomposition will need to be modified or updated based on the new decomposition, and the rest of the respective translation engines 13(*t*) can continue to run without modification.

The detailed operations performed by the data integration system 104 in updating the RIM 12 and translation engines 13(*t*) to accommodate addition of a new tool to system 10 will depend on the relationships (that is, mappings) between the particular data models and formats of the existing RIM 12 and current tools 11(*t*), on the one hand, and the data model and format of the tool to be added. In one particular embodiment, the data integration system 104 establishes the new format for the RIM 12 and generates updated translation engines 13(*t*) using a rule-based methodology which is based on relationships between each class and subclasses generated therefore during the update procedure, on attributes which are added to objects or entities in each class and in addition on the correspondences between the attribute identifiers used for existing attributes by the current tool(s) 11(*t*) and the attribute identifiers as used by the new tool 11(*t*). An operator, using the data integration system 104, can determine and specify the mapping relationships between the data models and formats used by the respective tools 11(*t*) and the data model and format used by the RIM 12, and can maintain a rulebase from the mapping relationships which it can use to generate and update the respective translation engines 13(*t*).

In its operations as described above, to ensure that the data items in the RIM 12 can be updated in response to an access request of the storage type, the data integration system 104 will associate each tool object 11(*t*) with a class whose associated data item(s) will be deemed "master physical items," and a specific relationship, if any, to other data items. Preferably, the data integration system 104 will select as the master physical item the particular class which is deemed the most semantically equivalent to the object of the tool's data model. Other data items, if any, which are related to the master physical item, are deemed secondary physical items in the graph. For example, with reference to FIG. 14, for tool 11(1), the data integration system 104 will identify the data items associated with class 21 as the master physical items, since that is the only class associated with the tool 11(1). Since there are no other classes associate with tool 11(1) there are no secondary physical items; the directed graph associated with tool 11(1) effectively has one node, namely, the node associated with class 21.

On the other hand, for tool 11(2), the data integration system 104 may identify class 22(1) as the class whose data items will be deemed "master physical items" In that case, data items associated with class 22(2) will be identified as "secondary physical items." In addition, the data integration system 104 will select one of the relationships, identified by the arrows identified by the legend "RELATIONSHIPS" between classes 22(1) and 22(2) in FIG. 14, as a selected relationship. In that case, the data items in RIM 12 that are associated with class 22(1) as a master physical item, and data items associated with class 22(2), as a secondary physical item, as interconnected by the arrow representing the selected relationship, form respective directed graphs. In performing an update operation in response to an access request from tool 11(2), the directed graph that is associated with the data items to be updated is traversed from the master physical item and the appropriate attributes and values updated. In traversing the directed graph, conventional graph-traversal algorithms can be used to ensure that each data item in the graph, can, as a graph node, be appropriately visited and updated, thereby ensuring that the data items are updated.

Similarly, for tool 11(*t*) (FIG. 15) the data integration system 104 may identify class 23(1)(1) as the class whose data items will be deemed "master physical items." In that case, the data items associated with classes 23(1)(2) and 22(2) will be deemed secondary physical items, and the data integration system 104 may select one of the direct relationships (represented by arrows identified by the legend "RELATIONSHIPS" between class 23(1)(1) and class 23(1)(2)) as the specified relationship. Although there is no direct relationship shown in FIG. 14 between class 23(1)(1) and class 22(2), it will be appreciated that, since the class 23(1)(1) is a subclass of class 22(1), it (class 23(1)(1)) will inherit certain features of its parent class 22(1), including the parent class's relationships, and so there is, at least inferentially, a relationship between class 23(1)(1) and class 22(2) which is used in establishing the directed graphs for tool 11(3). Accordingly, in performing an update operation in response to an access request from tool 11(3), the directed graph that is associated with the data items to be updated is traversed from the master physical item associated with class 23(1) and the appropriate attributes and values updated. In traversing the directed graph, conventional graph-traversal algorithms can be used to ensure that each data item in the graph, can, as a graph node, be appropriately visited and updated, thereby ensuring that the data items are updated.

With this background, specific operations performed by the data integration system 104 and translation engines 13(*t*) will be described in connection with FIGS. 3 and 4, respectively. Initially, with reference to FIG. 15, in establishing or updating the RIM 12 when a new tool 11(*t*) is to be added to the system 10, the data integration system 104 initially receives information as to the current atomic data model and format of the RIM 12 (if any) and the data model and format of the tool 11(*t*) to be added (step 1502). If this is the first tool 11(*t*) to be added (the determination of which is made in step 1504), the data integration system 104 can use the tool's data model and format, or any finer-grained data model and format which may be selected by an operator, as the atomic data model and format (step 1508). On the other hand, if the data integration system 104 determines that this is not the first tool 11(*t*) to be added, correspondences between the new tool's data model and format, including the new tool's class and attribute structure and associations between that class and attribute structure and the class and attribute structure of the RIM's current atomic data model and format will be determined and a RIM and translation engine update rulebase generated therefrom as noted above (step 1510). After the rulebase has been generated, the data integration system 104 can use the rulebase to update the RIM's atomic data model and format and the existing translation engines 13(*t*) as described above, and in addition can establish the translation engine 13(*t*) for the tool to be generated (step 1512).

Figure 16:
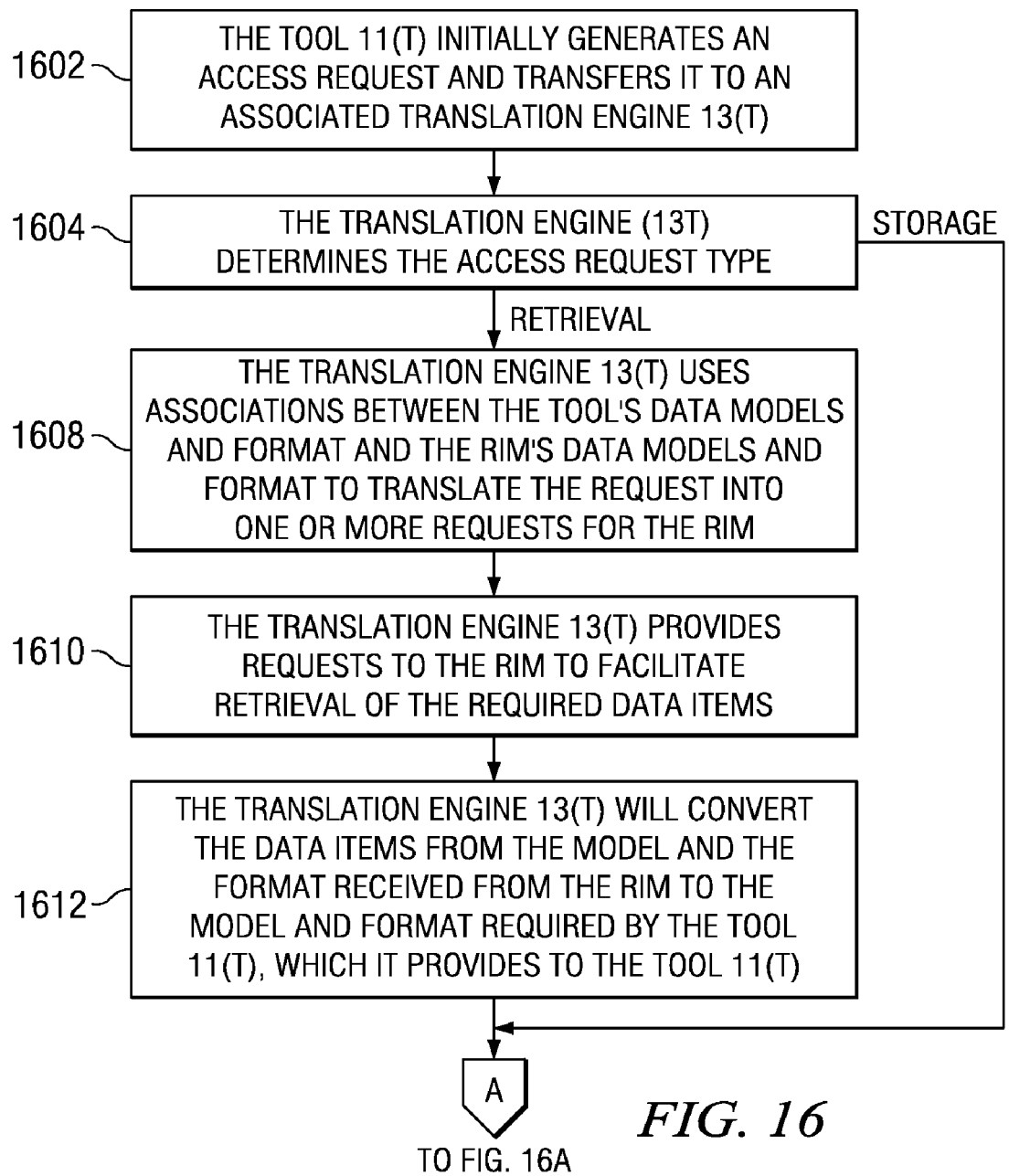
FIG. 16 is a flow diagram showing additional steps for using a metadata facility in connection with a data integration job.

Thereafter, a translation engine 13(*t*) has been generated or updated for a tool 11(*t*), it can be used in connection with access requests generated by the tool 11(*t*). Operations performed in connection with an access request will be described in connection with FIG. 4. With reference to FIG. 16, the tool 11(*t*) will initially generate an access request, which it will transfer to its associated translation engine 13(*t*) (step 1602). After receiving the access request, the translation engine 13(*t*) will determine the request type, that is, if it is a retrieval request or a storage request (step 1604). If the request is a retrieval request, the translation engine 13(*t*) will use its associations between the tool's data models and format and the RIM's data models and format to translate the request into one or more requests from the RIM 12 (step 1608), which it provides to the RIM 12 to facilitate retrieval by it of the required data items (step 1610). On receiving the data items from the RIM 12, the translation engine 13(*t*) will convert the data items from the model and format received from the RIM 12 to the model and format required by the tool 11(*t*), which it provides to the tool 11(*t*) (step 1612).

Figure 16A:
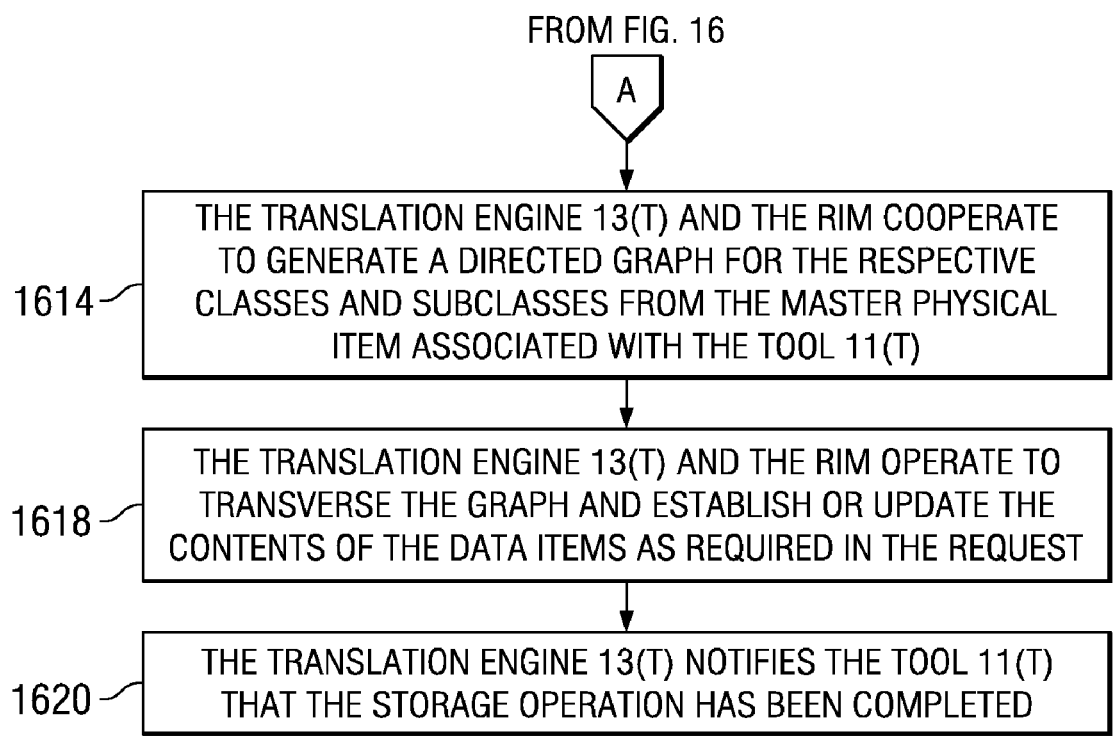
FIG. 16A is a flow diagram showing additional steps for using a metadata facility in connection with a data integration job.

On the other hand, with reference to FIG. 16A, if the translation engine determines in step 121 that the request is a storage request, including a request to update a previously-stored data item, the translation engine 13(*t*) will, with the RIM 12, generate a directed graph for the respective classes and subclasses from the master physical item associated with the tool 11(*t*) (step 1614). If the operation is an update operation, the directed graph will comprise, as graph nodes, existing data items in the respective classes and subclasses, and if the operation is to store new data the directed graph will comprise, as graph nodes, empty data items which can be used to store new data included in the request. After the directed graph has been established, the translation engine 13(*t*) and RIM 12 operate to traverse the graph and establish or update the contents of the data items as required in the request (step 1618). After the graph traversal operation has been completed, the translation engine 13(*t*) can notify the tool 11(*t*) that the storage operation has been completed (step 1620).

It will be appreciated that the invention provides a number of advantages. In particular, it provides for the efficient sharing and updating of information by a number of tools 11(*t*) in an enterprise computing environment, without the need for constraining the tools 11(*t*) to any predetermined data model, and further without requiring the tools 11(*t*) to use information exchange programs for exchanging information between pairs of respective tools. The invention provides an atomic repository information manager ("RIM") 12 that maintains data in an atomic data model and format which may be used for any of the tools 11(*t*) in the system, which may be readily updated and evolved in a convenient manner when a new tool 11(*t*) is added to the system to respond to new system and market requirements.

Figure 17:
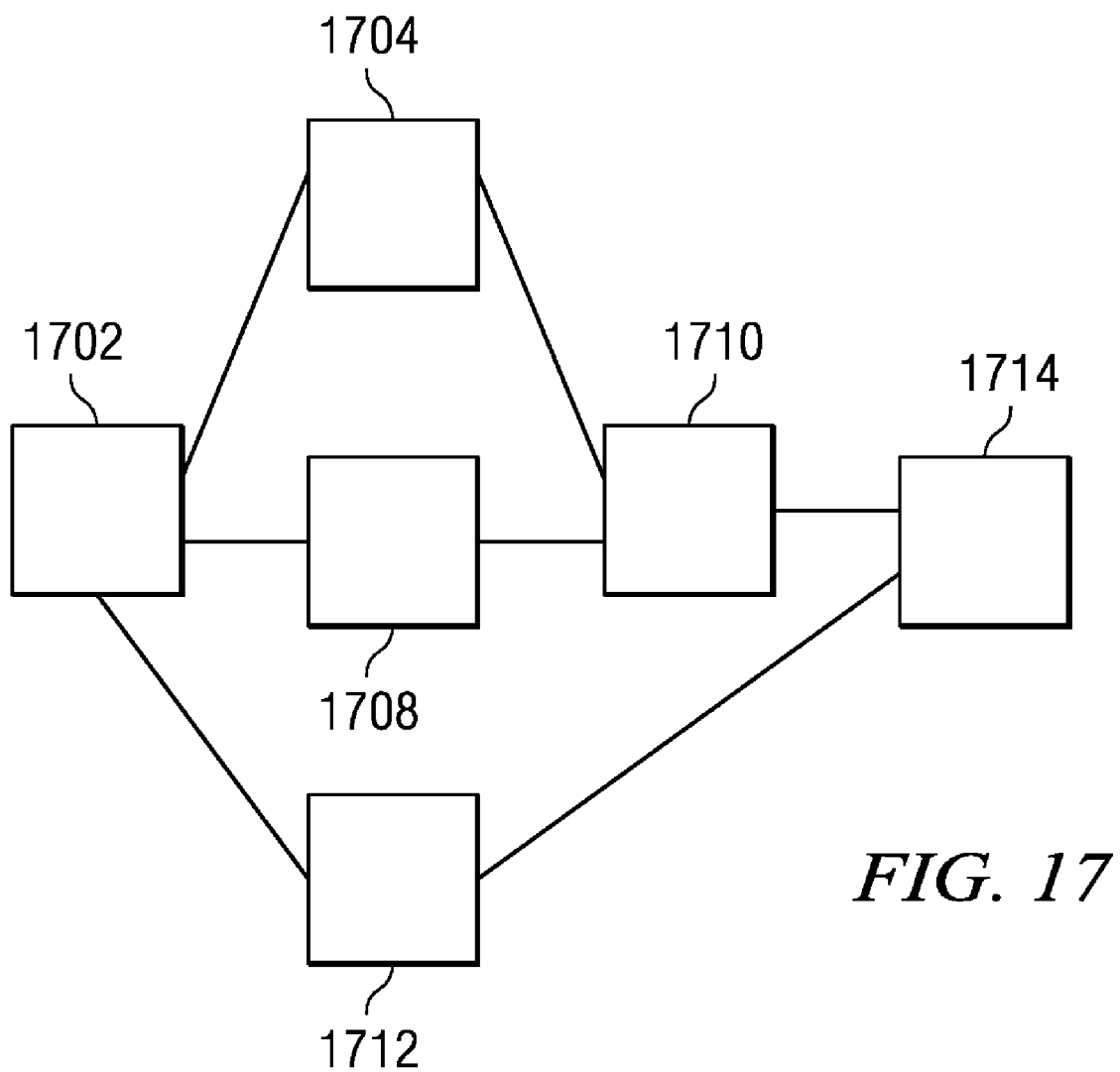
FIG. 17 is a schematic diagram showing a facility for parallel execution of a plurality of processes of a data integration process.

Furthermore, by associating each tool 11(*t*) with a "master physical item" class, directed graphs are established among data items in the RIM 12, and so updating of information in the RIM 12 in response to an update request can be efficiently accomplished using conventional directed graph traversal procedures FIG. 17 is a schematic diagram showing a facility for parallel execution of a plurality of processes of a data integration process. In an embodiment, the process may involve a process initiation facility 1702. The process initiation facility 1702 may determine the scope of the job that needs to be run and determine that a first and second process may be run simultaneously (e.g. because they are not dependant). Once the determination is made, the two processing facilities 1704 and 1708 may run process job one and process job 2 respectively. Following the execution of these two jobs, a third process may be undertaken on process facility 1710 (e.g. process 3). Once process three is complete, process facility three may communicate information to a transformation facility 1714. In an embodiment, the transformation facility may not begin the transformation process until it has received information from another parallel process 1712. Once all of the information is presented, the transformation facility may perform the transformation. This parallel process flow minimizes run time by running several processes at one time (e.g. processes that are not dependant on one another) and then presenting the information from the two or more parallel executions to a common facility (e.g. where the common facility is dependant on the results of the two parallel facilities). In this embodiment, the several process facilities are depicted as separate facilities for ease of explanation, it should be understood that two or more of these facilities may be the same physical facilities. It should also be understood that two or more of the processing facilities may be different physical facilities and may reside in various physical locations (e.g. facility 1704 may reside in one physical location and facility 1708 may reside in another physical location).

Figure 18:
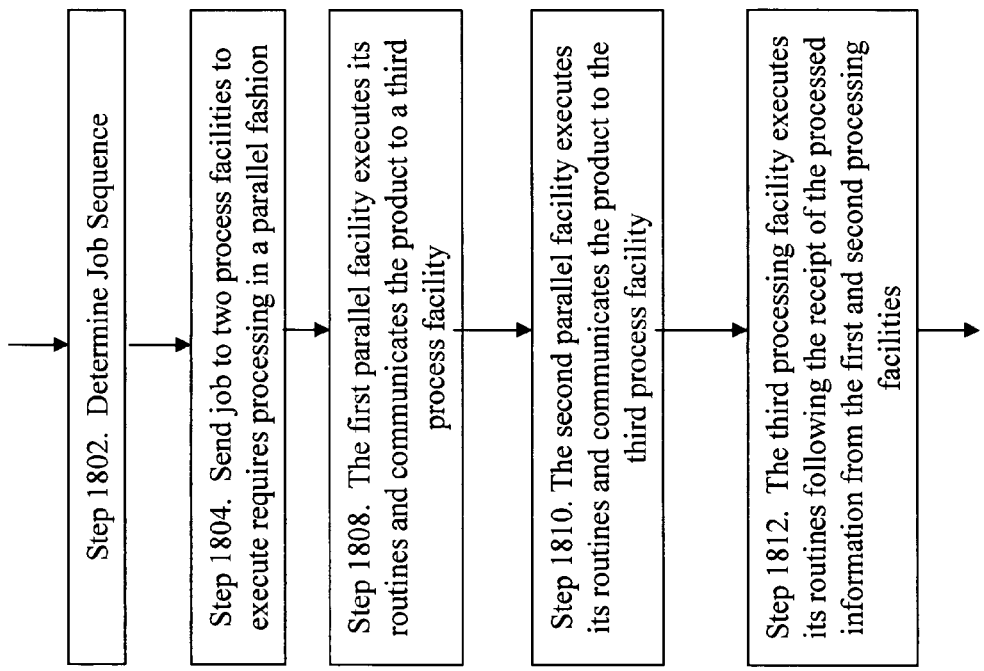
FIG. 18 is a flow diagram showing steps for parallel execution of a plurality of processes of a data integration process.

FIG. 18 is a flow diagram showing steps for parallel execution of a plurality of processes of a data integration process. In an embodiment, a parallel process flow may involve step 1802 wherein the job sequence is determined. Once the job sequence is determined, the job may be sent to two or more process facilitates as in step 1804. In step 1808 a first process facility may receive and execute certain routines and programs and once complete communicate the processed information to a third process facility. In step 1810 a second process facility may receive and execute certain routines and programs and once complete communicate the processed information to the third process facility. In step 1812 the third process facility may wait to receive the processed information from the first to process facilities before running its own routines on the two sources of information. Again, this embodiment depicts the process facilities as separate; however, it should be understood the process facilities might be the same facilities or reside in the same location.

Figure 19:
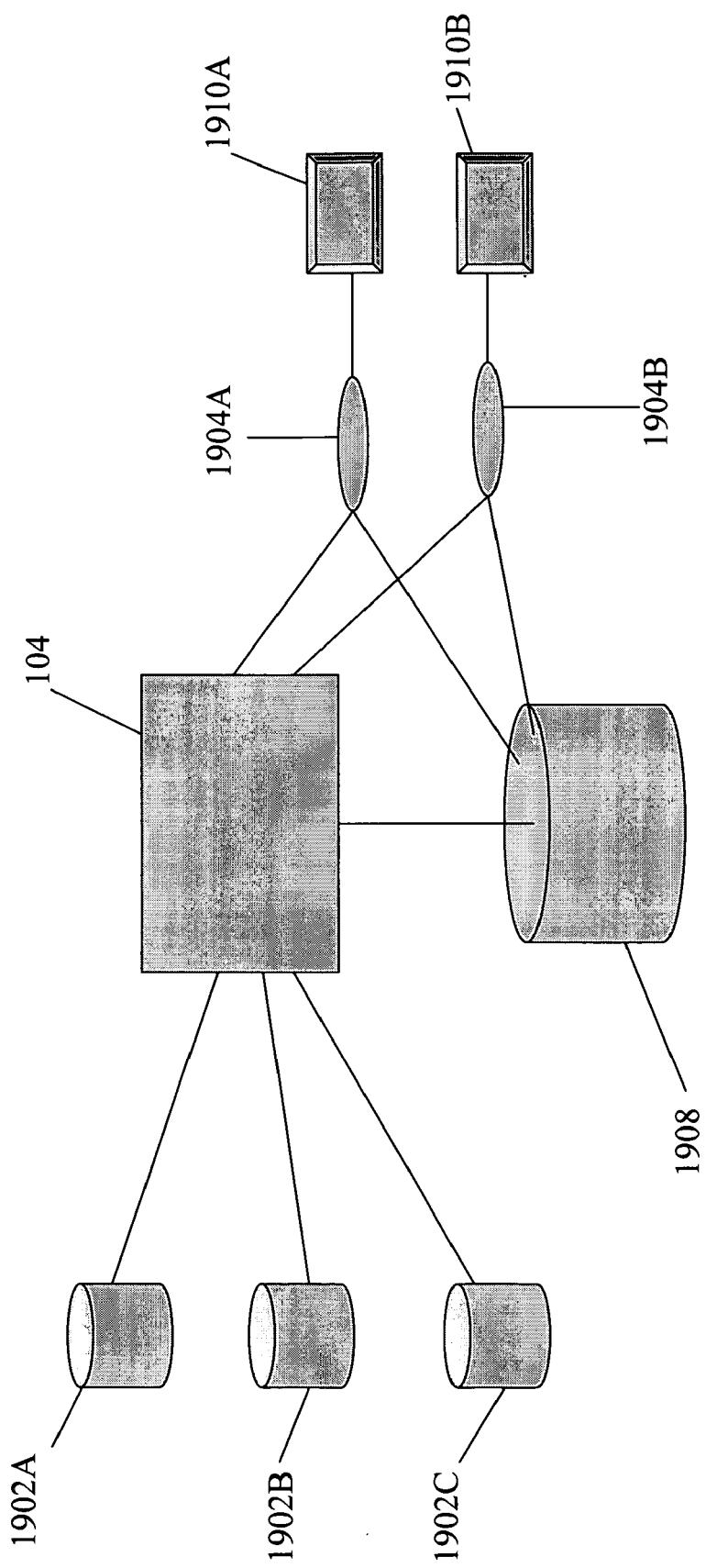
FIG. 19 is a schematic diagram showing a data integration job, comprising inputs from a plurality of data sources and outputs to a plurality of data targets.

FIG. 19 is a schematic diagram showing a data integration job, comprising inputs from a plurality of data sources and outputs to a plurality of data targets. It may be desirable to collect data from several data sources 1902A, 1902B and 1902C and use the combination of the data in a business enterprise. In an embodiment, a data integration system 104 may be used to collect, cleanse, transform or otherwise manipulate the data from the several data sources 1902A, 1902B and 1902C to store the data in a common data warehouse or database 1908 such that it can be accessed from various tools, targets, or other computing systems. The data integration system 104 may store the collected data in the storage facility 1908 such that it can be directly accessed from the various tools 1910A and 1910B or the tools may access the data through data translators 1904A and 1904B, whether automatically, manually or semi-automatically generated as described herein. The data translators are illustrated as separate facilities; however, it should be understood that they may be incorporated into the data integration system, a tool or otherwise located to accomplish the desired tasks.

Figure 20:
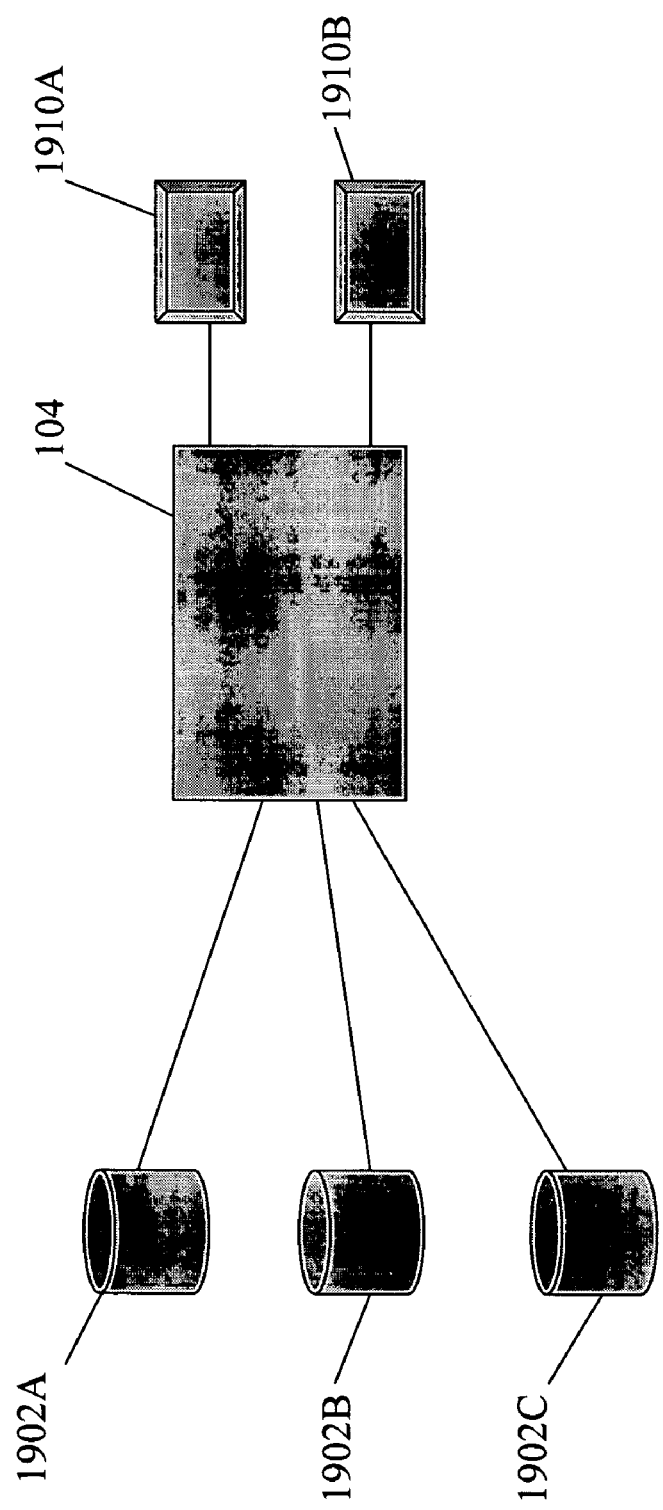
FIG. 20 is a schematic diagram showing a data integration job, comprising inputs from a plurality of data sources and outputs to a plurality of data targets.

FIG. 20 is a schematic diagram showing a data integration job, comprising inputs from a plurality of data sources and outputs to a plurality of data targets. It may be desirable to collect data from several data sources 1902A, 1902B and 1902C and use the combination of the data in a business enterprise. In an embodiment, a data integration system 104 may collect, cleanse, transform or otherwise manipulate the data from the several data sources 1902A, 1902B and 1902C and pass on the collected information in a combined manner to several targets 1910A and 1910B. This may be accomplished in real-time or in a batch mode for example. Rather than storing all of the collected information in a central database to be accessed at some point in the future, the data integration system 104 may collect and process the data from the data sources 1902A, 1902B and 1902C at or near the time the request for data is made by the targets 1910A and 1910B. It should be understood that the data integration system might still include memory in an embodiment such as this. In an embodiment, the memory may be used for temporarily storing data to be passed to the targets when the processing is completed.

Figure 21:
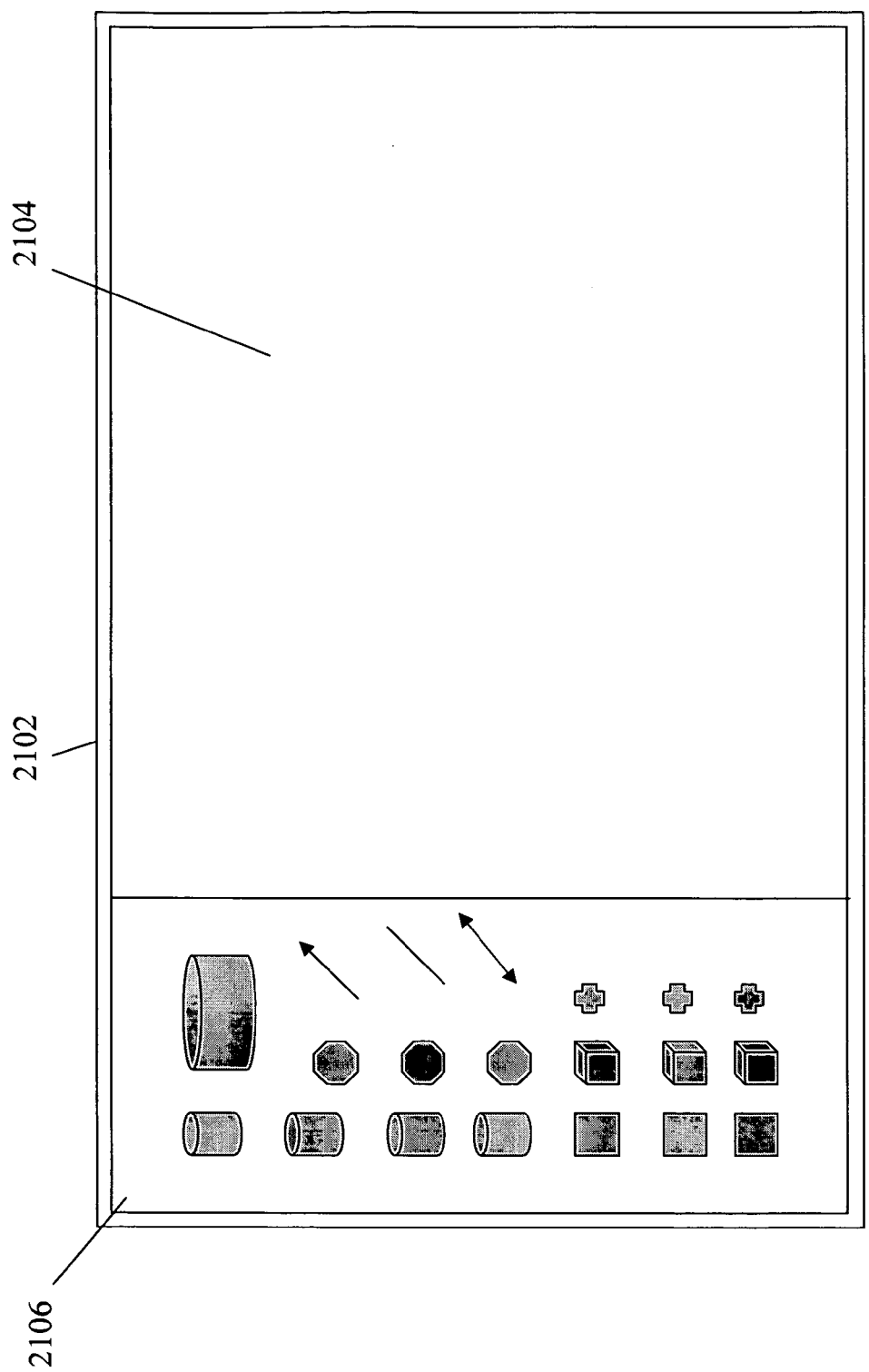
FIG. 21 shows a graphical user interface whereby a data manager for a business enterprise can design a data integration job.

FIG. 21 shows a graphical user interface whereby a data manager for a business enterprise can design a data integration job. In an embodiment, a graphical user interface 2102 may be presented to the user to facilitate setting up a data integration job. The user interface may include a palate of tools 2106 including databases, transformation tools, targets, path identifiers, and other tools to be used by a user. The user may drop and click the tools from the palate of tools 2106 into a workspace 2104. The workspace 2104 may be used to layout the databases, path of data flow, transformation steps and the like to facilitate the setting up of a data integration job. In an embodiment, once the job is set up it may be run from this or another user interface.

Figure 22:
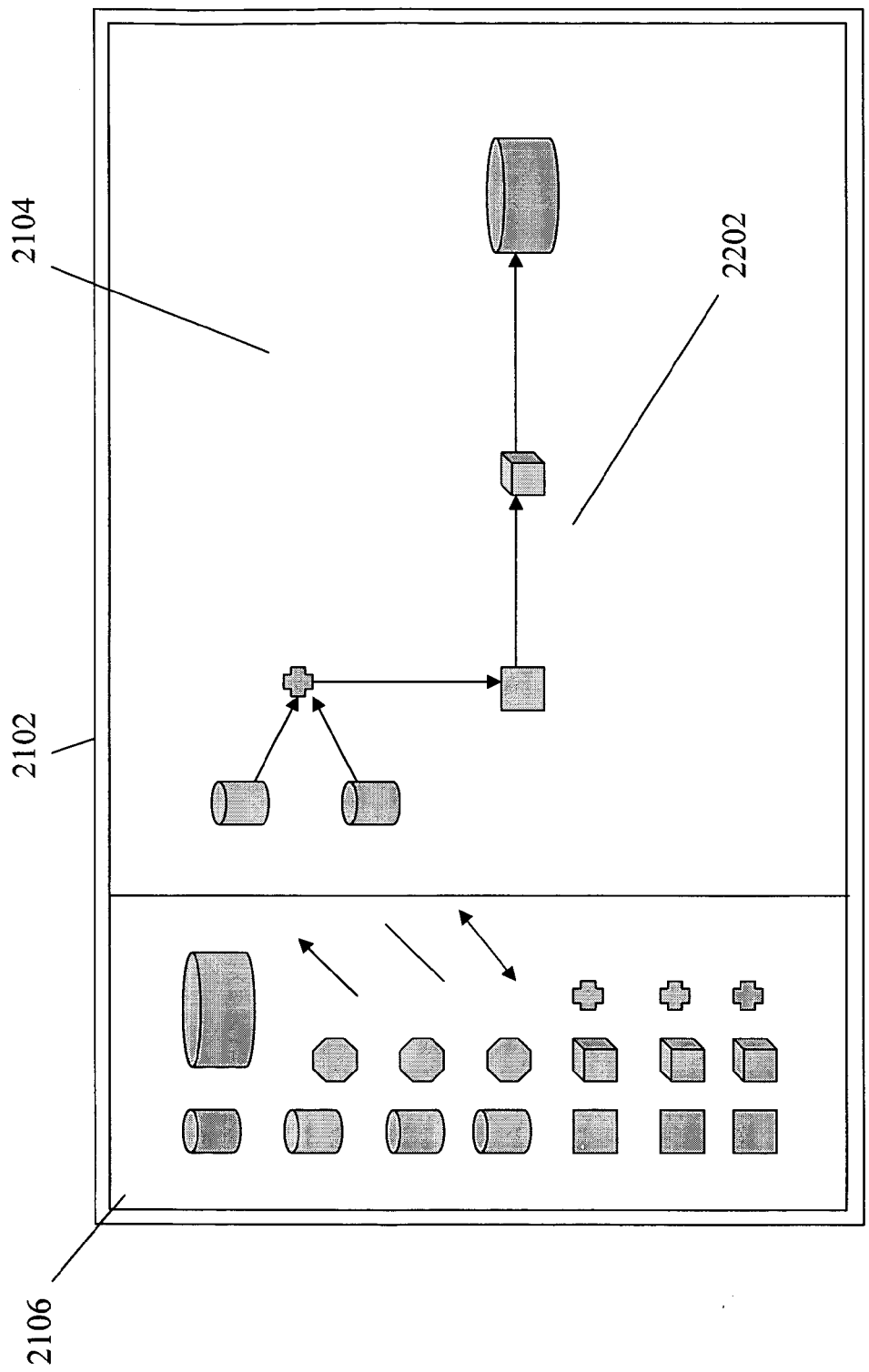
FIG. 22 shows another embodiment of a graphical user interface whereby a data manager can design a data integration job.

FIG. 22 shows another embodiment of a graphical user interface whereby a data manager can design a data integration job. In an embodiment, a user may use a graphical user interface 2102 to align icons, or representations of targets, sources, functions and the like. The user may also create association or command structures between the several icons to create a data integration job 2202.

Figure 23:
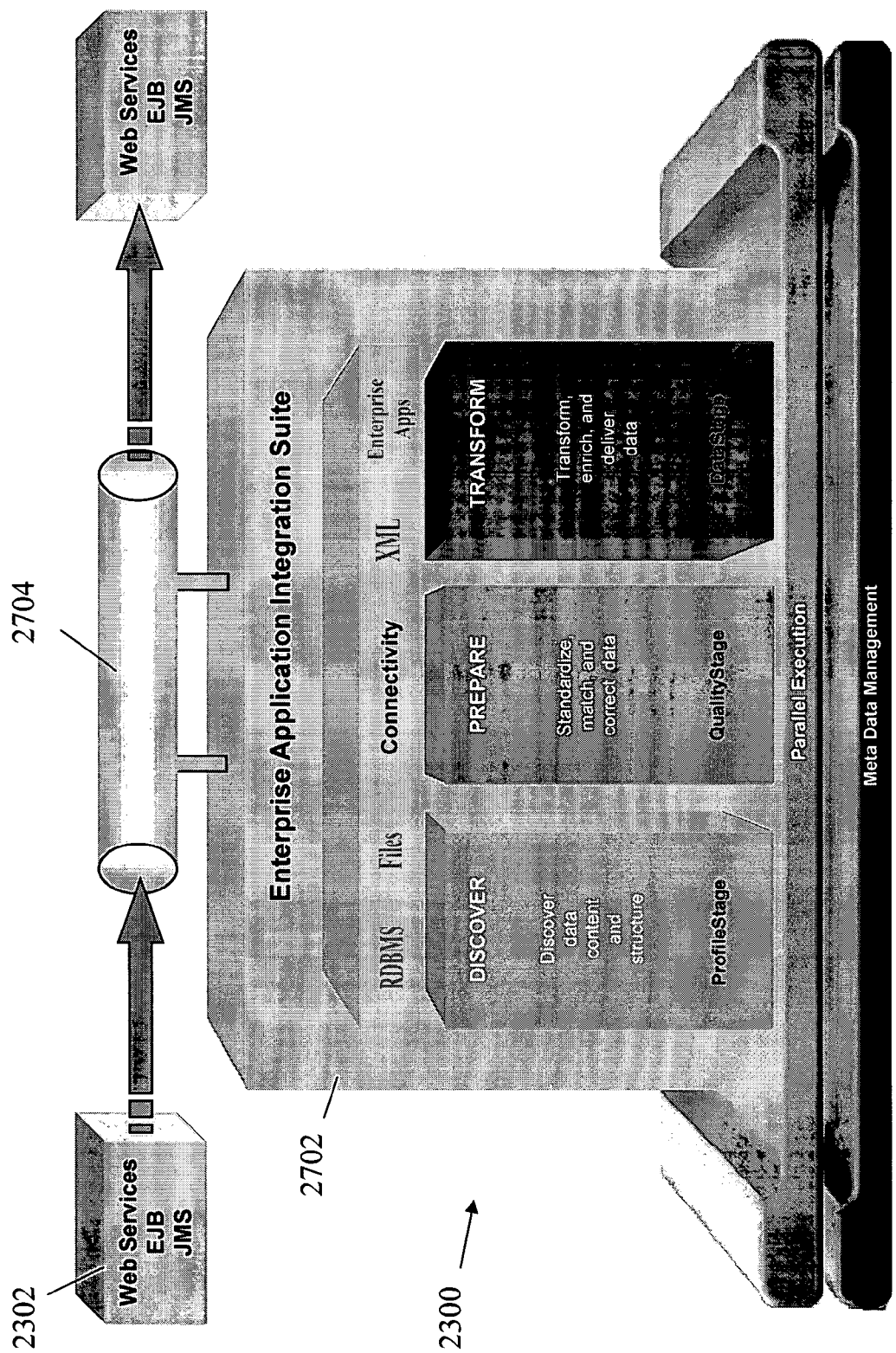
FIG. 23 is a schematic diagram of an architecture for integrating a real time data integration service facility with a data integration process.

FIG. 23 represents a platform 2300 for facilitating integration of various data of a business enterprise. The platform includes an integration suite that is capable of providing known enterprise application integration (EAI) services, including those that involve extraction of data from various sources, transformation of the data into desired formats and loading of data into various targets, sometimes referred to as ETL (Extract, Transform, Load). The platform 2300 includes an RTI service 2704 that facilitates exposing a conventional data integration platform 2702 as a service that can be accessed by computer applications of the enterprise, including through web service protocols 2302.

Figure 24:
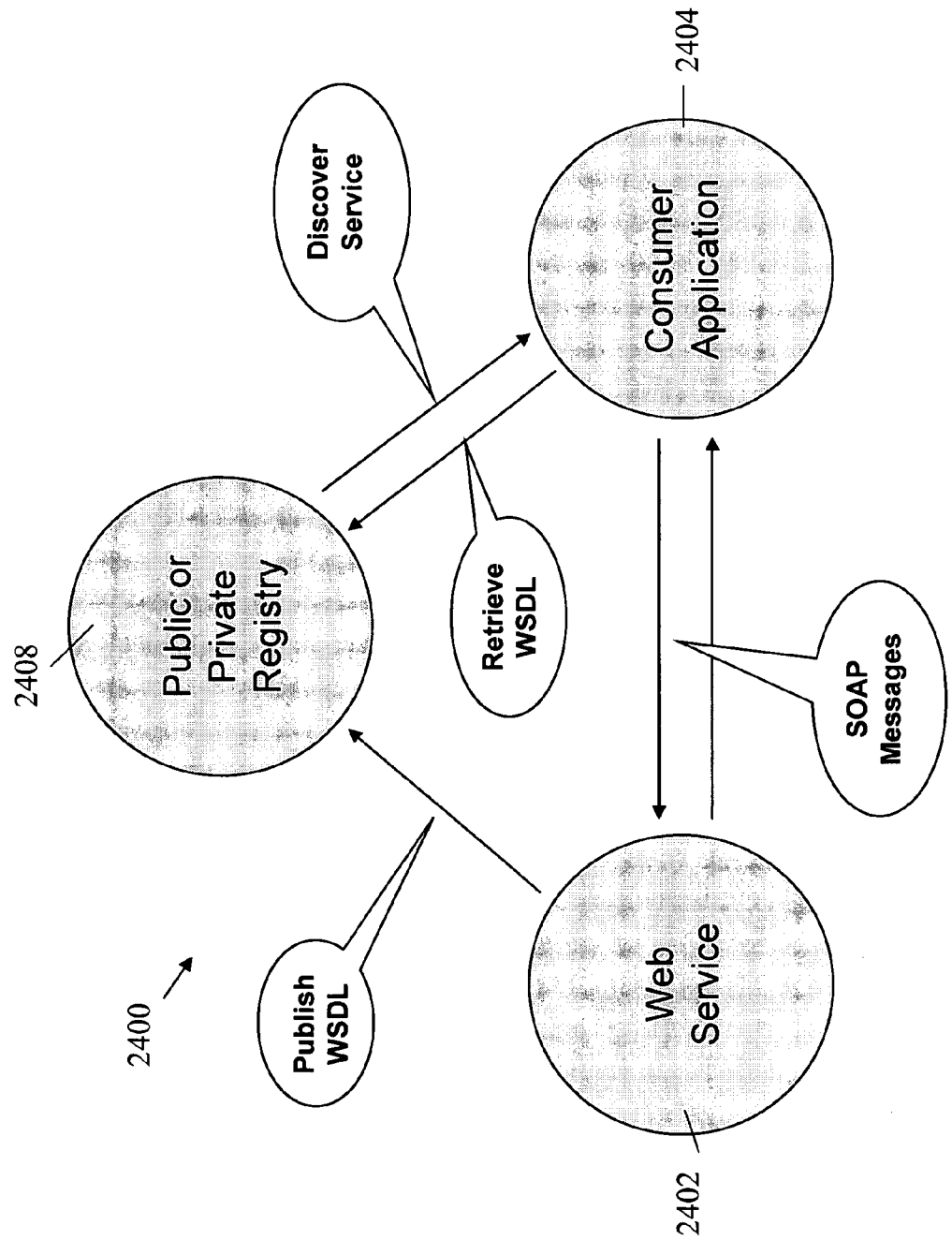
FIG. 24 is a schematic diagram showing a services oriented architecture for a business enterprise.

FIG. 24 shows a schematic diagram 2400 of a service-oriented architecture (SOA). The SOA can be part of the infrastructure of a business enterprise. In the SOA, services become building blocks for application development and deployment, allowing rapid application development and avoiding redundant code. Each service embodies a set of business logic or business rules that can be blind to the surrounding environment, such as the source of the data inputs for the service or the targets for the data outputs of the service. As a result, services can be reused in connection with a variety of applications, provided that appropriate inputs and outputs are established between the service and the applications. The services oriented architecture allows the service to be protected against environmental changes, so that it still functions even if the surrounding environment is changed. As a result, services do not need to be recoded as a result of infrastructure changes, resulting in a huge saving of time and effort at that time. The embodiment of FIG. 24 is an embodiment of an SOA 2400 for a web service.

In the SOA 2400 of FIG. 24, there are three entities, a service provider, such as Web service 2402, a service requester, such as consumer application 2404 and a service registry 2408. The registry 2408 may be public or private. The service requester 2404 may search a registry 2408 for an appropriate service. Once an appropriate service is discovered, the service requester 2404 may receive code, such as Web Services Description Language (WSDL) code, that is necessary to invoke the service. WSDL is the language conventionally used to describe web services. The service requester 2404 may then interface with the service provider 2402, such as through messages in appropriate formats (such as the Simple Object Access Protocol (SOAP) format for web service messages), to invoke the service. The SOAP protocol is a preferred protocol for transferring data in web services. SOAP defines the exchange format for messages between a web services client and a web services server. SOAP is an XML schema (XML being the language typically used in web services for tagging data, although other markup languages may be used).

Figure 25:
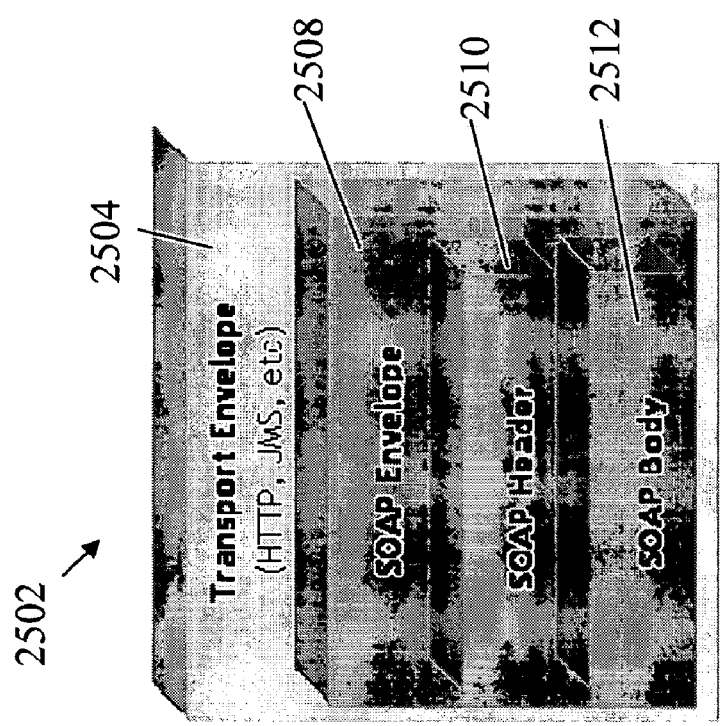
FIG. 25 is a schematic diagram showing a SOAP message format.

Referring to FIG. 25, a SOAP message 2502 includes a transport envelope 2504 (such as an HTTP or JMS envelope, or the like), a SOAP envelope 2508, a SOAP header 2510 and a SOAP body 2512. The following is an example of a SOAP-format request message and a SOAP-format response message:

| | |
|---|---|
| request | <SOAP-ENV:Envelope<br>xmlns:SOAP-ENV="http://schemas.xmlsoap.org/soap/envelope/"<br>xmlns:xsi="http://www.w3.org/2001/XMLSchema-instance"<br>xmlns:xsd="http://www.w3.org/2001/XMLSchema"<br>SOAP-ENV:encodingStyle="http://schemas.xmlsoap.org/soap/encoding/"> |

-continued

| | |
|---|---|
| | <SOAP-ENV:Header></SOAP-ENV:Header><br><SOAP-ENV:Body><br><ns:getAddress xmlns:ns="PhoneNumber"><br><name xsi:type="xsd:string">Ascential Software </name><br></ns:getAddress><br></SOAP-ENV:Body><br></SOAP-ENV:Envelope> |
| response | <SOAP-ENV:Envelope<br>xmlns:SOAP-ENV="http://schemas.xmlsoap.org/soap/envelope/"<br>xmlns:xsi="http://www.w3.org/2001/XMLSchema-instance"<br>xmlns:xsd="http://www.w3.org/2001/XMLSchema"<br>SOAP-ENV:encodingStyle="http://schemas.xmlsoap.org/soap/encoding/"><br><SOAP-ENV:Header></SOAP-ENV:Header><br><SOAP-ENV:Body><br><getAddressResponse xmlns="http://schemas.company.com/address"><br><number> 50 </number><br><street> Washington </street><br><city> Westborough </city><br><zip> 01581 </zip><br><state> MA </state><br></getAddressResponse><br></SOAP-ENV:Body><br></SOAP-ENV:Envelope> |

Web services can be modular, self-describing, self-contained applications that can be published, located and invoked across the web. For example, in the embodiment of the web service of FIG. 24, the service provider 2402 publishes the web service to the registry 2408, such as the Universal Description, Discovery and Integration (UDDI) registry, which provides a listing of what web services are available, or a private registry or other public registry. The web service can be published, for example, in WSDL format. To discover the service, the service requester 2404 browses the service registry and retrieves the WSDL document. The registry 2408 may include a browsing facility and a search facility. The registry 2408 may store the WSDL documents and their metadata.

To invoke the web service, the service requester 2404 sends the service provider 2402 a SOAP message as described in the WSDL, receives a SOAP message in response, and decodes the response message as described in the WSDL. Depending on their complexity, web services can provide a wide array of functions, ranging from simple operations, such as requests for data, to complicated business process operations. Once a web service is deployed, other applications (including other web services) can discover and invoke the web service. Other web services standards are being defined by the Web Services Interoperability Organization (WS-I), an open industry organization chartered to promote interoperability of web services across platforms. Examples include WS-Coordination, WS-Security, WS-Transaction, WSIF, BPEL and the like, and the web services described herein should be understood to encompass services contemplated by any such standards.

Figure 26:
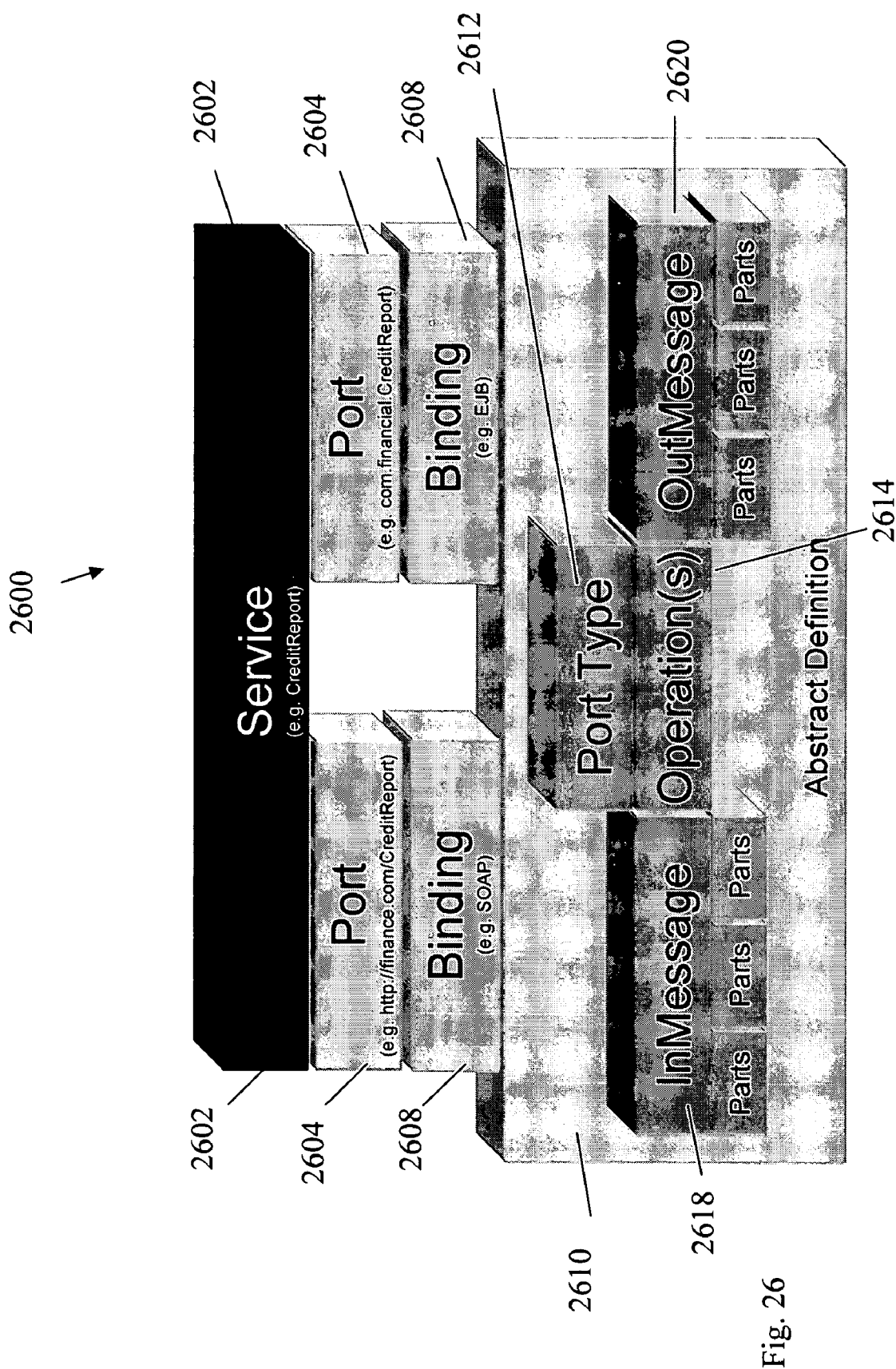
FIG. 26 is a schematic diagram showing elements of a WSDL description for a web service.

Referring to FIG. 26, a WSDL definition 2600 is an XML schema that defines the interface, location and encoding scheme for a web service. The definition 2600 defines the service 2602, identifies the port 2604 through which the service 2602 can be accessed (such as an Internet address), defines the bindings 2608 (such as Enterprise Java Bean or SOAP bindings) that are used to invoke the web service and communicate with it. The WSDL definition 2600 may include an abstract definition 2610, which may define the port type 2612, incoming message parts 2618 and outgoing message parts 2620 for the web service, as well as the operations 2614 performed by the service.

There are a variety of web services clients that can invoke web services, from various providers. Web services clients include Net applications, Java applications (e.g., JAX-RPC), applications in the Microsoft SOAP toolkit (Microsoft Office, Microsoft SQL Server, and others), applications from SeeBeyond, WebMethods, Tibco and BizTalk, as well as Ascential's DataStage (WS PACK). It should be understood that other web services clients are encompassed and can be used in the enterprise data integration methods and systems described herein. Similarly, there are various web services providers, including .Net applications, Java applications, applications from Seibel and SAP, I2 applications, DB2 and SQL Server applications, enterprise application integration (EAI) applications, business process management (BPM) applications, and Ascential Software's Real Time Integration (RTI) application.

In embodiments, the RTI services described herein use an open standard specification such as WSDL to describe a data integration process service interface. When a data integration service definition is complete, it can use WSDL web service definition language (a language that is not necessarily specific to web services), which is an abstract definition that gives what the name of the service is, what the operations of the service are, what the signature of each operation is, and the bindings for the service. Within the WSDL file (an XML document) there are various tags, with the structure described in connection with FIG. 26. For each service, there can be multiple ports, each of which has a binding. The abstract definition is the RTI service definition for the data integration service in question. The port type is an entry point for a set of operations, each of which has a set of input arguments and output arguments.

WSDL was defined for web services, but with only one binding defined (SOAP defined over HTTP). WSDL has since been extended through industry bodies to include WSDL extensions for various other bindings, such as EJB, JMS, and the like. An RTI service can use WSDL extensions to create bindings for various other protocols. Thus, a single RTI data integration service can support multiple bindings at the same time to the single service. As a result, a business can take a data integration process, expose it as a set of abstract processes (completely agnostic to protocols) and then after that add the bindings. A service can support any number of bindings.

In embodiments, a user may take a preexisting data integration job, add appropriate RTI input and output phases, and expose the job as a service that can be invoked by various applications that use different native protocols.

Figure 27:
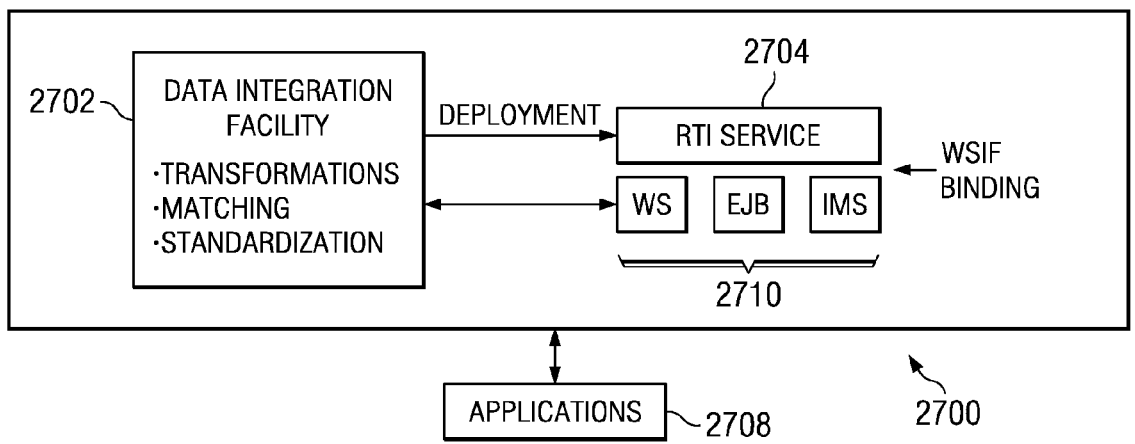
FIG. 27 is a schematic diagram showing elements for enabling a real time data integration process for an enterprise.

Referring to FIG. 27 a high-level architecture is represented for a data integration platform 2700 for real time data integration. A conventional data integration facility 2702 provides methods and systems for data integration jobs, as described in connection with FIGS. 1-22. The data integration facility 2702 connects to one or more applications through a real time integration facility, or RTI service 2704, which comprises a service in a service-oriented architecture. The RTI service 2704 can invoke or be invoked by various applications 2708 of the enterprise. The data integration facility 2702 can provide matching, standardization, transformation, cleansing, discovery, metadata, parallel execution, and similar facilities that are required to perform data integration jobs. In embodiments, the RTI service 2704 exposes the data integration jobs of the data integration facility 2702 as services that can be invoked in real time by applications 2708 of the enterprise. The RTI service 2704 exposes the data integration facility 2702, so that data integration jobs can be used as services, synchronously or asynchronously. The jobs can be called, for example, from enterprise application integration platforms, application server platforms, as well as Java and .Net applications. The RTI service 2704 allows the same logic to be reused and applied across batch and real-time services. The RTI service 2704 may be invoked using various bindings 2710, such as Enterprise Java Bean (EJB), Java Message Service (JMS), or web service bindings.

Figure 28:
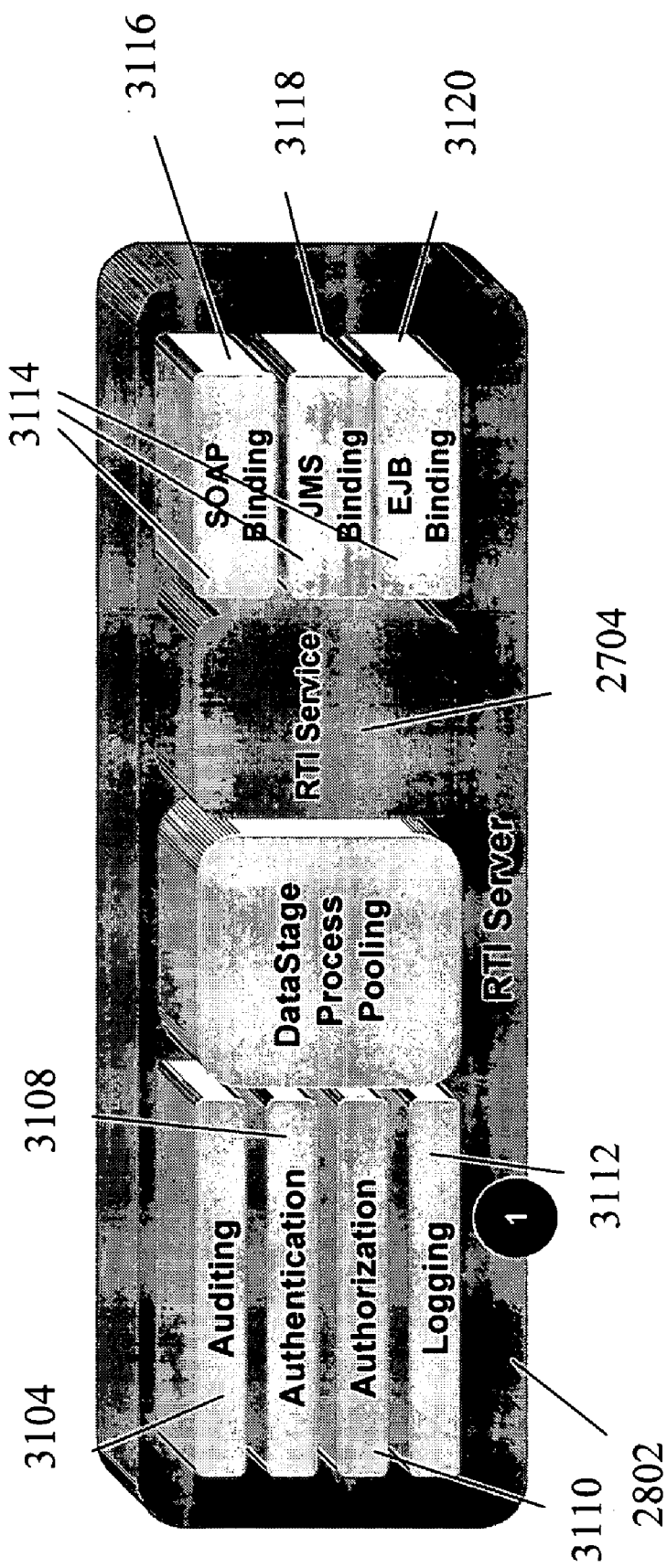
FIG. 28 is an embodiment of a server for enabling a real time integration service.

Referring to FIG. 28, in embodiments, the RTI service 2704 runs on an RTI server 2802, which acts as a connection facility for various elements of the real time data integration process. For example, the RTI server 2802 can connect a plurality of enterprise application integration servers, such as DataStage servers from Ascential Software of Westborough, Mass., so that the RTI server 2802 can provide pooling and load balancing among the other servers.

In embodiments, the RTI server 2802 can comprise a separate J2EE application running on a J2EE application server. In embodiments, more than one RTI server 2802 may be included in a data integration process. J2EE provides a component-based approach to design, development, assembly and deployment of enterprise applications. Among other things, J2EE offers a multi-tiered, distributed application model, the ability to reuse components, a unified security model, and transaction control mechanisms. J2EE applications are made up of components. A J2EE component is a self-contained functional software unit that is assembled into a J2EE application with its related classes and files and that communicates with other components. The J2EE specification defines various J2EE components, including: application clients and applets, which are components that run on the client side; Java Servlet and JavaServer Pages (JSP) technology components, which are Web components that run on the server; and Enterprise JavaBean (EJB) components (enterprise beans), which are business components that run on the server. J2EE components are written in Java and are compiled in the same way as any program. The difference between J2EE components and "standard" Java classes is that J2EE components are assembled into a J2EE application, verified to be well-formed and in compliance with the J2EE specification, and deployed to production, where they are run and managed by a J2EE server.

There are three kinds of EJBs: session beans, entity beans, and message-driven beans. A session bean represents a transient conversation with a client. When the client finishes executing, the session bean and its data are gone. In contrast, an entity bean represents persistent data stored in one row of a database table. If the client terminates or if the server shuts down, the underlying services ensure that the entity bean data is saved. A message-driven bean combines features of a session bean and a Java Message Service ("JMS") message listener, allowing a business component to receive JMS messages asynchronously.

The J2EE specification also defines containers, which are the interface between a component and the low-level platform-specific functionality that supports the component. Before a Web, enterprise bean, or application client component can be executed, it must be assembled into a J2EE application and deployed into its container. The assembly process involves specifying container settings for each component in the J2EE application and for the J2EE application itself. Container settings customize the underlying support provided by the J2EE server, which includes services such as security, transaction management, Java Naming and Directory Interface (JNDI) lookups, and remote connectivity.

Figure 29:
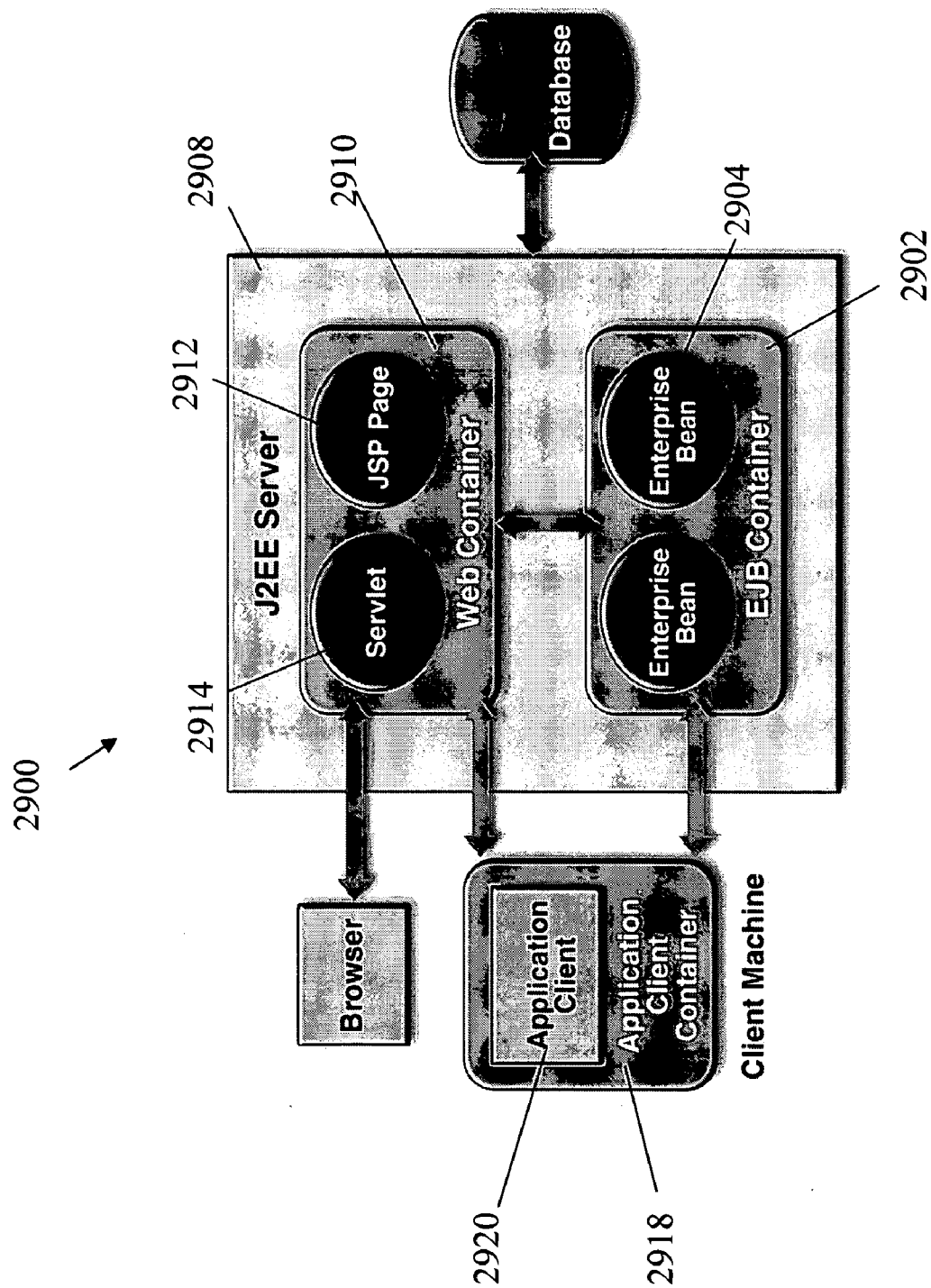
FIG. 29 shows an architecture and functions of a typical J2EE server.

FIG. 29 depicts an architecture 2900 for a typical J2EE server 2908 and related applications. The J2EE server 2908 comprises the runtime aspect of a J2EE architecture. A J2EE server 2908 provides EJB and web containers. The EJB container 2902 manages the execution of enterprise beans 2904 for J2EE applications. Enterprise beans 2904 and their container 2902 run on the J2EE server 2908. The web container 2910 manages the execution of JSP pages 2912 and servlet components 2914 for J2EE applications. Web components and their container 2910 also run on the J2EE server 2908. Meanwhile, an application client container 2918 manages the execution of application client components. Application clients 2920 and their containers 2918 run on the client side. The applet container manages the execution of applets. The applet container may consist of a web browser and a Java plug-in running together on the client.

J2EE components are typically packaged separately and bundled into a J2EE application for deployment. Each component, its related files such as GIF and HTML files or server-side utility classes, and a deployment descriptor are assembled into a module and added to the J2EE application. A J2EE application and each of its modules has its own deployment descriptor. A deployment descriptor is an XML document with an .xml extension that describes a component's deployment settings. A J2EE application with all of its modules is delivered in an Enterprise Archive (EAR) file. An EAR file is a standard Java Archive (JAR) file with an ear extension. Each EJB JAR file contains a deployment descriptor, the enterprise bean files, and related files. Each application client JAR file contains a deployment descriptor, the class files for the application client, and related files. Each file contains a deployment descriptor, the Web component files, and related resources.

The RTI server 2802 acts as a hosting service for a real time enterprise application integration environment. In a preferred embodiment the RTI server 2802 is a J2EE server capable of performing the functions described herein. The RTI server 2802 can also provide a secure, scaleable platform for enterprise application integration services. The RTI server 2802 can provide a variety of conventional server functions, including session management, logging (such as Apache Log4J logging), configuration and monitoring (such as J2EE JMX), security (such as J2EE JAAS, SSL encryption via J2EE administrator). The RTI server 2802 can serve as a local or private web services registry, and it can be used to publish web services to a public web service registry, such as the UDDI registry used for many conventional web services. The RTI server 2802 can perform resource pooling and load balancing functions among other servers, such as those used to run data integration jobs. The RTI server 2802 can also serve as an administration console for establishing and administering RTI services. The RTI server can operate in connection with various environments, such as JBOSS 3.0, IBM Websphere 5.0, BEA WebLogic 7.0 and BEA WebLogic 8.1.

In embodiments, once established, the RTI server 2802 allows data integration jobs (such as DataStage and QualityStage jobs performed by the Ascential Software platform) to be invoked by web services, enterprise Java beans, Java message service messages, or the like. The approach of using a service-oriented architecture with the RTI server 2802 allows binding decisions to be separated from data integration job design. Also, multiple bindings can be established for the same data integration job. Because the data integration jobs are indifferent to the environment and can work with multiple bindings, it is easier to reuse processing logic across multiple applications and across batch and real-time modes.

Figure 30:
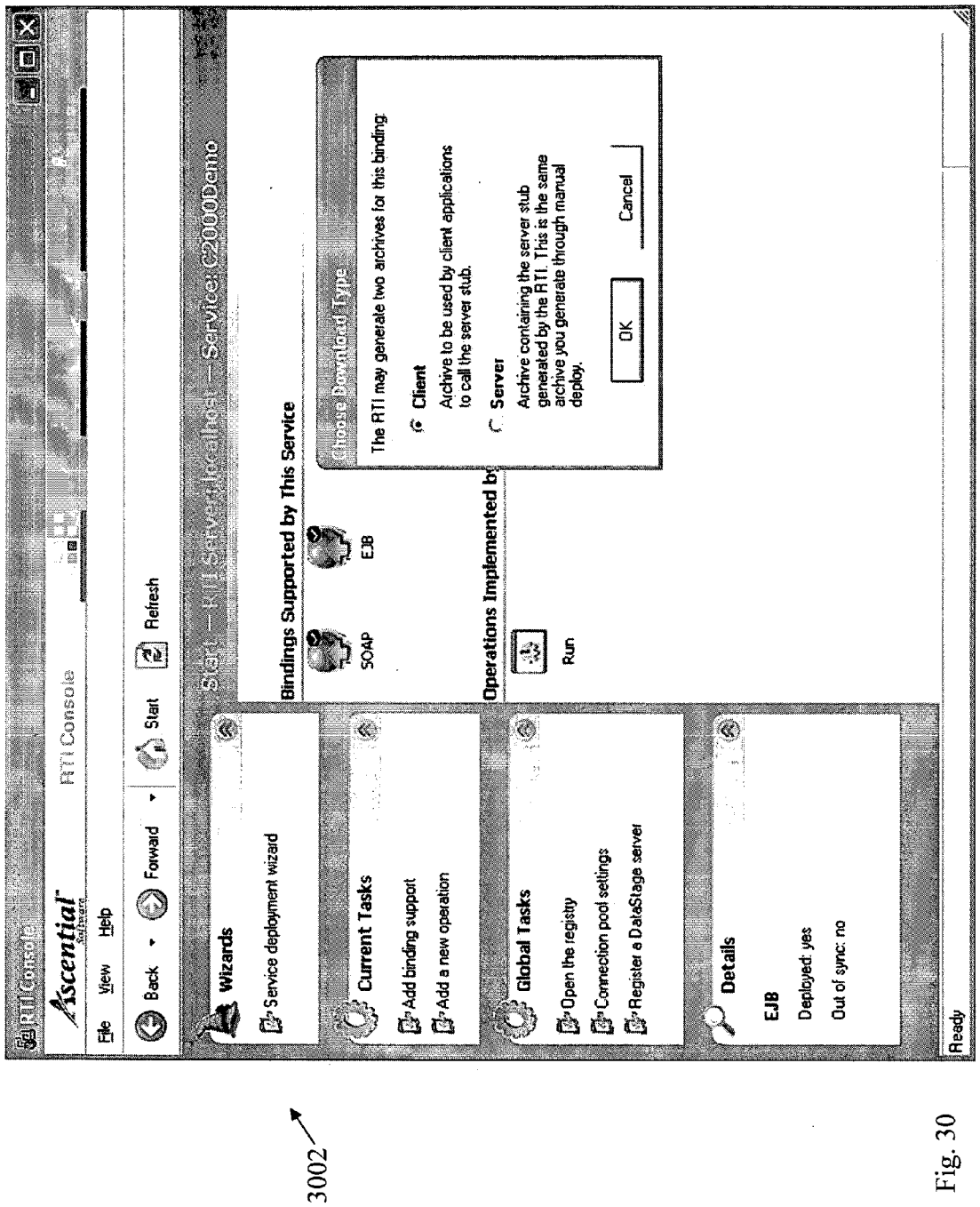
FIG. 30 represents an RTI console for administering an RTI service.

Referring to FIG. 30 an RTI console 3002 is provided for administering an RTI service. The RTI console 3002 enables the creation and deployment of RTI services. Among other things, the RTI console allows the user to establish what bindings will be used to provide an interface to a given RTI service and to establish parameters for runtime usage of the RTI service. The RTI console may be provided with a graphical user interface and run in any suitable environment for supporting such an interface, such as a Microsoft Windows-based environment. Further detail on uses of the RTI console is provided below. The RTI console 3002 is used by the designer to create the service, create the operations of the service, attach a job to the operation of the service and create the bindings that the user wants to use to embody the service with various protocols.

Referring again to FIG. 27, the RTI service 2704 sits between the data integration platform 2702 and various applications 2708. The RTI service 2704 allows the applications to access the data integration program in real time or in batch mode, synchronously or asynchronously. Data integration rules established in the data integration platform 2702 can be shared across the enterprise, anytime and anywhere. The data integration rules can be written in any language, without requiring knowledge of the platform itself. The RTI service 2704 leverages web service definitions to facilitate real time data integration. A typical data integration job expects some data at the beginning and puts some out at the outside. The flow of the data integration job can, in accordance with the methods and systems described herein, be connected to a batch environment or the real time environment. The methods and systems disclosed herein include the concept of a container, a piece of business logic contained between a defined entry point and a defined exit point. By placing a data integration process as the business logic in a container, the data integration can be used in batch and real time modes. Once business logic is in a container, moving between batch and real time modes is extremely simple. A data integration job can be accessed as a real time service, and the same data integration job can be accessed in batch mode, such as to process a large batch of files, performing the same transformations as in the real time mode.

Figure 31:
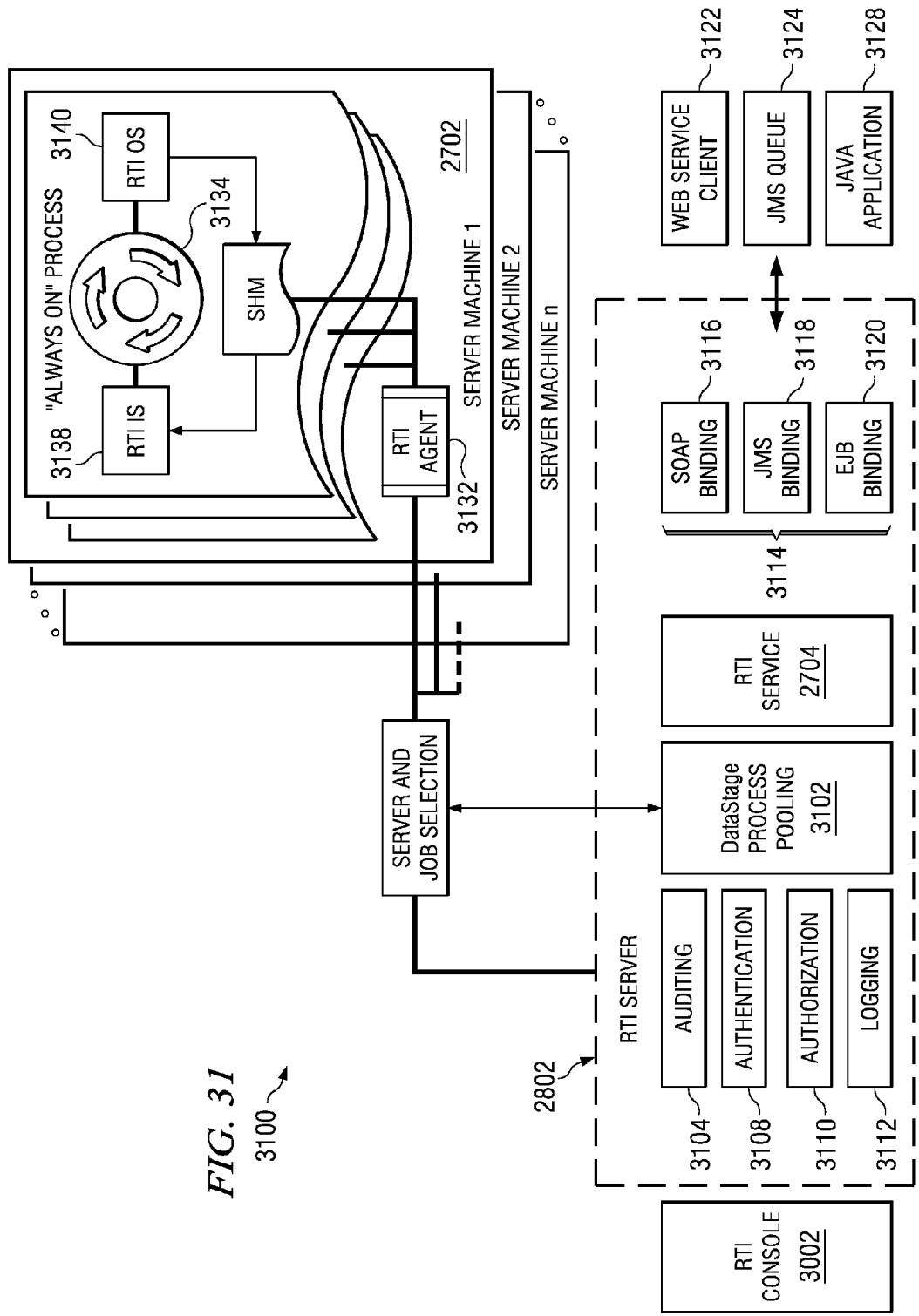
FIG. 31 shows further detail of an architecture for enabling an RTI service.

Referring to FIG. 31, further detail is provided of an architecture 3100 for enabling an embodiment of an RTI service 2704. The RTI server 2802 includes various components, including facilities for auditing 3104, authentication 3108, authorization 3110 and logging 3112, such as those provided by a typical J2EE-compliant server such as described herein. The RTI server 2802 also includes a process pooling facility 3102, which can operate to pool and allocate resources, such as resources associated with data integration jobs running on data integration platforms 2702. The process pooling facility 3102 provides server and job selection across various servers that are running data integration jobs. Selection may be based on balancing the load among machines, or based on which data integration jobs are capable of running (or running most effectively) on which machines. The RTI server 2802 also includes binding facilities 3114, such as a SOAP binding facility 3116, a JMS binding facility 3118, and an EJB binding facility 3120. The binding facilities 3114 allow the interface between the RTI server 2802 and various applications, such as the web service client 3122, the JMS queue 3124 or a Java application 3128.

Referring still to FIG. 31, the RTI console 3002 is the administration console for the RTI server 2802. The RTI console 3002 allows the administrator to create and deploy an RTI service, configure the runtime parameters of the service, and define the bindings or interfaces to the service.

The architecture 3100 includes one or more data integration platforms 2702, which may comprise servers, such as DataStage servers provided by Ascential Software of Westborough, Mass. The data integration platforms 2702 may include facilities for supporting interaction with the RTI server 2802, including an RTI agent 3132, which is a process running on the data integration platform 2702 that marshals requests to and from the RTI server 2802. Thus, once the process pooling facility 3102 selects a particular machine as the data integration platform 2702 for a real time data integration job, it hands the request to the RTI agent 3132 for that data integration platform 2702. On the data integration platform 2702, one or more data integration jobs 3134, such as those described in connection with FIGS. 1-22, may be running. In embodiments, the data integration jobs 3134 are optionally always on, rather than having to be initiated at the time of invocation. For example, the data integration jobs 3134 may have already-open connections with databases, web services, and the like, waiting for data to come and invoke the data integration job 3134, rather than having to open new connections at the time of processing. Thus, an instance of the already-on data integration job 3134 is invoked by the RTI agent 3132 and can commence immediately with execution of the data integration job 3134, using the particular inputs from the RTI server 2802, which might be a file, a row of data, a batch of data, or the like.

Each data integration job 3134 may include an RTI input stage 3138 and an RTI output stage 3140. The RTI input stage 3138 is the entry point to the data integration job 3134 from the RTI agent 3132 and the RTI output stage 3140 is the output stage back to the RTI agent 3132. With the RTI input and output stages, the data integration job 3134 can be a piece of business logic that is platform independent. The RTI server 2802 knows what inputs are required for the RTI input stage 3138 of each RTI data integration job 3134. For example, if the business logic of a given data integration job 3134 takes a customer's last name and age as inputs, then the RTI server 2802 will pass inputs in the form of a string and an integer to the RTI input stage 3138 of that data integration job 3134. The RTI input stage takes the input and formats it appropriate for whatever native application code is used to execute the data integration job 3134.

In embodiments, the methods and systems described herein enable the designer to define automatic, customizable mapping machinery from a data integration process to an RTI service interface. In particular, the RTI console 3002 allows the designer to create an automated service interface for the data integration process. Among other things, it allows a user (or a set of rules or a program) to customize the generic service interface to fit a specific purpose. When there is a data integration job, with a flow of transactions, such as transformations, and with the RTI input stage 3138 and RTI output stage 3140, metadata for the job may indicate, for example, the format of data exchanged between components or stages of the job. A table definition describes what the RTI input stage 3138 expects to receive; for example, the input stage of the data integration job might expect three calls: one string and two integers. Meanwhile, at the end of the data integration job flow the output stage may return calls that are in the form (string, integer). When the user creates an RTI service that is going to use this job, it is desirable for the operation that is defined to reflect what data is expected at the input and what data is going to be returned at the output. Compared to a conventional object-oriented programming method, a service corresponds to a class, and an operation to a method, where a job defines the signature of the operation based on based on metadata, such as an RTI input table 3414 associated with the RTI input stage 3138 and an RTI output table 3418 associated with the RTI output stage 3140.

By way of example, a user might define (string, int, int) as the input arguments for a particular RTI operation at the RTI input table 3414. One could define the outputs in the RTI output table 3418 as a struct: (string; int). In embodiments, the input and output might be single strings. If there are other fields (more calls), the user can customize the input mapping. Instead of having an operation with fifteen integers, the user can create a STRUCT (a complex type with multiple fields, each field corresponding to a complex operations), such as Opt (struct(string, int, int)):struct (string, int). The user can group the input parameters so that they are grouped as one complex input type. As a result, it is possible to handle an Array, so that the transaction is defined as: Opt1(array(struct (string, int, int). For example, the input structure could be (Name, SSN, age) and the output structure could be (Name, birthday). The array can be passed through the RTI service. At the end, the service outputs the corresponding reply for the array. Arrays allow grouping of multiple rows into a single transaction. In the RTI console 3002, a checkbox allows the user to "accept multiple rows" in order to enable arrays. To define the inputs, in the RTI console 3002, a particular row may be checked or unchecked to determine whether it will become part of the signature of the operation as an input. A user may not want to expose a particular input column to the operation (for example because it may always be the same for a particular operation), in which case the user can fix a static value for the input, so that the operation only sees the variables that are not static values.

A similar process may be used to map outputs for an operation, such as using the RTI console to ignore certain columns of output, an action that can be stored as part of the signature of a particular operation.

In embodiments, RTI service requests that pass through the data integration platform 2702 from the RTI server 2802 are delivered in a pipeline of individual requests, rather than in a batch or large set of files. The pipeline approach allows individual service requests to be picked up immediately by an already-running instance of a data integration job 3134, resulting in rapid, real-time data integration, rather than requiring the enterprise to wait for completion of a batch integration job. Service requests passing through the pipeline can be thought of as waves, and each service request can be marked by a start of wave marker and an end of wave marker, so that the RTI agent 3132 recognizes the initiation of a new service request and the completion of a data integration job 3134 for a particular service request.

The end of wave marker explains why a system can do both batch and real time operations with the same service. In a batch environment a data integration user typically wants to optimize the flow of data, such as to do the maximum amount of processing at a given stage, then transmit to the next stage in bulk, to reduce the number of times data has to be moved, because data movement is resource-intensive. In contrast, in a real time process, the data integration user wants to move each transaction request as fast as possible through the flow. The end of wave marker sends a signal that informs the job instance to flush the particular request on through the data integration job, rather than waiting for more data to start the processing (as a system typically would do in batch mode). A benefit of end of wave markers is that a given job instance can multiple transactions at the same time, each of which is separated from others by end of wave markers. Whatever is between two end of wave markers is a transaction. So the end of wave markers delineate a succession of units of work, each unit being separated by end of wave markers.

Pipelining allows multiple requests to be processed simultaneously by a service. The load balancing algorithm of the process pooling facility 3102 works in a way that the service first fills a single instance to its maximum capacity (filling the pipeline) before to start a new instance of the data integration job. In a real time integration model, when you have a recall being processed in real time (unlike in a batch mode where the system typically fills a buffer before processing the batch) the end of wave markers allow pipelining the multiple transactions into the flow of the data integration job. For load balancing, the balance cannot be based only on whether a job is busy or not, because a job can handle more than one request, rather than being tagged as "busy" just because one job is being handled.

It is desirable to avoid starting new data integration job instances before the capacity of the pipeline has reached its maximum. This means that load balancing needs to be dynamic and based on additional properties. In the RTI agent process, the RTI agent 3132 knows about the instances running on each data integration platform 2702 accessed by the RTI server 2802. In the RTI agent 3132, the user can create a buffer for each of the job instances that is running on the data integration platform 2702. Various parameters can be set in the RTI console 3002 to help with dynamic load balancing. One parameter is the maximum size for the buffer (measured in number of requests) that can be placed in the buffer waiting for handling by the job instance. It may be preferable to have only a single request, resulting in constant throughput, but in practice there are usually variances in throughput, so that it is often desirable to have a buffer for each job instance. A second parameter is the pipeline threshold, which is a parameter that says at what point it may be desirable to initiate a new job instance. In embodiments, the threshold may be a warning indicator, rather than automatically starting a new instance, because the delay may be the result of an anomalous increase in traffic. A third parameter determines that if the threshold is exceeded for more than a specified period of time, then a new instance will be started. In sum, pipelining properties, such as the buffer size, threshold, and instance start delay, are parameters that the user can set so that the system knows whether to set up new job instances or to keep using the same ones for the pipeline.

In embodiments, all of the data integration platforms 2702 are DataStage server machines. On each of them, there can be data integration jobs 3134, which may be DataStage jobs. The presence of the RTI input stage 3138 means that a job 3134 is always up and running and waiting for a request, unlike in a batch mode, where a job instance is initiated at the time of batch processing. In operation, the data integration job 3134 is up and running with all of its requisite connections with databases, web services, and the like, and the RTI input stage 3134 is listening, waiting for some data to come. For each transaction the end of wave marker travels through the stages of the data integration job 3134. RTI input stage 3138 and RTI output stage 3140 are the communication points between the data integration job 3134 and the rest of the RTI service environment. For example, a computer application of the business enterprise may send a request for a transaction. The RTI server 2802 knows that RTI data integration jobs 3134 are running on various data integration platforms 2702, which in an embodiment are DataStage servers from Ascential Software. The RTI server 2802 maps the data in the request from the computer application into what the RTI input stage 3138 needs to see for the particular data integration job 3134. The RTI agent 3132 knows what is running on each of the data integration platforms 2702. The RTI agent 3132 operates with shared memory with the RTI input stage 3138 and the RTI output stage 3140. The RTI agent 3132 marks a transaction with end of wave markers, sends the transaction into the RTI input stage 3138, then, recognizing the end of wave marker as the data integration job 3134 is completed, takes the result out of the RTI output stage 3140 and sends the result back to the computer application that initiated the transaction.

The RTI methods and systems described herein allow exposition of data integration processes as a set of managed abstract services, accessible by late binding multiple access protocols. Using a data integration platform 2702, such as the Ascential platform, the user creates some data integration processes (typically represented by a flow in a graphical user interface). The user then exposes the processes defined by the flow as a service that can be invoked in real time, synchronously or asynchronously, by various applications. To take greatest advantage of the RTI service, it is desirable to support various protocols, such as JMS queues (where the process can post data to a queue and an application can retrieve data from the queue), Java classes, and web services. Binding multiple access protocols allows various applications to access the RTI service. Since the bindings handle application-specific protocol requirements, the RTI service can be defined as an abstract service. The abstract service is defined by what the service is doing, rather than by a specific protocol or environment.

An RTI service can have multiple operations, and each operation is implemented by a job. To create the service, the user doesn't need to know about the particular web service, java class, or the like. When designing the data integration job that will be exposed through the RTI service, the user doesn't need to know how the service is going to be called. The user generates the RTI service, and then for a given data integration request the system generates an operation of the RTI service. At some point the user binds the RTI service to one or more protocols, which could be a web service, Enterprise Java Bean (EJB), JMS, JMX, C++ or any of a great number of protocols that can embody the service. For a particular RTI service you may have several bindings, so that the service can be accessed by different applications with different protocols.

Once an RTI service is defined, the user can attach a binding, or multiple bindings, so that multiple applications using different protocols can invoke the RTI service at the same time. In a conventional WSDL document, the service definition includes a port type, but necessarily tells how the service is called. A user can define all the types that can be attached to the particular WSDL-defined jobs. Examples include SOAP over HTTP, EJB, Text Over JMS, and others. For example, to create an EJB binding the RTI server 2802 is going to generate Java source code of an Enterprise Java Bean. At service deployment the user uses the RTI console 3002 to define properties, compile code, create a Java archive file, and then give that to the user of an enterprise application to deploy in the users Java application server, so that each operation is one method of the Java class. As a result, there is a one to one correspondence between an RTI service name and a Java class name, as well as a correspondence between an RTI operation name and a Java method name. As a result, Java application method calls will call the operation in the RTI service. As a result, a web service using SOAP over HTTP and a Java application using an EJB can go to the exact same data integration job via the RTI service. The entry point and exit points don't know anything about the protocol, so the same job is working on multiple protocols.

While SOAP and EJB bindings support synchronous processes, other bindings support asynchronous processes. For example, SOAP over JMS and Text over JMS are asynchronous. For example, in an embodiment a message can be attached to a queue. The RTI service can listen to the queue and post the output to another queue. The client that posted the message to the queue doesn't wait for the output of the queue, so the process is asynchronous.

Figure 32:
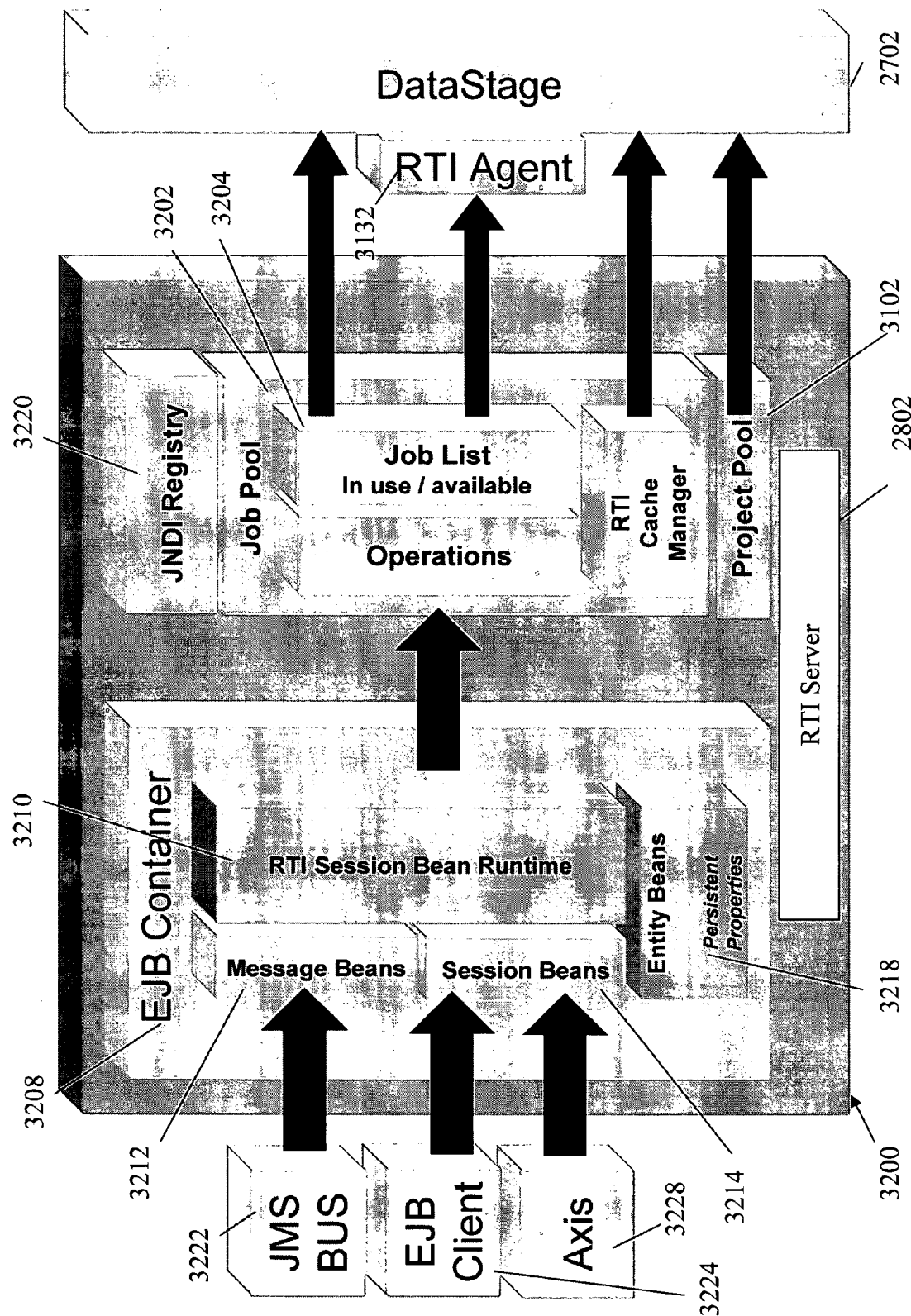
FIG. 32 is a schematic diagram of the internal architecture for an RTI service.

FIG. 32 is a schematic diagram 3200 of the internal architecture for an RTI service. The architecture includes the RTI server 2802, which is a J2EE-compliant server. The RTI server 2802 interacts with the RTI agent 3132 of the data integration platform 2702. The project pool facility 3102 manages projects by selecting the appropriate data integration platform machine 2702 to which a data integration job will be passed. The RTI server 2802 includes a job pool facility 3202 for handling data integration jobs. The job pool facility 3202 includes a job list 3204, which lists jobs and a status of available or not available for each job. The job pool facility includes a cache manager and operations facility for handling jobs that are passed to the RTI server 2802. The RTI server 2802 also includes a registry facility 3220 for managing interactions with an appropriate public or private registry, such as publishing WSDL descriptions to the registry for services that can be accessed through the RTI server 2802.

The RTI server 2802 also includes an EJB container 3208, which includes an RTI session bean runtime facility 3210 for the RTI services, in accordance with J2EE. The EJB container 3208 includes message beans 3212, session beans 3214, and entity beans 3218 for enabling the RTI service. The EJB container 3208 facilitates various interfaces, including a JMS interface 3222, and EJB client interface 3224 and an Axis interface 3228.

Figure 33:
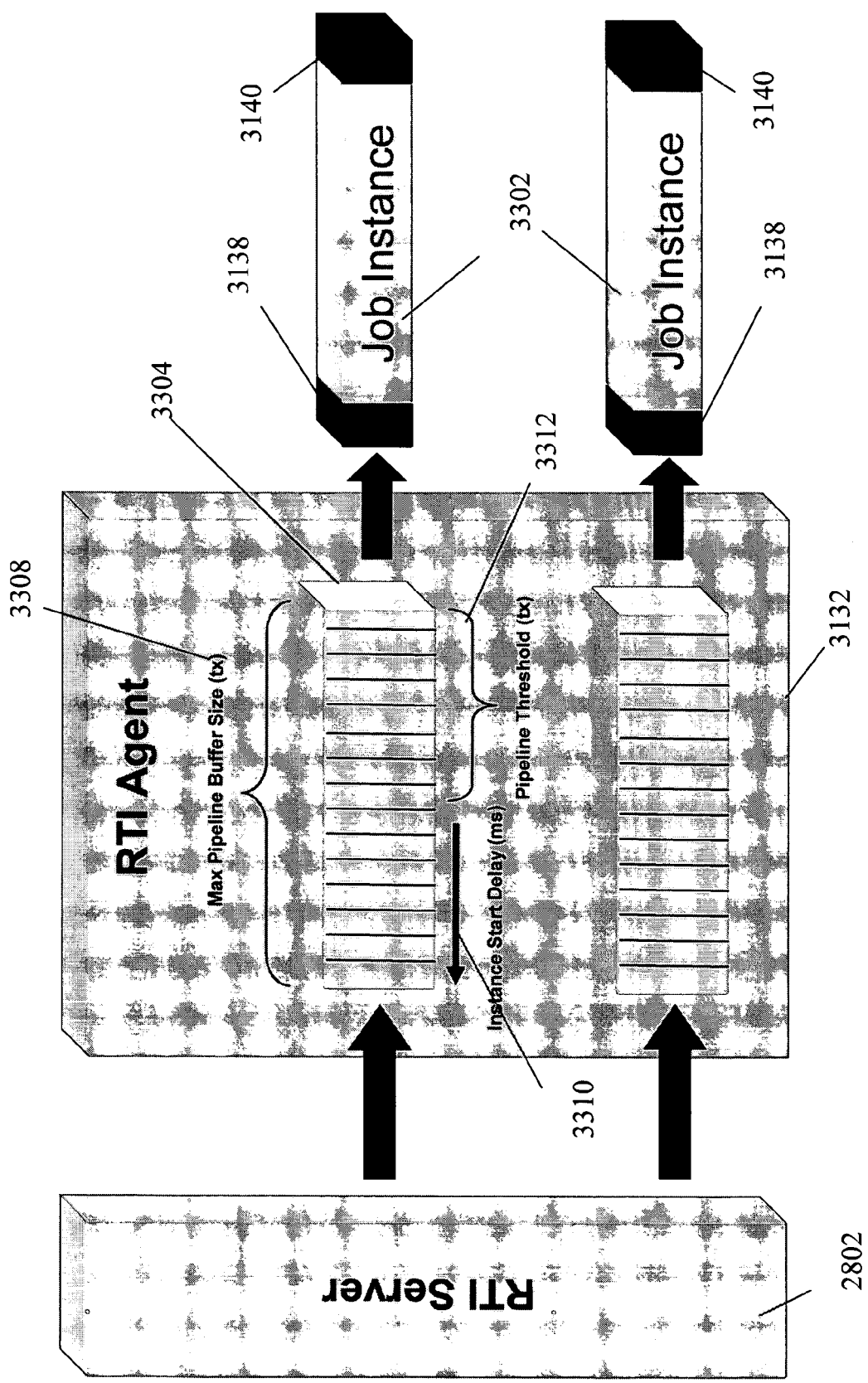
FIG. 33 illustrates an aspect of the interaction of the RTI server and an RTI agent.

Referring to FIG. 33, an aspect of the interaction of the RTI server 2802 and the RTI agent 3132 is that RTI agent 3132 manages a pipeline of service requests, which are then passed to a job instance 3302 for the data integration job. The job instance 3302 runs on the data integration platform 2702, and has an RTI input stage 3138 and RTI output stage 3140. Depending on need, more than one job instance 3302 may be running on a particular data integration platform machine 2702. The RTI agent 3132 manages the opening and closing of job instances as service requests are passed to it from the RTI server 2802. In contrast to traditional batch-type data integration, each request for an RTI service travels through the RTI server 2802, RTI agent 3132, and data integration platform 2702 in a pipeline 3304 of jobs. The pipeline 3304 can be managed in the RTI agent 3132, such as by setting various parameters of the pipeline 3304. For example, the pipeline 3304 can have a buffer, the size of which can be set by the user using a maximum buffer size parameter 3308. The administrator can also set other parameters, such as the period of delay that the RTI agent 3132 will accept before starting a new job instance 3302, namely, the instance start delay 3310. The administrator can also set a threshold 3312 for the pipeline, representing the number of service requests that the pipeline can accept for a given job instance 3302.

Figure 34:
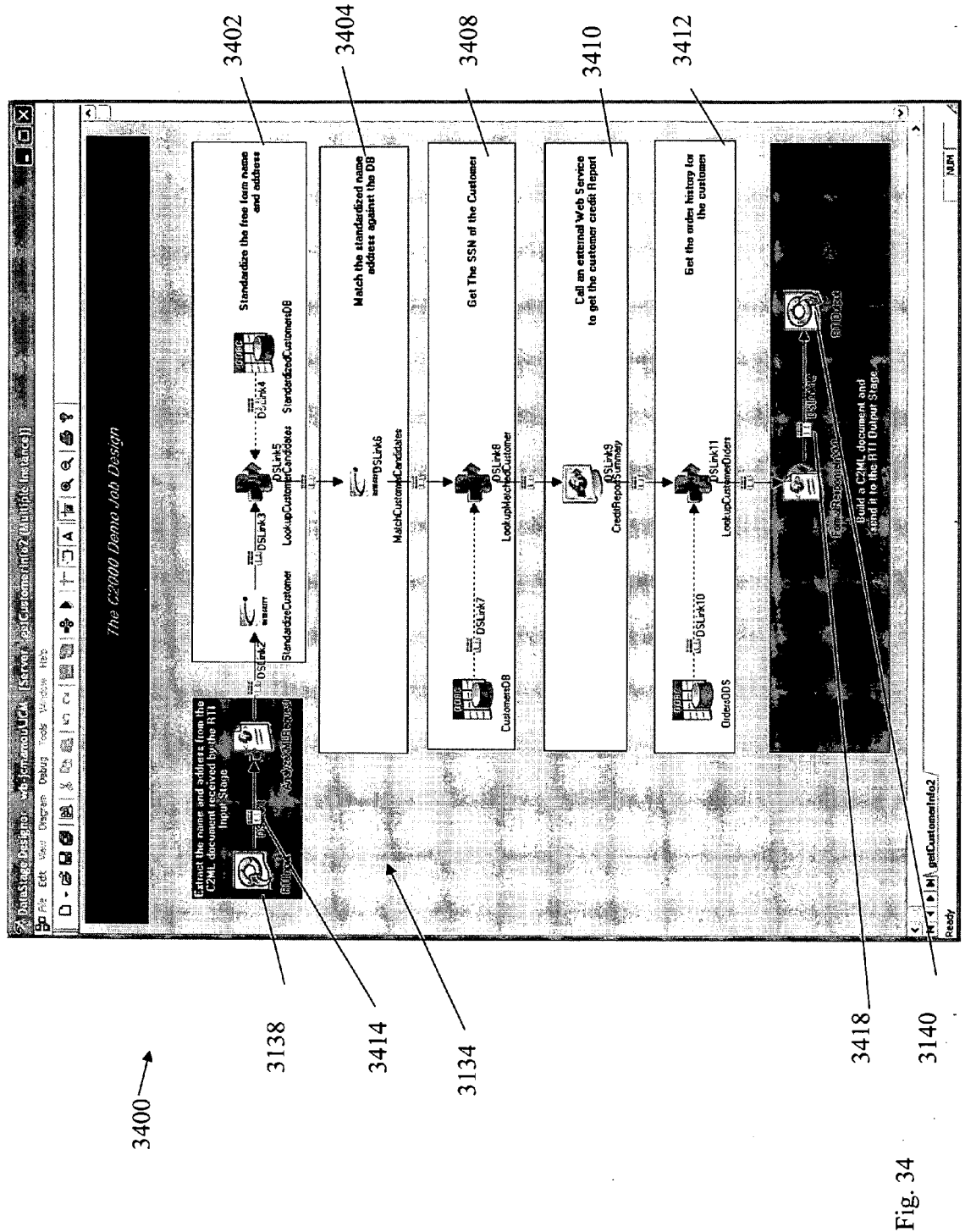
FIG. 34 represents a graphical user interface through which a designer can design a data integration job.

Referring to FIG. 34, a graphical user interface 3400 is represented through which a designer can design a data integration job 3134. The graphical user interface 3400 can be thought of as a design canvas onto which icons that represent data integration tasks are connected in a flow that produces a data integration job. Thus, in the example depicted in FIG. 34, the data integration job includes a series of data integration tasks, such as a step 3402 in which the job standardizes the free form name and address of a data item, a task 3404 in which the job matches the standardized name against a database, a task 3408 in which the job retrieves the social security number of a customer, a task 3410 in which the job calls an external web service to retrieve the customer's credit report, and a task 3412 in which the job retrieves an order history for the customer. The various steps are represented in the user interface 3400 by graphical icons, each of which represents an element of business logic and each of which can trigger the code necessary to execute a task, such as a transformation, of the data integration job 3134, as well as connectors, which represent the flow of data into and out of each of the tasks. Different types of icons represent, for example, retrieving data from a database, pulling data from a message queue, or requesting input from an application. The data integration job 3134 can access any suitable data source and deliver data to any suitable data target, as described above in connection with FIGS. 1-22.

In embodiments, the user interface 3400, in addition to the elements of a conventional data integration job 3134, can optionally include RTI elements, such as the RTI input stage 3138 and the RTI output stage 3140. In RTI embodiments, the RTI input stage 3138 precedes the first steps of the data integration job 3134. In this case, it is designed to accept a request from the RTI server 2802 in the form of a document and to extract the customer name from the document. The RTI input stage 3138 includes the RTI input table 3414, which defines the metadata for the RTI input stage 3138, such as what format of data is expected by the stage. The RTI output stage 3140 formats the data retrieved at the various steps of the data integration job 3134 and creates the document that is delivered out of the job at the RTI output stage 3140. The RTI output stage 3140 includes the RTI output table 3418, which defines metadata for the RTI output stage 3140, such as the format of the output. In this embodiment, the document delivered to the RTI input stage 3138 and from the RTI output stage 3140 is a C2ML document. The graphical user interface 3400 is very similar to an interface for designing a convention batch-type data integration job, except that instead of accepting a batch of data, such as a large group of files, the job 3134 is designed to accept real-time requests; that is, the job 3134, by including the RTI input stage 3138 and the RTI output stage 3140, can be automatically exposed as a service to the RTI server 2802, for access by various applications of the business enterprise. Thus, the user interface 3400 makes it a trivial change for the data integration job designer to allow the job to operate in real-time mode, rather than just in batch mode. The same data integration flow can work in batch or real time modes. Each icon on the designer canvas represents a type of transformation.

In the example of FIG. 34, the business logic of the data integration job 3134 being designed includes elements for a scenario in which a company is doing repeat business with a customer. A business enterprise may want to be able to do real time queries against databases that contain data relevant to their customers. A clerk in store may ask a customer for the customer's name and address. A point-of-purchase application in the store then executes a transaction, such as sending an XML document with the name and address. The data integration job 3134 is triggered at the RTI input stage 3138, extracts name and address at the step 3402, uses a quality process, such as Ascential's QualityStage, to create a standardized name and address, does matching with database to ensure that the correct customer has been identified at a step 3404, gets the SSN (social security number) of the customer at the step 3408 calls an external web service to get a credit report at the step 3410, searches a database for past orders for the customer at the step 3412, and finishes by building an XML document to send information back to the clerk in the store at the RTI output stage 3140. Additional details for implementation of a graphical user interface to convert batch-type data integration jobs into real-time data integration jobs are described in the applications incorporated by reference herein.

Figure 35:
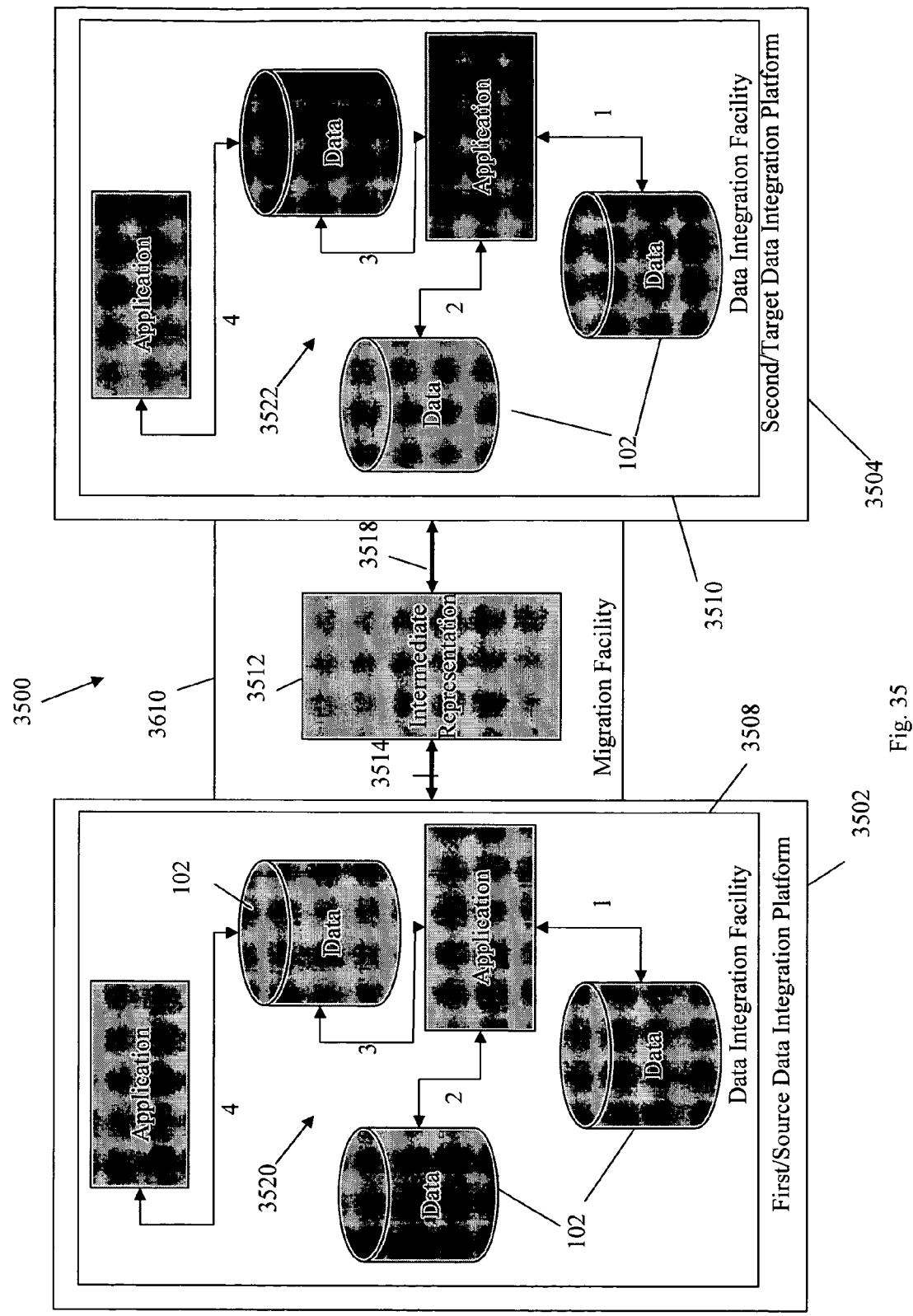
FIG. 35 is a high-level schematic of a migration facility for migrating a data integration facility from one platform to another.

Referring to FIG. 35, another embodiment of the present invention relates to situations where an enterprise interacts with more than one data integration platform, such as when migrating from a legacy data integration platform to a new data integration platform, or when an enterprise has in operation more than one data integration platform, such as after merger or acquisition between entities that use disparate data integration platforms. In this context, a data integration platform may be a platform 100 described above, supporting one or more data integration systems 104, such as a platform 100 that supports an atomic model for metadata management; alternatively, the enterprise may have multiple platforms that use disparate types of metadata, data models, and that support disparate data integration systems and facilities for disparate types of data integration jobs. FIG. 35 depicts an environment 3500 where an enterprise has a first data integration platform 3502 and a second data integration platform 3504. In embodiments, the first data integration platform 3502 may be a source data integration platform 3502, and the second platform may be a target data integration platform 3504. In other embodiments, the first and second platforms 3502, 3504 may represent two platforms used in the environment 3500, such as by different business units, including to transfer data integration jobs between them, with each platform 3502, 3504 serving at different times as either the source or the target for migration of a data integration facility, such as a data integration job. In embodiments, the two platforms 3502, 3504 may represent two platforms used by different enterprises that wish to integrate data integration jobs between them. The platforms 3502, 3504 may be any of a wide variety of commercially available platforms, or proprietary platforms of an enterprise, including, for example and without limitation, platforms offered by Ascential, Acta, Actional, Acxiom, Applix, AserA, BEA, Blue Martini, Cognos, CrossWorlds, DataJunction, Data Mirror, Epicor, First Logic, Hummingbird, IBM, Mercator, Metagon, Data Advantage Group, Informatica, Microsoft, Neon, NetMarkets Europe, OmniEnterprise, Onyx, Oracle, Computer Associates, Protagona, Viasoft, SAP, SeeBeyond, Symbiator, Talarian, Tibco, Tilian, Vitria, Weblogic, Embarcadero Technologies, Inc., Evolutionary Technologies International, Inc., Group 1 Software Inc., SAS Institute Inc., and WebMethods, including, for example, and without limitation, the following platforms, Ascential Datastage and Metastage, Acxiom Abilitec, BEA Weblogic, First Logic DMR, Hummingbird ETL, IBM Visual Warehouse, MetaCenter from Data Advantage Group, Microsoft DTS, Oracle Data WebHouse, Platinum Repository from Computer Associates, Rochade Repository from Viasoft, and Weblogic Devloper's Page.

As described in detail herein, a data integration platform 3502, 3504 can support one or more data integration facilities 3508, 3510, which may be data integration jobs. Data integration jobs manipulate data that resides in one or more data facilities or databases 102, such as to synchronize databases 102, allow retrieval of consistent data from databases 102 by one or more applications, operate on data from one or more databases 102 in an application, then store the result in another database 102, or the like. As described herein, a data integration facility 3508, 3510 may be a data integration job, such as an Extract, Transform and Load (ETL) job, a data integration system 104, or any other facility that integrates data across disparate elements of an enterprise, such as databases, applications, or machines. When, as in the environment 3500 of FIG. 35, an enterprise has more than one data integration platform 3502, 3504, it is frequently desirable to be able to replicate data integration facilities 3508, such as ETL jobs, that are created on the first data integration platform 3502, on the second data integration platform 3504 as new data integration facilities 3510 that are suitable for operation on the different platform 3504. Historically, new data integration jobs have required substantial development effort, as each job is likely to require interaction with data in different native data formats, data of varying quality, databases that use varying communication protocols, applications using different data structures and command structures, machines using different operating systems and communication protocols. Moreover, each data integration job can itself have great complexity, requiring the user to connect a large number of databases, applications and machines in the proper sequence. Given the complexity of generating a new data integration job, it is highly desirable to simplify the migration of existing data integration jobs on a source data integration platform 3502 to a target data integration platform 3504. The methods and systems of an embodiment of the present invention include a migration facility 3610 for migrating a data integration facility 3508 of a source data integration platform 3502 to a data integration facility 3510 of a target data integration platform 3504 that replicates the functions of the first data integration facility 3508. The migration facility 3610 may include an interface 3514 to the first data integration platform 3502 for receiving data from the first data integration platform 3502, a second interface 3518 to the target data integration platform 3504, and a facility for supporting an intermediate representation 3512 that facilitates migration. In embodiments of the invention, the intermediate representation 3512 is a generic, platform-independent, object-oriented representation of the data and metadata of the data integration facility 3508, such as representing such data and metadata in a class/member model. Rendering the metadata in an object-oriented format allows convenient transformation of the data integration facility 3508 into a new data integration facility 3510 that can run on a different platform, such as the target data integration platform 3504, or any other applicable data integration platform.

Figure 36:
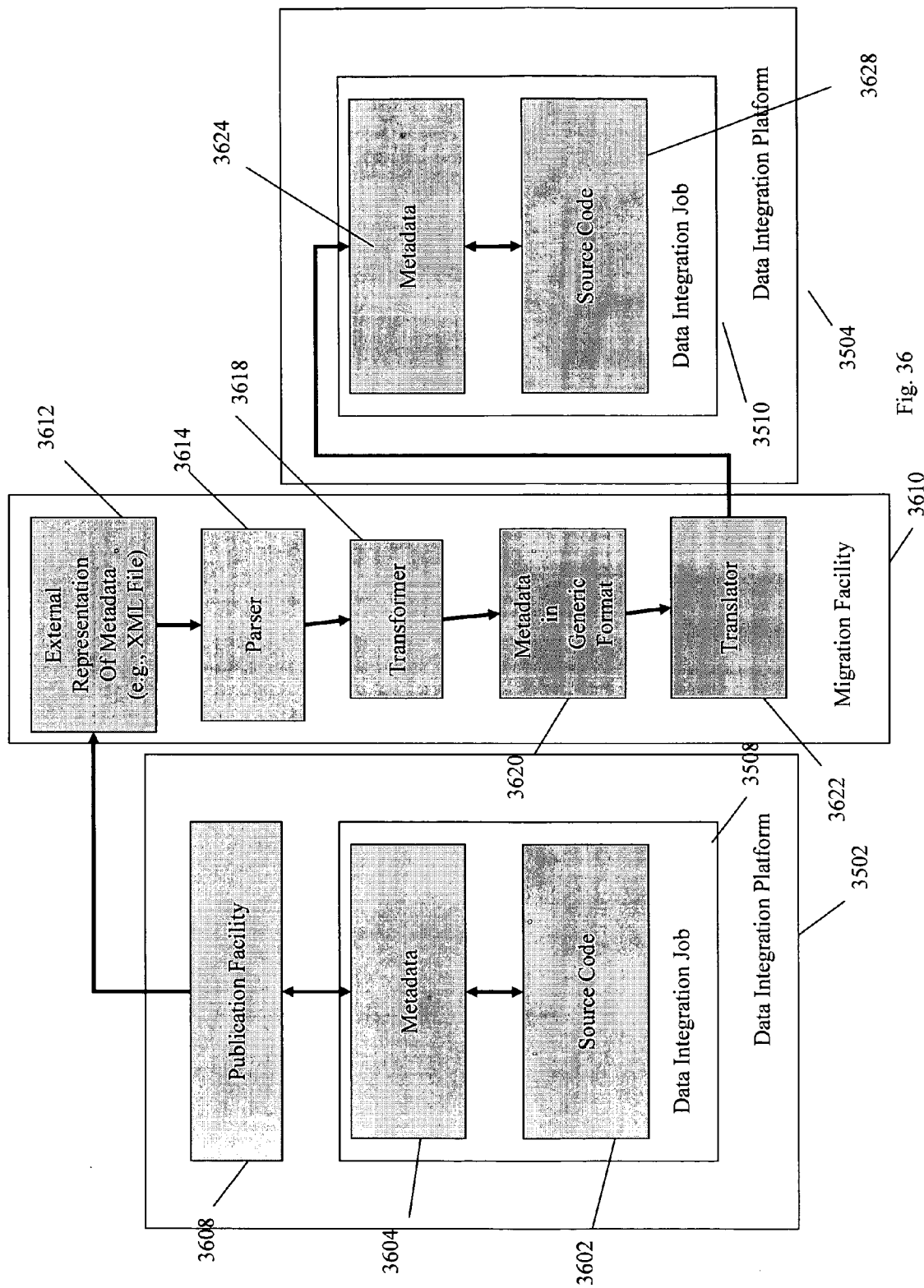
FIG. 36 is another representation of a migration facility.

Referring to FIG. 36, certain additional details of the data integration platforms 3502, 3504 and the migration facility 3610 are provided. The source data integration platform 3502 may support a data integration job 3508, which is embodied in source code 3602 in the native language and format for the data integration platform 3502. The data integration job 3508 may, for example, be an ETL job running on one of the platforms described above. The source code may be written in any conventional programming language, such as C, COBOL, C++, Java, Delphi, Pascal, Fortran, Ada or the like. The data integration job 3508 may have associated metadata 3604. The metadata can be any kind of metadata. For example, the metadata can contain information about the data integration job 3508, such as information about the sources and targets with which the data integration job 3508 interacts, including databases, applications, and machines, information about the data formats and models for such sources and targets, information about the sequence and structure of extraction, transformation and loading steps that are accomplished by the data integration job, information about data quality and cleansing, and any other metadata used in any type of data integration platform or data integration job. Metadata can be embodied in various forms, including, for example and without limitation, XML, text scripts, COBOL language format, C++ format, C language format, Teradata format, a Delphi format, a Pascal format, a Fortran format, a Java format, and Ada format, one or more object-oriented formats, one or more markup language formats, or other formats. The data integration platform 3502 may include a publication facility 3608 for publishing or externalizing the metadata 3604. For example, the publication facility 3608 can externalize metadata in XML format representing an ETL data integration job.

Referring still to FIG. 36, the externalized representation 3612 of the metadata 3604 can serve as an input to the migration facility 3610, either through an interface 3514 or inputted directly by a user of the migration facility 3610. The migration facility can include a parser 3614 for parsing the metadata 3604 in the native format of the metadata 3604. For example, if the metadata 3604 is in XML format, then the parser 3614 can be an XML parser. The migration facility 3610 can further include a transformer, or transformation facility 3618, for transforming parsed metadata into another format. For example, the transformer can transform XML metadata into metadata in a generic, object-oriented format 3620. In an embodiment, the generic format is an atomic data format, such as described above in connection with the Ascential DataStage data integration platform. The migration facility can further include a translator 3622 for translating metadata from the generic, object-oriented format into a native format for a second data integration platform 3504, including generating source code 3628 and metadata 3624 for the data integration job 3510 on the second data integration platform 3504. The new data integration job 3510 thus performs the same function on the second data integration platform 3504 as the original data integration job 3508 performed on the original data integration platform 3502. Thus, the migration facility 3610 is a software program that is uniquely designed to automatically interpret, translate, and re-generate data integration jobs 3508, such as Extract Transformation & Load (ETL) maps/jobs, to and from data integration platforms 3502, 3504, such as ETL tools, that publish, subscribe, and/or externalize their metadata.

The migration facility 3610 thus supports methods and systems for externalizing a metadata representation from a first data integration facility of a source data integration platform have at least one native data format; parsing the metadata representations; importing the metadata representation into a plurality of class/object representations of the data integration facility; generating a virtual representation of the data integration facility in memory; and translating the class/object representations to generate a second data integration facility operating on a target data integration platform, wherein the second data integration facility performs substantially the same functions on the target platform as the first data integration facility performs on the source platform. In embodiments, related to migrating data integration jobs, there are, among other things, the following stages in performing the translation: importing an externalized format into object-oriented, class/object representations for translation, creating a generic virtual data integration process representation in memory, which becomes the baseline for translation into a target tool; and using a translator to take the virtual representation and create objects in the target tool format. In embodiments, the data integration facility 3508 is an ETL job. In embodiments, the externalized metadata representations are brought into memory so they can be analyzed and manipulated easily. In embodiments, the original metadata representations are brought into the migration facility 3610 in their original formats, such as with their original meta-model objects.

Figure 37:
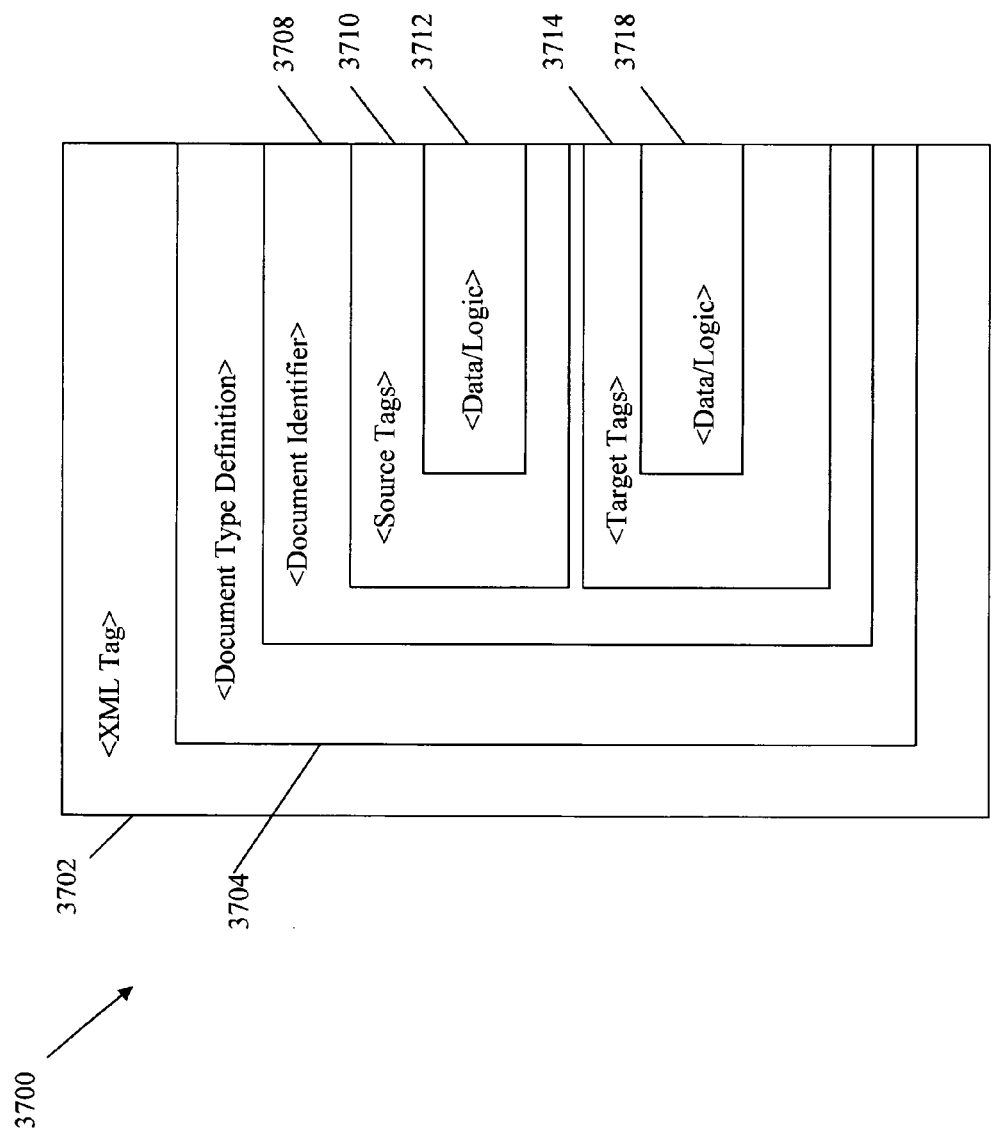
FIG. 37 is a representation of an XML document with metadata for a data integration job.

FIG. 37 shows a high-level representation of an XML document 3700 that contains metadata for a data integration job 3508. The XML document 3700 includes various tags, including a tag 3702 identifying the document as an XML document (which may further include information about which version of the XML standard is employed in the document and the like). The XML document 3700 may include a reference to a document type definition 3704, such as a document type definition that defines an appropriate XML structure for metadata for a data integration job 3508, such as an ETL job. The XML document may include other tags as well, such as a document identifier 3708, which may include a name for the data integration job, a date of creation, author information and the like. The XML document 3700 may include tags that are specific to data integration jobs, such as source tags 3710 relating to data about various sources, such as holding information 3712 about data models, extraction routines, structures, formats, protocols, mappings, and logic for various data sources for the data integration job. The XML document can contain various target tags 3714, containing information 3718 about targets, including information about target data models, formats, mappings, structures, protocols and the like, as well as information about transformations from source formats to target formats, information about the sequence of transformations from various sources to various targets and information about loading transformed data to targets. An example of an actual XML document 3700 that includes a metadata representation of a data integration job is set forth as Appendix A.

Figure 38:
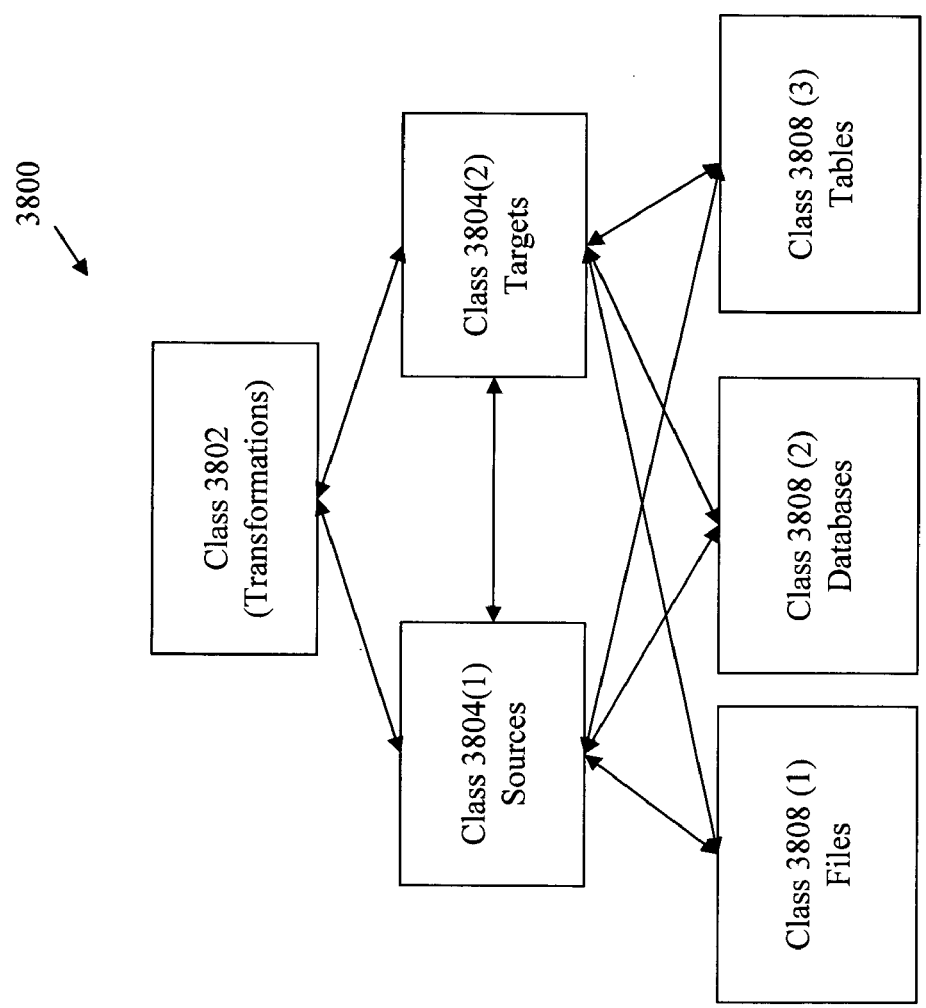
FIG. 38 is a high-level schematic representation of an atomic, class-member, object-oriented metadata model.

FIG. 38 shows a high-level schematic representation 3800 of metadata in an atomic format. The atomic format is an example of an object-oriented, generic, class/member format suitable for serving as the intermediate representation 3512 of the metadata 3604 of a source data integration job 3508 that runs on a data integration platform 3502. The atomic format can have the attributes of the atomic formats described elsewhere herein in connection with data integration jobs, such as in connection with the discussion of FIG. 14. For example, metadata may be described in classes, such as a class 3802 of transformations, members of which may include various defined transformations between a data source and a data target. The class of transformations may be defined as inter-related with other classes, such as a class 3804(1) of sources and a class 3804(2) of targets. The source class 3804(1) and the target class 3804(2) may have their own respective members, such as files, databases, tables and other facilities that can serve as sources and targets. Each of those members can be a class itself, such as a file class 3808(1) a database class 3808(2) and a table class 3808(3), which in turn can have its own members. These classes 3808 can have defined relationships with other classes, such as the source class 3804(1) and the target class 3804(2). Each of the lower-level classes can then have sub-classes, drilling down until all metadata is represented in a low-level, atomic format. The various classes can also be defined as having relationships with various attributes, such as the attributes of a source or target for a given transformation. The atomic format and other class/member, object-oriented formats allow platform-independent description of data integration jobs, representing the logic and sequence of, for example, extraction of data from various sources, transformation of data into formats suitable for various targets, and loading of data into the targets.

Figure 39:
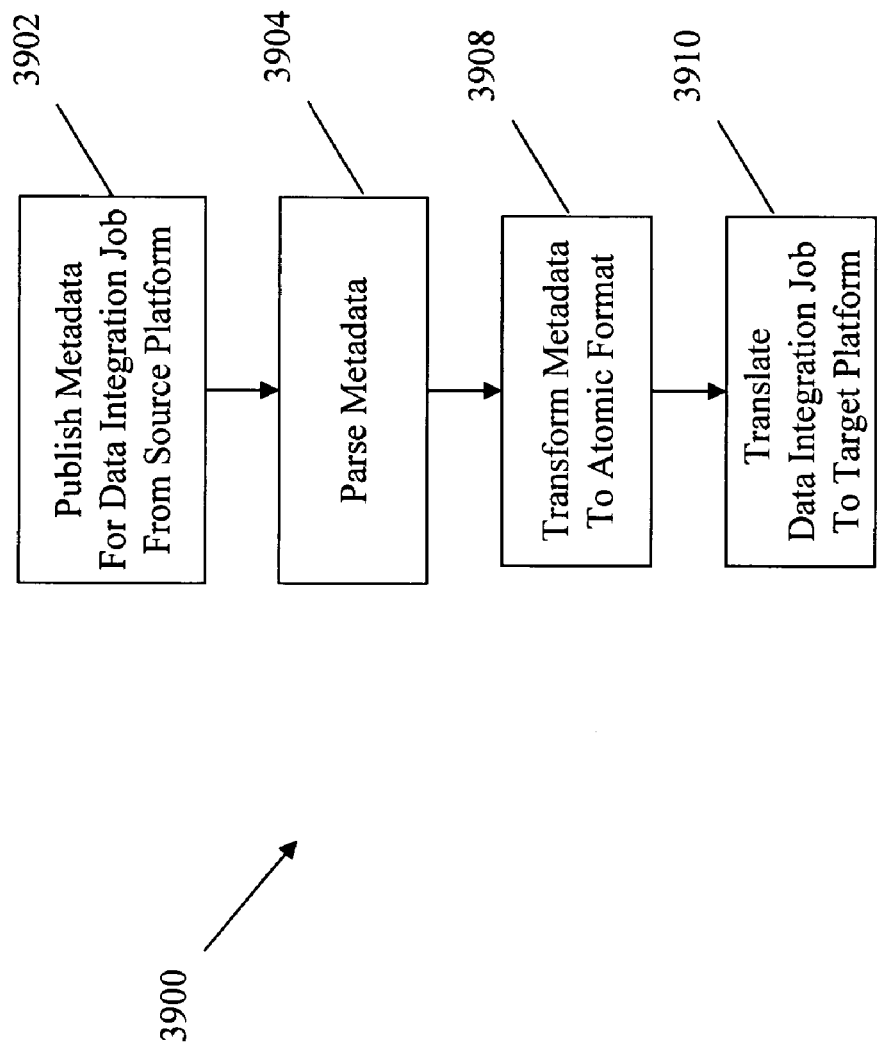
FIG. 39 is a flow diagram with methods steps for migrating a data integration job from one platform to another.

Referring to FIG. 39, a flow diagram 3900 shows high-level steps for migrating a data integration job 3508 from one data integration platform 3502 to another data integration platform 3504. First, at a step 3902, metadata for the data integration job on the source data integration platform 3502 is published into an external format. Once the metadata is brought into memory, such as of a data migration facility 3612, the metadata is parsed at a step 3904. At a step 3908 the metadata is transformed into a generic, object-oriented format, such as an atomic format, with class/member relationships defined among various objects that comprise the source data integration job 3508. The generic representation is optionally a virtual representation, and creating a virtual representation can include steps of producing a set of objects that represent a generic meta-model for a data integration job, such as an ETL job. Thus, the steps 3902 through 3908 produce a set of objects that represent a generic meta-model for the data integration job, such as an ETL job. In embodiments, the generic meta-model is an atomic ETL object model, such as the Ascential atomic ETL object model described elsewhere herein. Thus, in embodiments, parsing information from the export file is a matter breaking up the lines into "pieces" at the step 3904, then at the step 3908 creating objects within the migration facility 3612 or hub that represents the atomic elements of the metadata of the data integration job 3508, such as atomic XML elements for an ETL job. For example, in the exported file there can be tags that represent a source, a target, and mapping transforms, instances, and connectors. The migration facility 3612 can instantiate classes, such as C++ classes, to represent the objects of the exported file in the memory of the migration facility 3612. This makes the tags, such as XML tags, of the exported file available as memory objects that can be used for translation. The atomic object model becomes the basis for translations into/and out of the individual data integration platform models, such as ETL tool models. The outcome of the step 3908 is the intermediate representation 3512 than can serve as a hub that can be used for bi/directional translations of data integration jobs between data integration platforms 3502, 3504. Finally, at a step 3910, the generic object model for the data integration job 3508 is translated into the native code for the target data integration platform 3504. The step 3910 translates, for example, an atomic format model into a native data format for a destination integration facility. In embodiments, the destination format can be an XML format, a Text Export format, a script format, a COBOL format, a C language format, a C++ format, and/or a Teradata format. The last step 3910 takes the objects in the virtual model of the migration facility 3612 and translates the objects into the target format, such as XML metadata suitable for the second/target data integration platform 3504. This finishes the translation process and produces the ultimate usable result, namely, a data integration job 3510 that mimics the operation of the data integration job 3508, but that can operate on the new platform 3504.

The migration facility 3612 can benefit from accumulated knowledge about class/member relationships in data integration jobs and data integration platforms, to facilitate translation of jobs between formats, using the generic, atomic model as a hub for translation. Thus, the migration facility 3612 can capture all or most possible operations of a data integration job, such as an ETL process, into a low-level integrated object model.

The migration facility 3612 can use a brokering methodology to translate ETL logic from one form to another. Each unique data integration platform 3502, 3504, such as various ETL tools, can be semantically mapped to a preferred object model, such as an atomic object model, using a translation broker, such as an ETL translation broker. Each translation broker embodies expert knowledge on how to interpret and translate the externalized format exported from the specific data integration platform 3502, 3504 to the generic object model, such as the atomic object model. The entire design and implementation of the migration facility 3612 can be modular, in that the translation brokers can be added to a data integration tool or platform individually, without having to re-compile the data integration tool or platform.

In embodiments, the translation facility 3910 may translate a data integration job 3508 that has been exposed as a web service, or the translation facility may add input and output stages as discussed herein to expose a data integration job that is prepared in a batch environment as a service in a real-time environment.

In embodiments, the migration facility 3612 is a bi-directional translation facility. The object-oriented, generic representations, such as an atomic ETL object model, of the migration facility can be used to take data integration jobs made in either platform 3502, 3504 (or any arbitrarily large number of platforms) and generate corresponding jobs in the other platform, using the generic representations as an object-oriented hub for transformations of data integration jobs. Thus, the bi-directional translation facility can translate a data integration job from the target data integration facility to the source data integration facility, as well as from the source data integration facility to the target data integration facility.

In embodiments, the methods and systems disclosed herein provide for converting an instruction set for a source ETL application to a second format for a destination ETL application. The migration facility 3612 can include facilities for extracting an instruction set in the first format from a source ETL application instruction set file; converting the instruction set into a plurality of representations in an externalized format; parsing the plurality of representations; transforming the plurality of representations into an atomic object model; translating the atomic object model into the second format; and loading the output of the translation into a destination ETL application instruction set file. In embodiments, the methods and systems can operate on commercially available ETL tools, such as the data integration products described above. In embodiments, the migration facility 3612 can convert an instruction set in the reverse direction, from the second format to the first format. The source ETL application instruction set file can be an ETL map or ETL job. The job can include meta-model objects. In embodiments, the destination ETL application is a comparable ETL map or ETL job that also includes meta-model objects. The ETL application can be a software tool capable of publishing, subscribing and externalizing metadata associated with the ETL application or ETL jobs or maps that are executed using the ETL application. The destination ETL application can have similar facilities. The ETL application can publish metadata in various formats, such as XML. The atomic object model can be a low-level, integrated, object-oriented model with classes and members that correspond to knowledge about the object-oriented structures typical of data integration jobs. In embodiments, the ETL application can be semantically mapped to the atomic model through the user of a modular translation application. The representations can be class/object representations. The representations can be virtual ETL process representations. The representations can be aspects of a generic meta-model for the source ETL application. In embodiments, the representations are stored on storage media, such as memory of the migration facility 3612, or volatile or non-volatile computer memory such as RAM, PROM, EPROM, flash memory, and EEPROM, floppy disks, compact disks, optical disks, digital versatile discs, zip disks, or magnetic tape.

Figure 40:
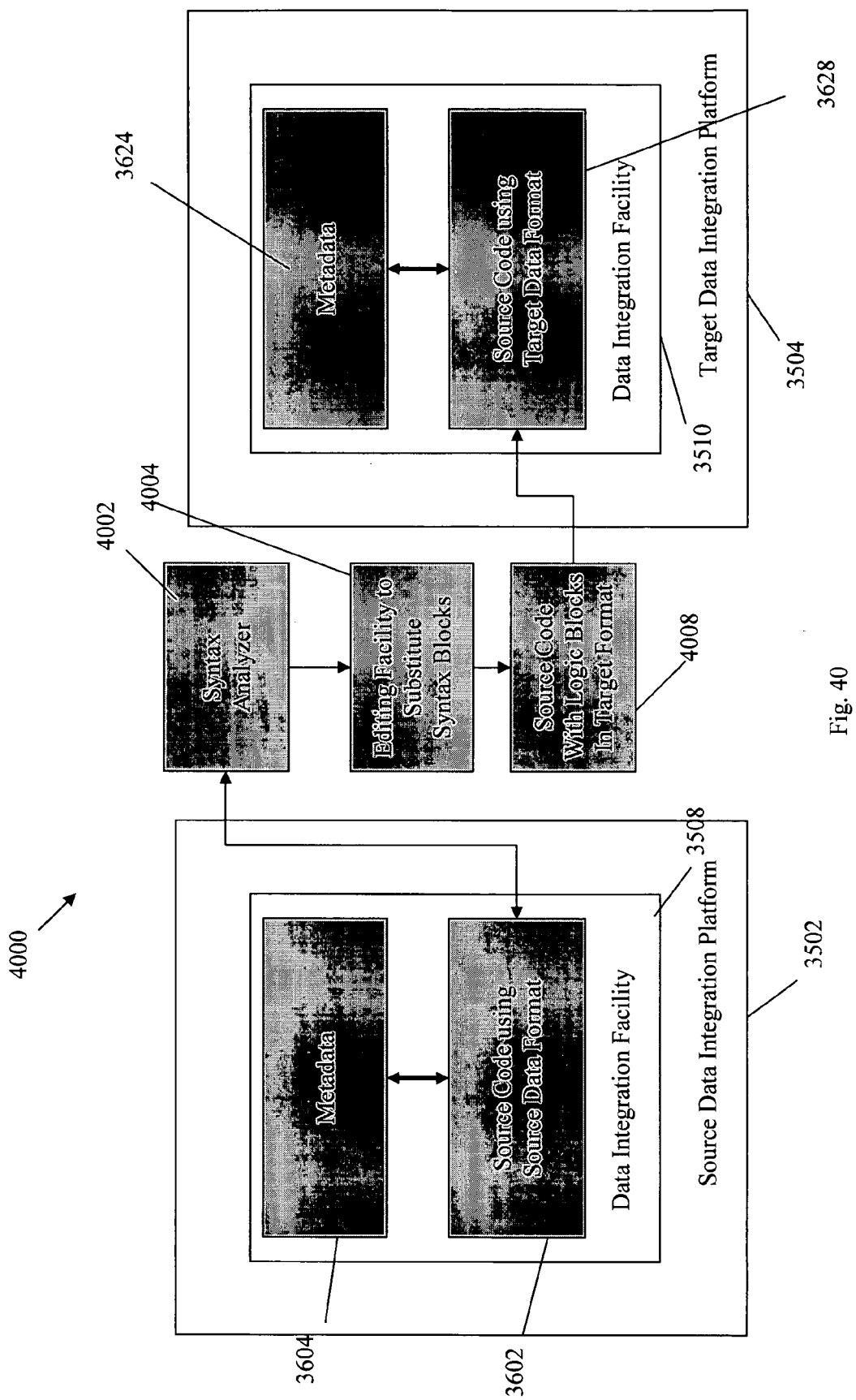
FIG. 40 is a high-level schematic diagram of a block-syntax facility for assisting in migration of a data integration facility/job from one platform to another.

In other embodiments of the methods and systems described herein, it is possible to migrate a data integration facility 3508, such as a data integration job, from a source data integration platform 3502 to a target data integration platform 3504 through techniques that analyze the syntax of the source code of the data integration facility 3508. Referring to FIG. 40, in an architecture 4000, the data integration facility 3508 can have source code 3602 and metadata 3604. The source code can be coded in any conventional coding language, such as described above, determined by the native language or languages of the source data integration platform 3502. In embodiments, it is possible to analyze the syntax of the source code 3602, using a syntax analysis facility 4002. The source code 3602 can be divided into syntax blocks that can be identified as performing known data integration functions, such as source and target identification, data cleansing, mapping, extraction, transformation and loading. Once the function of a syntax block is known, it can be replaced by a substitute syntax block that performs the same function in a different coding language for a different function, such as by an editing facility 4004. The result is a modified source code 4008, with substituted code blocks using the data format and protocols of the target data integration platform. The resulting code can then be edited to perform the data integration job 3510 on the target data integration platform 3504. The syntax blocks are similar to the objects in the intermediate representations of previous embodiments, except that they are found directly in source code, rather than in metadata for the data integration job 3508.

Figure 41:
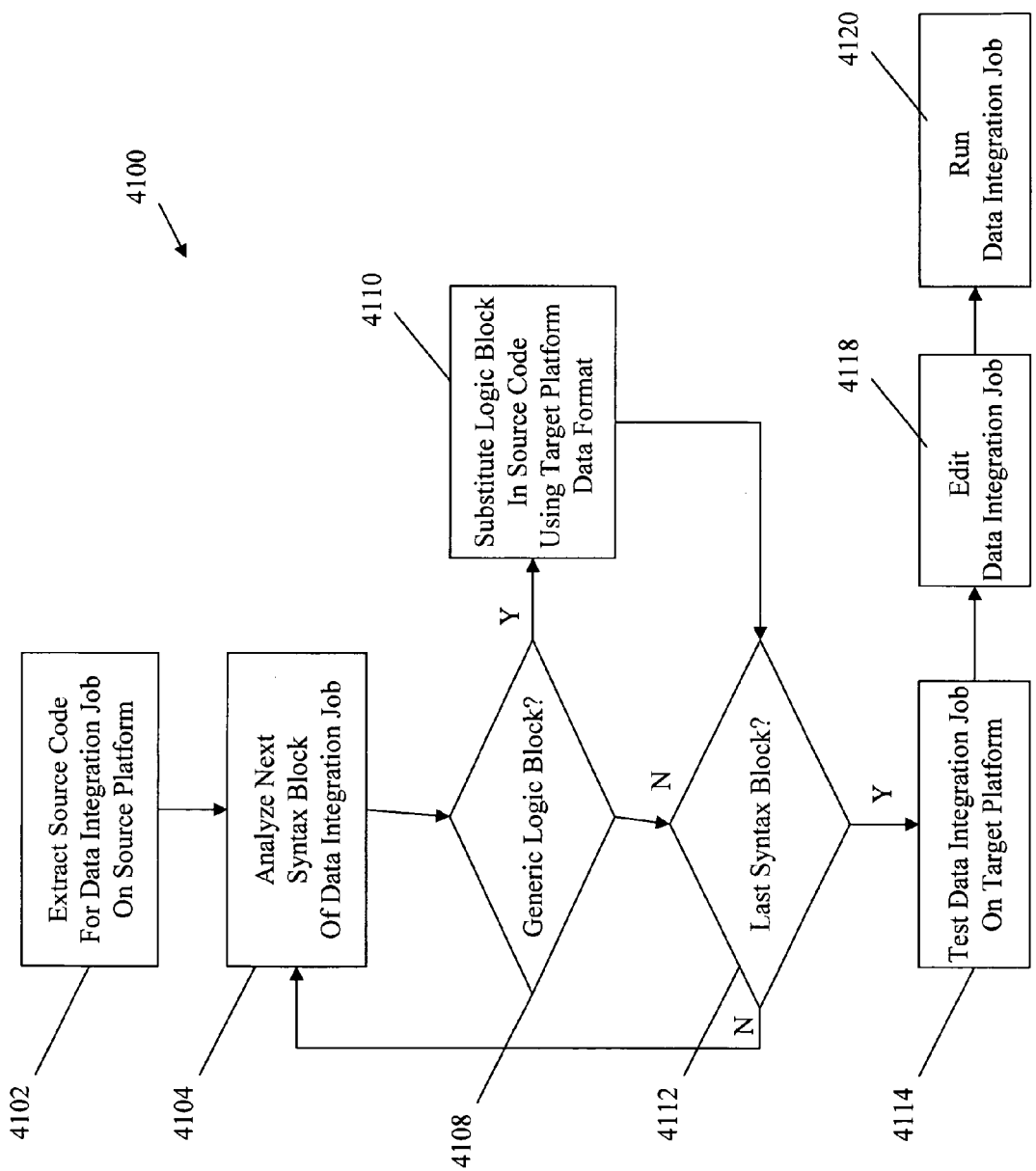
FIG. 41 is a flow diagram showing steps for migrating a data integration job/facility from one platform to another using a block-syntax substitution method.

Referring to FIG. 41, a flow diagram 4100 shows steps for substituting syntax blocks in a target data integration platform 3504 format into source code 3602 for a source data integration facility 3508 of a source data integration platform 3502. First, at a step 4102, source code 3602 is published or extracted for the source data integration facility 3508. The source code 3602 can be brought into memory, such as memory of a source code analyzer 4002. Next, at a step 4104, a block of the source code is analyzed, such as to determine whether it represents a generic block of logic using a generic syntax. At a step 4108 if it is determined that a block is a generic logic block, then an alternative logic block representing the same logic but in a different data format is substituted at a step 4110. After substitution at the step 4110 or if the logic block is not a generic logic block at the step 4108, it is determined at a step 4112 whether the block is the last logic block to be analyzed. If not, then processing is returned to the step 4104 for analysis of the next block of logic. If the block is the last block to be analyzed at the step 4112, then at a step 4114 the source code can be tested, such as by running the source code that contains the substituted logic blocks on the target data integration platform 3502. If there are errors, then the source code can be edited at a step 4118, and when all errors are eliminated, the data integration job 3510 can be run at the step 4120 on the second data integration platform 3504, now containing source code suitable for the format of that data integration platform 3504, which has been substituted block-by-block for source code 3602 of the source data integration platform 3502.

The methods and systems disclosed herein thus include methods and systems for migrating a data integration job from a source data integration platform having a native format to a target data integration platform having a different native format, including steps of analyzing a source language construct of the source data integration platform to determine a logical syntax; constructing a target language construct of the target data integration platform to perform the same logical operation on the target data integration platform as the source language construct performs on the source data integration platform; and substituting the target language construct for the source language construct in the source code for the data integration job. The methods and systems include running the data integration job with the substituted target language construct on the target data integration platform. The methods and systems can include testing the data integration job on the target data integration platform, editing the data integration job; and running the data integration job on the target data integration platform.

In embodiments, the block syntax translation step is used to translate an ETL model from one platform to another. Most ETL scripting languages and program languages use approaches that embody logical similarities. For example the "if" branching construct has many implementations in these different languages, but all with the same type of logical results; namely, a logic test that results in branching execution paths. In order to translate logic for differing protocols, the methods and systems described herein analyze similar language constructs and map them from the language of the source data integration platform 3502 to the language of a target data integration platform 3504. The program is able to then do a "block syntax" substitution of the translated script, into the syntax of the target data integration facility 3502 without having to parse the original scripting language. After the initial substitution, there may optionally be an additional step to modify the structure of the code into a structure necessary for the target data integration platform 3504.

In embodiments, the block syntax translation can be used in a hub to change one ETL syntax into another without requiring a syntax parser. Most scripting syntax follows similar rules. For example, there are similar branching statements in several languages that use "if". For example, a target data integration platform 3504 may have the following branching statement: "If {test} Then {stmt1} Else {stmt2}", while, for example, a source platform 3502 has "IIF({test}, {stmt1}, {stmt2})". Both of these statements accomplish the same task, but the syntax differs slightly. By analyzing the two statements, the tokens "IIF" and "If" represent the exact thing. Similarly, the first comma in the source data integration platform's 3502 statement represents the same thing as the "Then" statement in the target data integration platform's 3504 statement. Further, the second comma in the source data integration platform's 3502 statement corresponds to the "Else" in the target data integration platform's 3504 statement. In embodiments, it is straightforward to substitute one statement for the other. There can be one follow-on step to restructure the statement by removing the parentheses from the statement of the source data integration platform 3502, which isn't present in statements for the target data integration platform 3504. So instead of creating a parser for the syntax of the source data integration platform 3502, it is possible to perform "block" replacements of the items in the statement to move one syntax into the other through the migration facility 3612. This approach can be taken for any syntax without having to develop a syntax parser. In other words, one doesn't have to actually understand or parse the entire script syntax; instead, one can just replace similar elements in a block until one syntax is translated into another.

In embodiments of the methods and systems described herein, a combination of the block-syntax method described in connection with FIGS. 40-41 and the object-oriented methods and systems described in connection with FIGS. 35-39 can be used. Thus, in embodiments, translating an atomic model into a second format can occur through block syntax substitution. In embodiments, parsing the representations comprises dividing the representations into units of data and optionally tagging such units of data.

In embodiments of the methods and systems disclosed herein, a migration facility 3612 can assist in migrating data integration facilities or jobs between platforms in a wide range of environments. The migration facility can be deployed, for example, in a banking institution, a financial services institution, a health care institution, a hospital, an educational institution, a governmental institution, a corporate environment, a non-profit institution, a law enforcement institution, a manufacturer, a professional services organization, a research institution, or any other kind of enterprise or institution that uses more than one data integration platform or wishes to migrate between data integration platforms.

The data integration system is able, for example, to consolidate multiple SAP R/3 instances of an enterprise into a single instance. The system represents an end-to-end data integration infrastructure with a data "Iterations" implementation methodology. "Iterations" is a comprehensive, best practices methodology that provides logical structure to the process of planning and implementing a successful solution. Such service can be deployed in real time. It uses a phased approach, with project roadmap, strategic planning, business process reengineering, project planning, architecture design, data discovery and analysis, data alignment, standardization and cleansing, reconciliation approach for master data sets (customers, suppliers, employees, account hierarchies and material items), construction/development, testing, deployment/implementation, maintenance and ongoing support. Collection, validation, organization, administration and delivery are the five essential aspects of information asset management.

While the invention has been disclosed in connection with the preferred embodiments shown and described in detail, various modifications, combinations and improvements thereon will become readily apparent to those skilled in the art. The invention also includes combinations of the subject matter disclosed in the foregoing specification with subject matter described in the related US patents listed above and the appended pending U.S. patent applications, as long as those combinations, modifications and improvements are novel in view of the prior art.

What is claimed is:

1. A method for migrating a data integration facility executed by a computing facility configured to perform the steps of:
   interpreting at least one operation of a first data integration function configured to operate on a first data integration platform to form at least one interpreted operation, wherein the first data integration function comprises at least one of a data source identification, a data target identification, a data cleansing, a data mapping, a data extraction, a data transformation, and a loading;
   translating the formed at least one interpreted operation into an intermediate format, wherein the intermediate format is a platform-independent representation of the first data integration function that preserves logic of the at least one operation of the first data integration function, wherein translating the formed at least one interpreted operation into the intermediate format further comprises:
      receiving a request for real time integration of data from a pipeline containing individual requests by a real time integration agent of the computing facility, wherein each request in the pipeline is marked with a start of wave marker and an end of wave marker, wherein the start of wave marker enables the real time integration agent to recognize initiation of the received request and the end of wave marker indicates completion of a data integration job instance associated with the received request; and
      responsive to existence of the start of wave marker, processing the received request by the real time integration agent of the computing facility, wherein the received request corresponds to a transaction in the pipeline, and wherein multiple transactions are in the pipeline simultaneously and are processed as each transaction is received; and
   regenerating the at least one operation of the first data integration function from the translated formed at least one interpreted operation in the intermediate format to form a regenerated data integration function operation such that the formed regenerated data integration function operation is configured to operate on a second data integration platform.

2. The method of claim 1, wherein the formed regenerated data integration function operation performs substantially the same logical operation on the second data integration platform as the first data integration function on the first data integration platform.

3. The method of claim 2, wherein, before the step of translating the formed at least one interpreted operation into the intermediate format, the first data integration function is not operationally compatible with the second data integration platform.

4. The method of claim 1, wherein the step of regenerating the at least one operation into the intermediate format further comprises parsing code associated with the at least one operation.

5. The method of claim 4, wherein the parsing code associated with the at least one operation comprises parsing metadata associated with the at least one operation to the intermediate format, and wherein the intermediate format is an object-oriented representation of the first data integration function.

6. The method of claim 5, wherein the metadata associated with the at least one operation is in an eXtensible Markup Language (XML) format and wherein the parsing metadata associated with the at least one operation to the intermediate format comprises parsing the metadata associated with the at least one operation using an XML parser.

7. The method of claim 5, wherein the parsed metadata associated with the at least one operation is formed by parsing the metadata associated with the at least one operation and wherein the parsed metadata associated with the at least one operation is transformed from a first format into a second format.

8. The method of claim 5, wherein the step of regenerating the at least one operation of the first data integration function comprises translating the platform-independent representation of the first data integration function into a native code for the second data integration platform.

9. The method of claim 5, wherein the first data integration platform and the second data integration platform is semantically mapped to the intermediate format via a translation broker.

10. The method of claim 7, wherein the second format comprises at least one of a generic format, an object format, and an atomic format.

11. The method of claim 2, wherein the method further comprises a step of testing the formed regenerated data integration function operation on the second data integration platform.

12. The method of claim 11, wherein the step of testing the formed regenerated data integration function operation on the second data integration platform further comprises determining an effectiveness of regenerating the at least one operation.

13. The method of claim 1, wherein the step of translating the formed at least one interpreted operation into the intermediate format comprises analyzing a syntax of a source code associated with the at least one operation.

14. The method of claim 13, wherein the source code associated with the at least one operation is divided into a number of syntax blocks, wherein each syntax block is identified as performing a known data integration function.

15. The method of claim 14, wherein the identified syntax block is replaced by a substitute syntax block, wherein the substitute syntax block is in the intermediate format.

16. The method of claim 15, wherein the step of regenerating the at least one operation of the first data integration function comprises editing the substitute syntax block to a modified source code that is used by the second data integration platform.

17. The method of claim 1, wherein the step of interpreting the at least one operation of the first integration function, the step of translating the formed at least one interpreted operation into the intermediate format, and the step of regenerating the at least one operation of the first data integration function is performed bi-directionally between the first data integration platform and the second data integration platform.

18. A system for migrating data, the system comprising:
- a first interface to a first data integration platform for interpreting at least one operation of a first data integration function configured to operate on the first data integration platform to form at least one interpreted operation, wherein the first data integration function comprises at least one of a data source identification, a data target identification, a data cleansing, a data mapping, a data extraction, a data transformation, and a loading;
- a translation facility that translates the formed at least one interpreted operation into an intermediate format, wherein the intermediate format is a platform-independent representation of the first data integration function that preserves logic of the at least one operation of the first data integration function;
- a regeneration facility for regenerating the at least one operation of the first data integration function from the translated formed at least on interpreted operation in the intermediate format to form a regenerated data integration function operation such that the formed regenerated data integration function operation is configured to operate on a second data integration platform;
- a real time integration server configured to operate with the translation facility and the regeneration facility, wherein the real time integration server is configured to receive a request for real time integration of data from a pipeline containing individual requests by a real time integration agent of a computing facility, wherein each request in the pipeline is marked with a start of wave marker and an end of wave marker, wherein the start of wave marker enables the real time integration agent to recognize initiation of the received request and the end of wave marker indicates completion of a data integration job instance associated with the received request and process the received request by the real time integration agent of the computing facility in response to existence of the start of wave marker, wherein the received request corresponds to a transaction in the pipeline, and wherein multiple transactions are in the pipeline simultaneously and are processed as each transaction is received; and
- a second interface to the second data integration platform for loading the formed regenerated data integration function operation into the second data integration platform.

19. The system of claim 18, wherein the first data integration function is not operationally compatible with the second data integration platform.

20. The system of claim 18, wherein the regeneration facility is further configured to associate code with the at least one operation during regenerating the at least one operation of the first data integration function.

21. The system of claim 20, wherein the associated code with the at least one operation comprises code for parsing metadata associated with the at least one operation, and wherein the parsed metadata associated with the at least one operation is transformed from a first format into a second format.

22. The system of claim 21, wherein the metadata associated with the at least one operation is in an eXtensible Markup Language (XML) format and the parsing is performed using an XML parser.

23. The system of claim 18 further comprising a testing facility configured to test the formed regenerated data integration function operation.

24. The system of claim 18, wherein the translation facility comprises a translation broker that semantically maps each unique data integration platform or job to an atomic, object-oriented model.

* * * * *